(12) United States Patent
Ikeda et al.

(10) Patent No.: US 9,715,093 B2
(45) Date of Patent: Jul. 25, 2017

(54) ZOOM LENS AND IMAGING APPARATUS

(71) Applicant: FUJIFILM Corporation, Tokyo (JP)

(72) Inventors: Shinkichi Ikeda, Saitama-ken (JP);
Daiki Komatsu, Saitama-ken (JP);
Michio Cho, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 128 days.

(21) Appl. No.: 14/867,943

(22) Filed: Sep. 28, 2015

(65) Prior Publication Data

US 2016/0091698 A1    Mar. 31, 2016

(30) Foreign Application Priority Data

Sep. 30, 2014  (JP) ................. 2014-200169

(51) Int. Cl.
*G02B 9/62* (2006.01)
*G02B 15/20* (2006.01)
*G02B 15/177* (2006.01)

(52) U.S. Cl.
CPC ........... *G02B 15/20* (2013.01); *G02B 15/177* (2013.01)

(58) Field of Classification Search
CPC ......... G02B 15/20; G02B 15/177; G02B 9/62
See application file for complete search history.

(56) References Cited

U.S. PATENT DOCUMENTS 5,136,430 A * 8/1992 Hamanishi ........... G02B 15/173
                                                         359/676
2011/0288158 A1   11/2011 Rossi et al.
2014/0204252 A1   7/2014 Yoshimi et al.

FOREIGN PATENT DOCUMENTS

JP    2011-197470    10/2011
JP    2014-142451    8/2014

* cited by examiner

*Primary Examiner* — Joseph P Martinez
(74) *Attorney, Agent, or Firm* — Young & Thompson

(57) ABSTRACT

A zoom lens consists of, in order from the object side, a first lens group having a positive refractive power, a second lens group having a negative refractive power, a third lens group having a positive refractive power, a fourth lens group having a negative refractive power, a fifth lens group having a positive refractive power, and a sixth lens group having a positive refractive power, wherein magnification change is effected by changing all distances between adjacent lens groups. The second lens group is moved from the object side toward the image side during magnification change from the wide-angle end to the telephoto end. The position of the third lens group at the telephoto end is nearer to the image side than the position of the third lens group at the wide-angle end.

20 Claims, 26 Drawing Sheets

EXAMPLE 1

EXAMPLE 3

EXAMPLE 4

WIDE-ANGLE END

MIDDLE POSITION

TELEPHOTO END

EXAMPLE 5

WIDE-ANGLE END

MIDDLE POSITION

TELEPHOTO END

EXAMPLE 6

EXAMPLE 7

EXAMPLE 8

EXAMPLE 9

EXAMPLE 10

EXAMPLE 11

EXAMPLE 12

EXAMPLE 1

EXAMPLE 2

EXAMPLE 3

WIDE-ANGLE END

MIDDLE POSITION

TELEPHOTO END

EXAMPLE 4

EXAMPLE 5

EXAMPLE 6

EXAMPLE 7

EXAMPLE 8

EXAMPLE 9

WIDE-ANGLE END

MIDDLE POSITION

TELEPHOTO END

EXAMPLE 10

EXAMPLE 11

EXAMPLE 12

WIDE-ANGLE END

MIDDLE POSITION

TELEPHOTO END

ZOOM LENS AND IMAGING APPARATUS

CROSS-REFERENCE TO RELATED APPLICATIONS

The present application claims priority under 35 U.S.C. §119 to Japanese Patent Application No. 2014-200169, filed on Sep. 30, 2014. The above application is hereby expressly incorporated by reference, in its entirety, into the present application.

BACKGROUND

The present disclosure relates to a zoom lens suitable for use with electronic cameras, such as digital cameras, video cameras, broadcasting cameras, monitoring cameras, etc., and an imaging apparatus provided with the zoom lens.

Along with development of 4K or 8K broadcasting cameras in recent years, there is a demand for high performance zoom lenses that accommodate higher pixel density for use with such broadcasting cameras.

As zoom lenses for use with electronic cameras, such as the above-mentioned broadcasting cameras, and digital cameras, video cameras, monitoring cameras, etc., those disclosed in Japanese Unexamined Patent Publication Nos. 2011-197470 and 2014-142451 (hereinafter, Patent Documents 1 and 2, respectively) are known. Each of Patent Documents 1 and 2 discloses a high performance zoom lens having a six-group configuration.

SUMMARY

However, the zoom lens of Patent Document 1 has a small zoom ratio, and the zoom lens of Patent Document 2 has a long entire length. It is therefore desired to provide a high magnification and compact zoom lens with successfully corrected aberrations.

In view of the above-described circumstances, the present disclosure is directed to providing a high magnification and compact zoom lens with successfully corrected aberrations, and an imaging apparatus provided with the zoom lens.

A zoom lens of the disclosure consists of, in order from the object side, a first lens group having a positive refractive power, a second lens group having a negative refractive power, a third lens group having a positive refractive power, a fourth lens group having a negative refractive power, a fifth lens group having a positive refractive power, and a sixth lens group having a positive refractive power, wherein magnification change is effected by changing all distances between adjacent lens groups, the second lens group is moved from the object side toward the image side during magnification change from the wide-angle end to the telephoto end, and the position of the third lens group at the telephoto end is nearer to the image side than the position of the third lens group at the wide-angle end.

In the zoom lens of the disclosure, it is preferred that the condition expression (1) below be satisfied. It is more preferred that the condition expression (1-1) below be satisfied.

$$0.2 < d2T/d2W < 5 \qquad (1),$$

$$0.25 < d2T/d2W < 4 \qquad (1\text{-}1),$$

where d2T is an axial air space between the second lens group and the third lens group at the telephoto end, and d2W is an axial air space between the second lens group and the third lens group at the wide-angle end.

It is preferred that a distance between the second lens group and the third lens group during magnification change from the wide-angle end to the telephoto end be once increased and then be decreased.

It is preferred that the condition expression (2) below be satisfied. It is more preferred that the condition expression (2-1) below be satisfied.

$$-0.3 < f2/f3 < -0.1 \qquad (2),$$

$$-0.25 < f2/f3 < -0.15 \qquad (2\text{-}1),$$

where f2 is a focal length of the second lens group, and f3 is a focal length of the third lens group.

It is preferred that a stop be disposed between the fourth lens group and the fifth lens group.

It is preferred that an axial air space between the fourth lens group and the fifth lens group at the telephoto end be smaller than an axial air space between the fourth lens group and the fifth lens group at the wide-angle end.

It is preferred that the sixth lens group be fixed relative to the image plane during magnification change.

It is preferred that the condition expression (3) below be satisfied. It is more preferred that the condition expression (3-1) below be satisfied.

$$15 < vL < 45 \qquad (3),$$

$$17 < vL < 40 \qquad (3\text{-}1),$$

where vL is an Abbe number with respect to the d-line of the most image-side lens of the sixth lens group.

It is preferred that the condition expression (4) below be satisfied. It is more preferred that the condition expression (4-1) below be satisfied.

$$0.57 < \theta gFL < 0.7 \qquad (4),$$

$$0.58 < \theta gFL < 0.66 \qquad (4\text{-}1),$$

where θgFL is a partial dispersion ratio of the most image-side lens of the sixth lens group.

It is preferred that focusing from infinity to a closer object be effected by moving only the entire first lens group or only a part of lenses forming the first lens group along the optical axis.

It is preferred that the first lens group consist of, in order from the object side, a first lens-group front group, a first lens-group middle group having a positive refractive power, and a first lens group rear group having a positive refractive power, the first lens-group front group be fixed relative to the image plane during focusing, the first lens-group middle group be moved from the image side toward the object side during focusing from infinity to a closer object, and the first lens-group rear group be moved from the image side toward the object side during focusing from infinity to a closer object along a locus of movement that is different from a locus of movement of the first lens-group middle group.

In this case, it is preferred that the first lens-group front group consist of, in order from the object side, a negative lens, a positive lens, and a positive lens. Further, it is preferred that a mean refractive index with respect to the d-line of the positive lens forming the first lens-group rear group be higher than a mean refractive index with respect to the d-line of the positive lens forming the first lens-group middle group.

It is preferred that the sixth lens group comprise at least two positive lenses.

It is preferred that the sixth lens group consist of, in order from the object side, a positive single lens, a cemented lens formed by two lenses cemented together wherein one of the two lenses is a positive lens and the other of the two lenses is a negative lens, a cemented lens formed by two lenses cemented together wherein one of the two lenses is a positive lens and the other of the two lenses is a negative lens, and a positive single lens. It should be noted that either of the positive lens and the negative lens forming each cemented lens may be positioned on the object side.

The imaging apparatus of the disclosure comprises the above-described zoom lens of the disclosure.

It should be noted that the expression "consisting/consist of" as used herein means that the zoom lens may include, besides the elements recited above: lenses substantially without any power; optical elements other than lenses, such as a stop, a mask, a cover glass, and filters; and mechanical components, such as a lens flange, a lens barrel, an image sensor, a camera shake correction mechanism, etc.

It should be noted that the partial dispersion ratio θgF is expressed by the formula below:

$$\theta gF=(ng-nF)/(nF-nC),$$

where ng is a refractive index with respect to the g-line (the wavelength of 435.8 nm), nF is a refractive index with respect to the F-line (the wavelength of 486.1 nm), and nC is a refractive index with respect to the C-line (the wavelength of 656.3 nm).

The sign (positive or negative) with respect to the surface shape and the refractive power of any lens including an aspheric surface among the lenses described above is about the paraxial region.

The zoom lens of the disclosure consists of, in order from the object side, the first lens group having a positive refractive power, the second lens group having a negative refractive power, the third lens group having a positive refractive power, the fourth lens group having a negative refractive power, the fifth lens group having a positive refractive power, and the sixth lens group having a positive refractive power, wherein magnification change is effected by changing all distances between adjacent lens groups, the second lens group is moved from the object side toward an image side during magnification change from the wide-angle end to the telephoto end, and the position of the third lens group at the telephoto end is nearer to the image side than the position of the third lens group at the wide-angle end. This configuration allows accomplishing a high magnification and compact zoom lens with successfully corrected aberrations.

The imaging apparatus of the disclosure, which is provided with the zoom lens of the disclosure, can be formed as a compact imaging apparatus and allows obtaining high magnification and high image quality images.

DETAILED DESCRIPTION OF THE PREFERRED EMBODIMENTS

Figure 1:
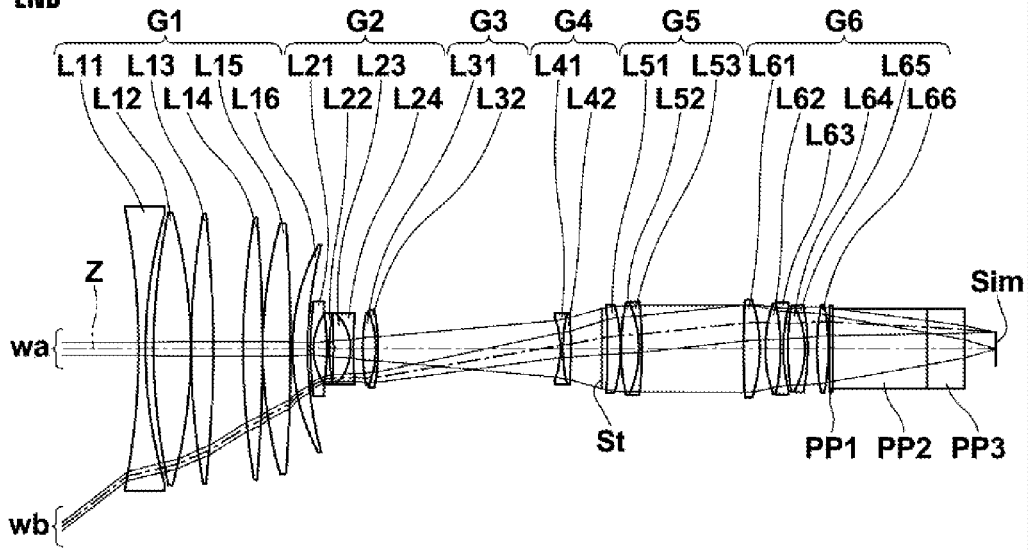
FIG. 1 is a sectional view illustrating the lens configuration of a zoom lens according to one embodiment of the disclosure (a zoom lens of Example 1)
Figure 1:
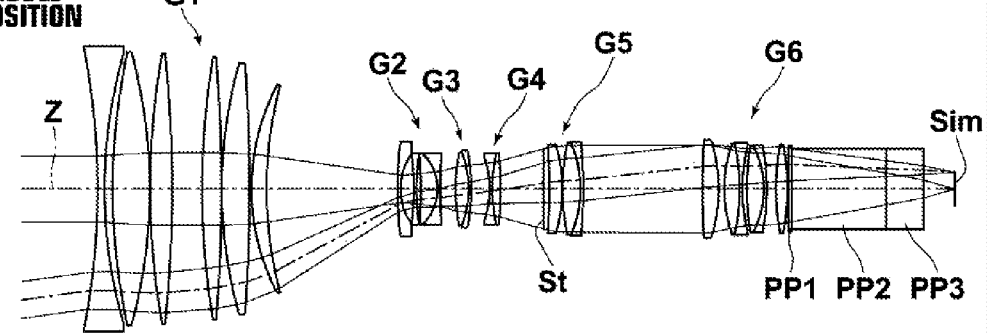
Figure 1:
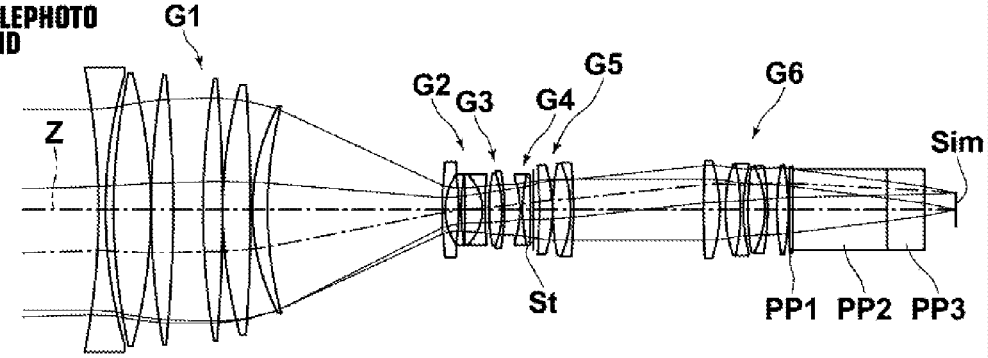
Figure 13:
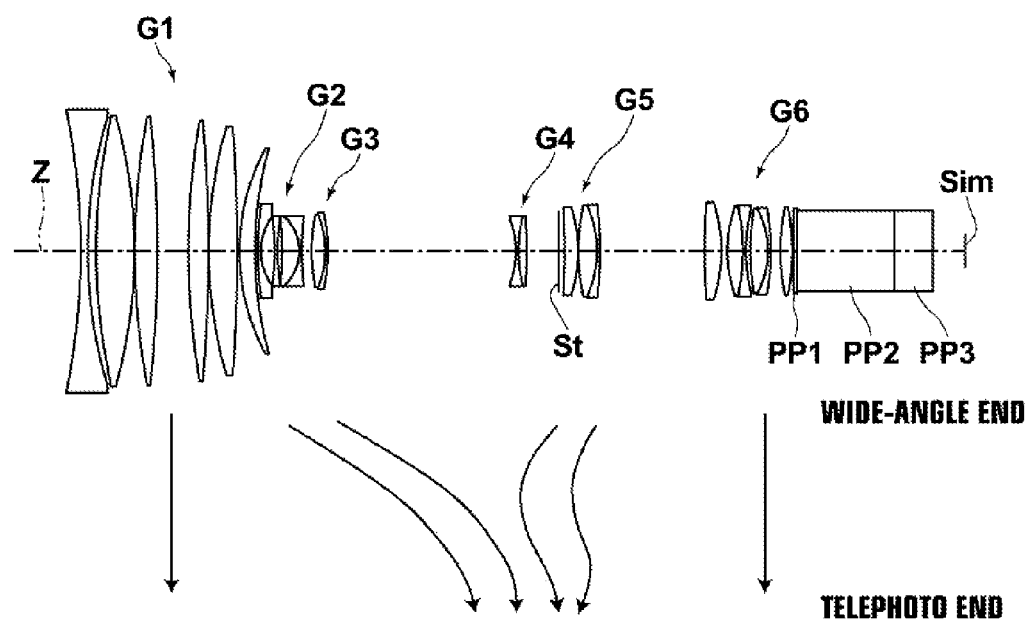
FIG. 13 is a diagram showing a locus of movement of each lens group of the zoom lens of Example 1 of the disclosure.

Hereinafter, embodiments of the present disclosure will be described in detail with reference to the drawings. FIG. 1 is a sectional view illustrating the lens configuration of a zoom lens according to one embodiment of the disclosure, and FIG. 13 is a diagram showing a locus of movement of each lens group of the zoom lens. The configuration example shown in FIGS. 1 and 13 is the same as the configuration of a zoom lens of Example 1, which will be described later. In FIGS. 1 and 13, the left side is the object side and the right side is the image side. A stop St shown in each drawing does not necessarily represent the size and the shape thereof, but represents the position thereof along the optical axis Z. In FIG. 1 also shows an on-axis bundle of rays wa, and a bundle of rays wb at the maximum angle of view.

As shown in FIG. 1, this zoom lens includes, in order from the object side, a first lens group G1 having a positive refractive power, a second lens group G2 having a negative refractive power, a third lens group G3 having a positive refractive power, a fourth lens group G4 having a negative refractive power, a fifth lens group G5 having a positive refractive power, and a sixth lens group G6 having a positive refractive power, wherein magnification change is effected by changing all the distances between the adjacent lens groups.

When this zoom lens is used with an imaging apparatus, it is preferred to provide a cover glass, a prism, and various filters, such as an infrared cutoff filter and a low-pass filter, between the optical system and an image plane Sim depending on the configuration of the camera on which the lens is mounted. In the example shown in FIG. 1, optical members PP1 to PP3 in the form of plane-parallel plates, which are assumed to represent the above-mentioned elements, are disposed between the lens system and the image plane Sim.

During magnification change from the wide-angle end to the telephoto end, the second lens group G2 is moved from the object side toward the image side, and the position of the third lens group G3 at the telephoto end is closer to the image side than the position of the third lens group G3 at the wide-angle end.

The first lens group G1 having a positive refractive power is advantageous for providing a high zoom ratio while keeping the entire length relatively small.

The second lens group G2 having a negative refractive power is moved from the object side toward the image side during magnification change from the wide-angle end to the telephoto end, and mainly functions to effect the magnification change.

The third lens group G3 is moved to change the distance between the third lens group G3 and the second lens group G2, to thereby function to correct change of field curvature, spherical aberration, and lateral chromatic aberration due to magnification change. The above-described effect can be enhanced when the third lens group G3 has a positive refractive power, i.e., a refractive power of the opposite sign from that of the second lens group G2. The lens configuration where the position of the third lens group G3 at the telephoto end is closer to the image side than the position of the third lens group G3 at the wide-angle end allows reducing the amount of movement of the second lens group G2 during magnification change when a high zoom-ratio zoom lens is provided, thereby allowing reduction of the entire length.

The fourth lens group G4 mainly functions to correct change of the image plane position due to magnification change. The fourth lens group G4 having a negative refractive power allows reducing the entire length while ensuring a sufficient back focus when the number of lenses forming the fifth lens group G5 and the following lens group is small.

The fifth lens group G5 is moved to change the distance between the fifth lens group G5 and the sixth lens group G6, to thereby function to correct change of field curvature, astigmatism, and lateral chromatic aberration due to magnification change. If only the floating system to change the distance between the second lens group G2 and the third lens group G3 is provided, a distance suitable for correcting spherical aberration differs from a distance suitable for correcting field curvature, and it is difficult to correct these aberrations at the same time. Providing the two floating systems to change the distance between the second lens group G2 and the third lens group G3 and to change the distance between the fifth lens group G5 and the sixth lens group G6 allows suppressing different aberrations at the same time.

The sixth lens group G6 mainly functions to form an image.

In the zoom lens of this embodiment, it is preferred that the condition expression (1) below be satisfied. During magnification change from the wide-angle end to the telephoto end, the second lens group G2 is largely moved from the object side toward the image side to approach the fourth lens group G4. At this time, if the distance between the second lens group G2 and the third lens group G3 at the telephoto side is large, the second lens group G2 cannot sufficiently approach the fourth lens group G4 at the telephoto side. When the upper limit of the condition expression (1) below is satisfied, the second lens group G2 can sufficiently approach the fourth lens group G4, and this is advantageous for achieving high magnification. While relative change of aberrations between different focal lengths can be suppressed by changing the distance between the second lens group G2 and the third lens group G3, the effect of correcting field curvature, in particular, at the wide angle side is enhanced when the lower limit of the condition expression (1) is satisfied, and this is advantageous for correcting field curvature at the wide-angle end. It should be noted that higher performance can be obtained when the condition expression (1-1) below is satisfied.

$$0.2 < d2T/d2W < 5 \qquad (1),$$

$$0.25 < d2T/d2W < 4 \qquad (1\text{-}1),$$

where d2T is an axial air space between the second lens group and the third lens group at the telephoto end, and d2W is an axial air space between the second lens group and the third lens group at the wide-angle end.

It is preferred that, during magnification change from the wide-angle end to the telephoto end, the distance between the second lens group G2 and the third lens group G3 be once increased, and then be decreased. This configuration is advantageous for correcting spherical aberration, field curvature, and astigmatism at an intermediate focal length, which are difficult to be corrected when the zoom lens is a high magnification zoom lens.

It is preferred that the condition expression (2) below be satisfied. Satisfying the upper limit of the condition expression (2) allows sufficiently ensuring the effect of the floating system provided by changing the distance between the second lens group G2 and the third lens group G3 during magnification change. Satisfying the lower limit of the condition expression (2) allows ensuring the negative refractive power of the combined optical system formed by the second lens group G2 and the third lens group G3, thereby providing a sufficient magnification changing effect. It should be noted that higher performance can be obtained when the condition expression (2-1) below is satisfied.

$$< f2/f3 < -0.1 \qquad (2),$$

$$-0.25 < f2/f3 < -0.15 \qquad (2\text{-}1),$$

where f2 is a focal length of the second lens group, and f3 is a focal length of the third lens group.

It is preferred that a stop St be disposed between the fourth lens group G4 and the fifth lens group G5. This configuration allows minimizing the incidence angle of the principal ray onto the image plane at the peripheral angle of view while minimizing the outer diameter of the first lens group G1.

It is preferred that the axial air space between the fourth lens group G4 and the fifth lens group G5 at the telephoto end is smaller than the axial air space between the fourth lens group G4 and the fifth lens group G5 at the wide-angle end. This configuration assists the magnification changing effect.

It is preferred that the sixth lens group G6 be fixed relative to the image plane Sim during magnification change. This configuration allows suppressing change of the F-value due to magnification change.

It is preferred that the condition expression (3) below be satisfied. Satisfying the condition expression (3) allows correcting lateral chromatic aberration to be within a preferred range. In particular, since the height of the principal ray varies when the fifth lens group G5 is moved, satisfying the upper limit of the condition expression (3) is effective to suppress change of lateral chromatic aberration due to magnification change. It should be noted that higher performance can be obtained when the condition expression (3-1) below is satisfied.

$$15 < vL < 45 \quad (3),$$

$$17 < vL < 40 \quad (3\text{-}1),$$

where vL is an Abbe number with respect to the d-line of the most image-side lens of the sixth lens group.

It is preferred that the condition expression (4) below be satisfied. Satisfying the condition expression (4) allows suppressing secondary lateral chromatic aberration to be within a preferred range. In particular, since the height of the principal ray varies when the fifth lens group G5 is moved, satisfying the lower limit of the condition expression (4) is effective to suppress change of secondary lateral chromatic aberration due to magnification change. It should be noted that higher performance can be obtained when the condition expression the condition expression (4-1) below is satisfied.

$$0.57 < \theta gFL < 0.7 \quad (4),$$

$$0.58 < \theta gFL < 0.66 \quad (4\text{-}1),$$

where θgFL is a partial dispersion ratio of the most image-side lens of the sixth lens group.

It is preferred that focusing from infinity to a closer object is effected by moving only the entire first lens group G1 or only a part of lenses forming the first lens group G1 along the optical axis. This configuration allows suppressing difference of the amount of movement of each lens group moved during focusing depending on the state of magnification change.

It is preferred that the first lens group G1 consist of, in order from the object side, a first lens-group front group, a first lens-group middle group having a positive refractive power, and a first lens-group rear group having a positive refractive power, wherein the first lens-group front group is fixed relative to the image plane during focusing, the first lens-group middle group is moved from the image side toward the object side during focusing from infinity to a closer object, and the first lens-group rear group is moved from the image side toward the object side during focusing from infinity to a closer object along a locus of movement that is different from the locus of movement of the first lens-group middle group. This configuration allows suppressing change of field curvature and spherical aberration depending on the object distance. It should be noted that higher performance can be obtained if the distance between the first lens-group middle group and the first lens-group rear group when the lens is focused on a closest object is greater than the distance between the first lens-group middle group and the first lens-group rear group when the lens is focused on an object at infinity. In this embodiment, the lenses L11 to L13 of the first lens group G1 form the first lens-group front group, the lenses L14 to L15 form the first lens-group middle group, and the lens L16 forms the first lens-group rear group.

In this case, it is preferred that the first lens-group front group consist of, in order from the object side, a negative lens, a positive lens, and a positive lens. Disposing the negative lens at the most object-side position in this manner allows minimizing the incidence angle of the marginal ray onto the following lenses and is advantageous for achieving a wide-angle zoom lens. Providing the two positive lenses allows suppressing spherical aberration.

It is preferred that the mean refractive index with respect to the d-line of the positive lens forming the first lens-group rear group is higher than the mean refractive index with respect to the d-line of the positive lens forming the first lens-group middle group. This configuration allows suppressing change of field curvature depending on the object distance.

It is preferred that the sixth lens group G6 include at least two positive lenses. This configuration allows suppressing spherical aberration and distortion.

It is preferred that the sixth lens group G6 consist of, in order from the object side, a positive single lens, a cemented lens formed by two lenses cemented together wherein one of the two lenses is a positive lens and the other of the two lenses is a negative lens, a cemented lens formed by two lenses cemented together wherein one of the two lenses is a positive lens and the other of the two lenses is a negative lens, and a positive single lens. Arranging the lenses forming the sixth lens group G6 in this order allows well balancing between on-axis and off-axis aberrations. The first positive single lens is effective to reduce the F-value. The next two cemented lenses are effective to correct spherical aberration and axial chromatic aberration. Providing the plurality of cemented lenses allows distributing the function of correcting spherical aberration and axial chromatic aberration between the cemented lenses, thereby allowing suppressing high-order spherical aberration and difference of spherical aberration depending on the wavelength. Providing each cemented lens of a positive lens and a negative lens rather than providing a positive lens and a negative lens separately allows suppressing change of spherical aberration due to errors of the surface distances and suppressing coma due to decentering. The last positive single lens is effective to minimize the incidence angle of the principal ray onto the image plane at the peripheral angle of view.

It is preferred that the stop St is moved together with the fifth lens group G5 during magnification change. This configuration is advantageous for reducing the size of the fifth lens group G5 and the following lens group.

It is preferred that the first lens group G1 be fixed relative to the image plane Sim during magnification change. This configuration allows reducing movement of the centroid due to the magnification changing operation.

In a case where the zoom lens is used in a harsh environment, it is preferred that the zoom lens be provided with a protective multi-layer coating. Besides the protective coating, the zoom lens may be provided with an antireflection coating for reducing ghost light, etc., during use.

In the example shown in FIG. 1, the optical members PP1 to PP3 are disposed between the lens system and the image plane Sim. However, in place of disposing the various filters, such as a low-pass filter and a filter that cuts off a specific wavelength range, between the lens system and the image plane Sim, the various filters may be disposed between the lenses, or coatings having the same functions as the various filters may be applied to the lens surfaces of some of the lenses.

Next, numerical examples of the zoom lens of the disclosure are described.

First, a zoom lens of Example 1 is described. FIG. 1 is a sectional view illustrating the lens configuration of the zoom lens of Example 1. It should be noted that, in FIG. 1, and FIGS. 2 to 12 corresponding to Examples 2 to 12, which will be described later, the left side is the object side and the right side is the image side. The stop St shown in the drawings does not necessarily represent the size and the shape thereof, but represents the position thereof along the optical axis Z.

Table 1 shows basic lens data of the zoom lens of Example 1, Table 2 shows data about specifications of the zoom lens, Table 3 shows data about distances between the surfaces to be moved of the zoom lens, and Table 4 shows data about aspheric coefficients of the zoom lens. In the following description, meanings of symbols used in the tables are explained with respect to Example 1 as an example. Basically the same explanations apply to those with respect to Examples 2 to 12.

In the lens data shown in Table 1, each value in the column of "Surface No." represents each surface number, where the object-side surface of the most object-side element is the 1st surface and the number is sequentially increased toward the image side, each value in the column of "Radius of Curvature" represents the radius of curvature of each surface, and each value in the column of "Surface Distance" represents the distance along the optical axis Z between each surface and the next surface. Each value in the column of "n" represents the refractive index with respect to the d-line (the wavelength of 587.6 nm) of each optical element, each value in the column of "ν" represents the Abbe number with respect to the d-line (the wavelength of 587.6 nm) of each optical element, and each value in the column of "θgF" represents the partial dispersion ratio of each optical element.

It should be noted that the partial dispersion ratio θgF is expressed by the formula below:

$$\theta gF = (ng - nF)/(nF - nC),$$

where ng is a refractive index with respect to the g-line (the wavelength of 435.8 nm), nF is a refractive index with respect to the F-line (the wavelength of 486.1 nm), and nC is a refractive index with respect to the C-line (the wavelength of 656.3 nm).

The sign with respect to the radius of curvature is provided such that a positive radius of curvature indicates a surface shape that is convex toward the object side, and a negative radius of curvature indicates a surface shape that is convex toward the image side. The basic lens data also includes data of the stop St and the optical members PP1 to PP3, and the surface number and the text "(stop)" are shown at the position in the column of the surface number corresponding to the stop St. In the lens data shown in Table 1, the value of each surface distance that is changed during magnification change is represented by the symbol "DD[i]". The numerical value corresponding to each DD[i] is shown in Table 3.

The data about specifications shown in Table 2 show values of zoom magnification, focal length f', back focus Bf', F-number FNo., and full angle of view 2ω at the wide-angle end, at the middle position, and at the telephoto end, respectively.

With respect to the basic lens data, the data about specifications, and the data about distances between the surfaces to be moved, the unit of angle is degrees, and the unit of length is millimeters; however, any other suitable units may be used since optical systems are usable when they are proportionally enlarged or reduced.

In the lens data shown in Table 1, the symbol "*" is added to the surface number of each aspheric surface, and a numerical value of the paraxial radius of curvature is shown as the radius of curvature of each aspheric surface. In the data about aspheric coefficients shown in Table 4, the surface number of each aspheric surface and aspheric coefficients about each aspheric surface are shown. The aspheric coefficients are values of the coefficients KA and Am (where m=4, . . . , 20) in the formula of aspheric surface shown below:

$$Zd = C \cdot h^2 / \{1 + (1 - KA \cdot C^2 \cdot h^2)^{1/2}\} + \Sigma Am \cdot hm,$$

where Zd is a depth of the aspheric surface (a length of a perpendicular line from a point with a height h on the aspheric surface to a plane that is tangent to the apex of the aspheric surface and perpendicular to the optical axis), h is the height (a distance from the optical axis), C is a reciprocal of the paraxial radius of curvature, and KA and Am are aspheric coefficients (where m=4, . . . , 20).

TABLE 1

Example 1 - Lens Data (n and ν are with respect to the d-line)

| Surface No. | Radius of Curvature | Surface Distance | n | ν | θg F |
|---|---|---|---|---|---|
| 1 | −236.10534 | 2.400 | 1.80610 | 33.27 | 0.58845 |
| 2 | 157.43462 | 2.845 | | | |
| *3 | 192.16845 | 13.024 | 1.43700 | 95.10 | 0.53364 |
| 4 | −168.42983 | 0.120 | | | |
| 5 | 248.55380 | 7.694 | 1.43387 | 95.18 | 0.53733 |
| 6 | −416.66275 | 10.500 | | | |
| 7 | 256.44800 | 6.805 | 1.43387 | 95.18 | 0.53733 |
| 8 | −501.39871 | 0.120 | | | |
| 9 | 150.67609 | 9.591 | 1.53775 | 74.70 | 0.53936 |
| *10 | −756.19829 | 0.800 | | | |
| 11 | 72.94991 | 5.280 | 1.77250 | 49.60 | 0.55212 |
| 12 | 130.88458 | DD[12] | | | |
| *13 | 121.80578 | 1.060 | 2.00069 | 25.46 | 0.61364 |
| 14 | 20.15463 | 4.651 | | | |
| 15 | −84.56608 | 0.900 | 1.90043 | 37.37 | 0.57720 |
| 16 | 63.94706 | 1.481 | | | |
| 17 | −180.64142 | 5.968 | 1.89286 | 20.36 | 0.63944 |
| 18 | −16.12200 | 0.900 | 1.90043 | 37.37 | 0.57720 |
| 19 | 130.38394 | DD[19] | | | |
| 20 | 61.96315 | 4.562 | 1.67300 | 38.15 | 0.57545 |
| 21 | −33.40200 | 0.900 | 1.88300 | 40.76 | 0.56679 |
| 22 | −63.31710 | DD[22] | | | |
| 23 | −30.60474 | 0.910 | 1.75700 | 47.82 | 0.55662 |
| 24 | 51.15200 | 2.739 | 1.89286 | 20.36 | 0.63944 |
| 25 | −233.01948 | DD[25] | | | |
| 26 (stop) | ∞ | 2.000 | | | |
| 27 | −268.65624 | 4.609 | 1.88300 | 40.76 | 0.56679 |
| 28 | −49.51807 | 0.120 | | | |
| 29 | 74.94268 | 6.256 | 1.56384 | 60.67 | 0.54030 |
| 30 | −37.60100 | 1.000 | 1.95375 | 32.32 | 0.59015 |
| 31 | −152.40146 | DD[31] | | | |
| 32 | 212.20151 | 5.724 | 1.56883 | 56.36 | 0.54890 |
| 33 | −51.95699 | 2.000 | | | |
| 34 | 45.56887 | 5.283 | 1.48749 | 70.24 | 0.53007 |
| 35 | −71.57700 | 1.000 | 1.95375 | 32.32 | 0.59015 |
| 36 | 56.80284 | 1.585 | | | |
| 37 | 89.02575 | 5.940 | 1.48749 | 70.24 | 0.53007 |
| 38 | −30.05700 | 1.000 | 1.95375 | 32.32 | 0.59015 |
| 39 | −75.52274 | 3.238 | | | |
| 40 | 75.90500 | 4.006 | 1.62004 | 36.26 | 0.58800 |
| 41 | −75.90500 | 0.300 | | | |
| 42 | ∞ | 1.320 | 1.51633 | 64.14 | |
| 43 | ∞ | 33.000 | 1.60859 | 46.44 | |
| 44 | ∞ | 13.200 | 1.51633 | 64.14 | |
| 45 | ∞ | 10.809 | | | |

TABLE 2

Example 1 - Specifications (d-line)

|  | Wide-Angle End | Middle | Telephoto End |
|---|---|---|---|
| Zoom Magnification | 1.0 | 5.0 | 21.3 |
| f | 8.285 | 41.424 | 176.465 |
| Bf | 41.200 | 41.200 | 41.200 |
| FNo. | 1.86 | 1.86 | 2.62 |
| 2ω [°] | 73.4 | 15.0 | 3.6 |

TABLE 3

Example 1 - Distances Relating to Zoom

|  | Wide-Angle End | Middle | Telephoto End |
|---|---|---|---|
| DD[12] | 1.000 | 45.902 | 61.224 |
| DD[19] | 3.310 | 5.383 | 1.410 |
| DD[22] | 63.825 | 6.492 | 5.425 |
| DD[25] | 10.907 | 15.153 | 1.052 |
| DD[31] | 35.551 | 41.663 | 45.482 |

TABLE 4

Example 1 - Aspheric Coefficients

| | Surface No. | | |
|---|---|---|---|
|  | 3 | 10 | 13 |
| KA | 9.8642991E−01 | 1.0000000E+00 | 1.0000000E+00 |
| A4 | −1.2462640E−07 | −1.2850634E−07 | 7.6697877E−07 |
| A6 | 2.0237162E−10 | 1.7897543E−10 | −2.1568480E−08 |
| A8 | −6.6893219E−13 | −6.3703904E−13 | 3.3132934E−10 |
| A10 | 1.1791466E−15 | 1.2212342E−15 | −3.7535766E−12 |
| A12 | −1.2683621E−18 | −1.4488137E−18 | 3.9307690E−14 |
| A14 | 8.5755859E−22 | 1.0949325E−21 | −3.3973656E−16 |
| A16 | −3.5569939E−25 | −5.1382379E−25 | 1.8579245E−18 |
| A18 | 8.2700693E−29 | 1.3659907E−28 | −5.3987218E−21 |
| A20 | −8.2523570E−33 | −1.5726111E−32 | 6.3159012E−24 |

Figure 14:
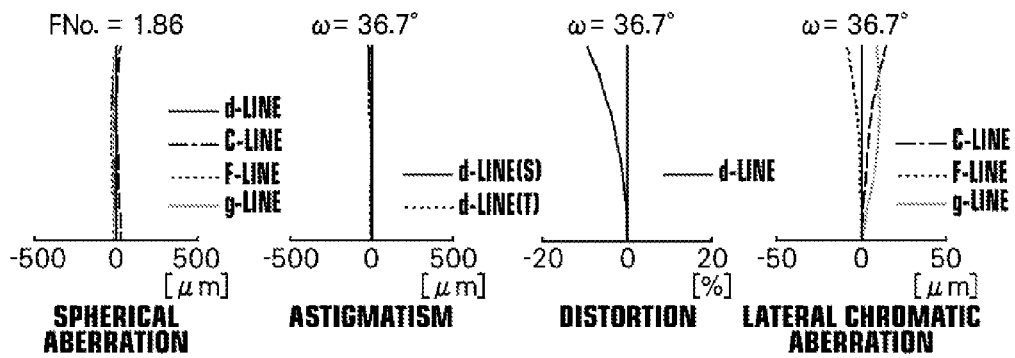
FIG. 14 shows aberration diagrams of the zoom lens of Example 1 of the disclosure.
Figure 14:
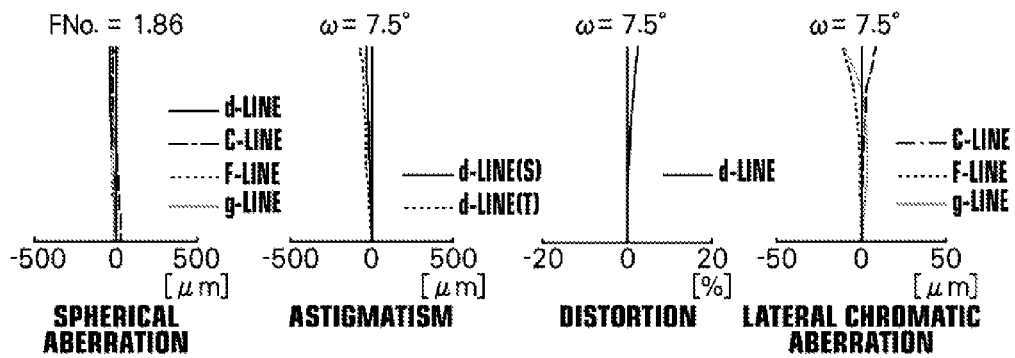
Figure 14:
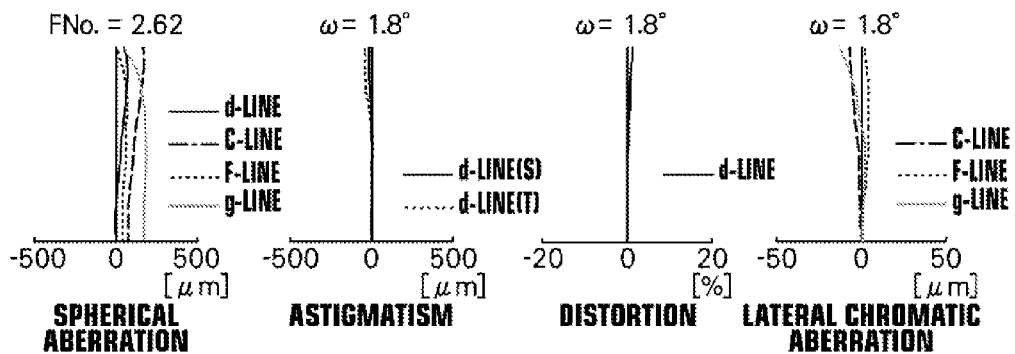

FIG. 14 shows aberration diagrams of the zoom lens of Example 1. The aberration diagrams shown at the top of FIG. 14 are those of spherical aberration, astigmatism, distortion, and lateral chromatic aberration at the wide-angle end in this order from the left side, the aberration diagrams shown at the middle of FIG. 14 are those of spherical aberration, astigmatism, distortion, and lateral chromatic aberration at the middle position in this order from the left side, and the aberration diagrams shown at the bottom of FIG. 14 are those of spherical aberration, astigmatism, distortion, and lateral chromatic aberration at the telephoto end in this order from the left side. The aberration diagrams of spherical aberration, astigmatism, and distortion show those with respect to the d-line (the wavelength of 587.6 nm), which is used as a reference wavelength. The aberration diagrams of spherical aberration show those with respect to the d-line (the wavelength of 587.6 nm), the C-line (the wavelength of 656.3 nm), the F-line (the wavelength of 486.1 nm), and the g-line (the wavelength of 435.8 nm) in the solid line, the long dashed line, the short dashed line, and the gray solid line, respectively. The aberration diagrams of astigmatism show those in the sagittal direction and the tangential direction in the solid line, and the short dashed line, respectively. The aberration diagrams of lateral chromatic aberration show those with respect to the C-line (the wavelength of 656.3 nm), the F-line (the wavelength of 486.1 nm), and the g-line (the wavelength of 435.8 nm) in the long dashed line, the short dashed line, and the gray solid line, respectively. These aberration diagrams show aberrations when the lens is focused on an object at infinity. The "FNo." in the aberration diagrams of spherical aberration means "F-number", and the "ω" in the other aberration diagrams means "half angle of view".

The above-described symbols, meanings and manners of description of the various data of Example 1 apply also to the examples described below, unless otherwise noted, and the same explanations are not repeated in the following description.

Figure 2:
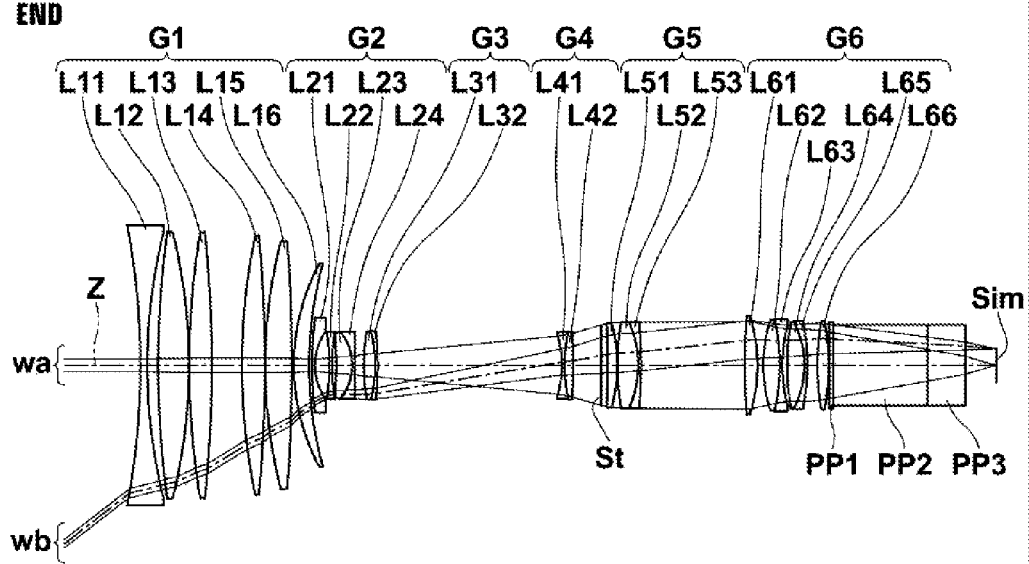
FIG. 2 is a sectional view illustrating the lens configuration of a zoom lens of Example 2 of the disclosure.
Figure 2:
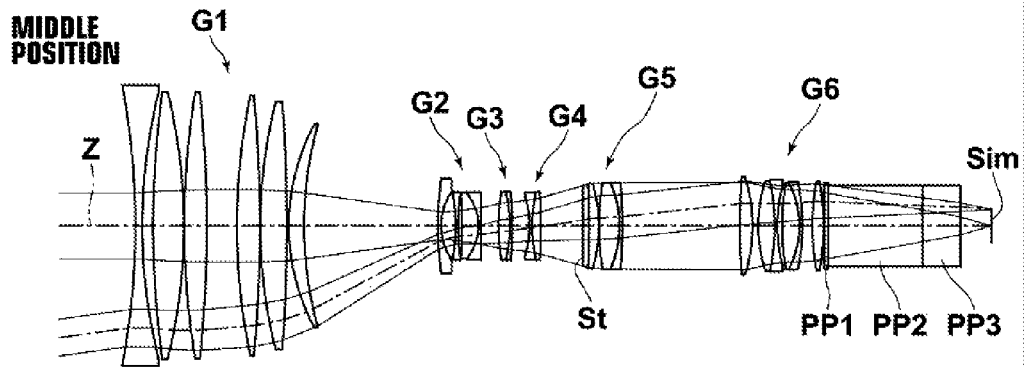
Figure 2:
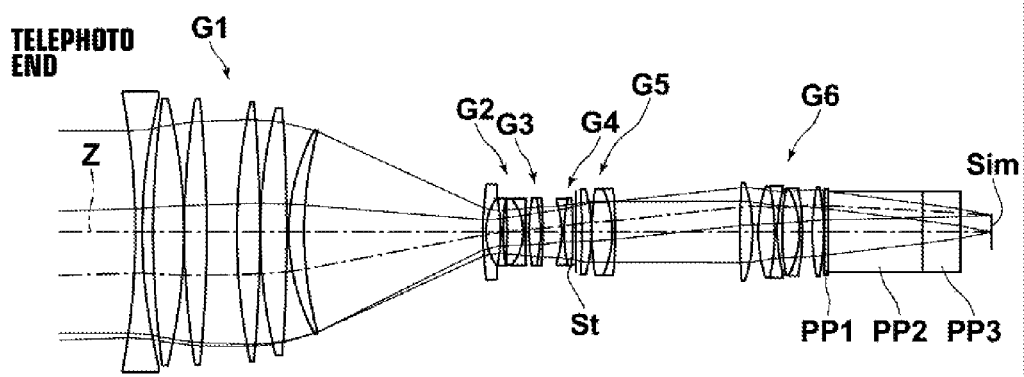
Figure 15:
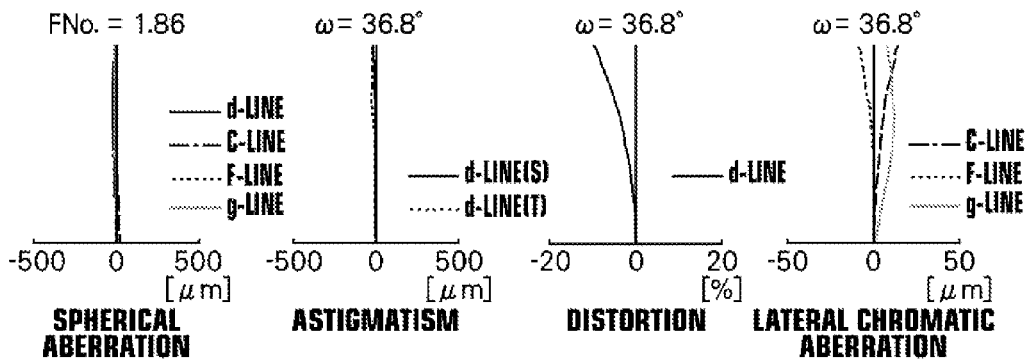
FIG. 15 shows aberration diagrams of the zoom lens of Example 2 of the disclosure.
Figure 15:
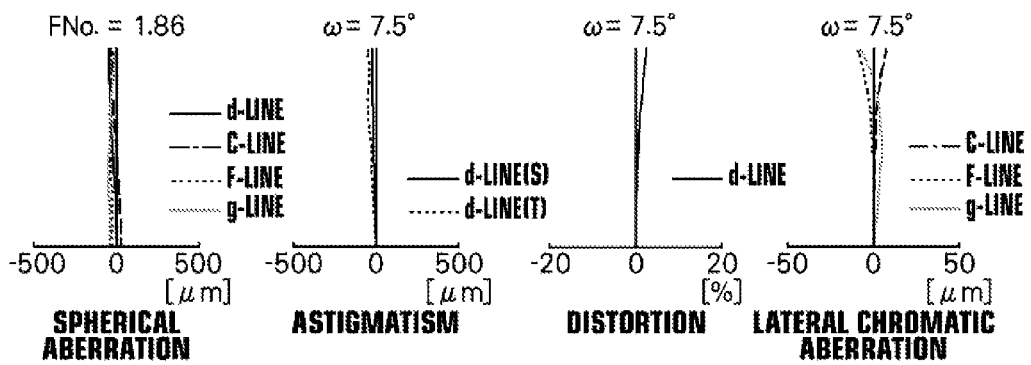
Figure 15:
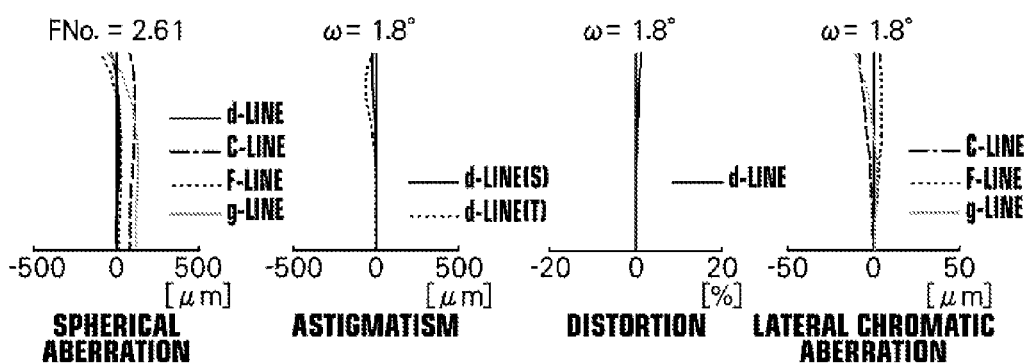

Next, a zoom lens of Example 2 is described. FIG. 2 is a sectional view illustrating the lens configuration of the zoom lens of Example 2. In the first lens group G1, lenses L11 to L13 form the first lens-group front group, lenses L14 to L15 form the first lens-group middle group, and the lens L16 forms the first lens group rear group. This is the same in Examples 3 to 12, which will be described alter, and the same explanation is not repeated in the following description. Table 5 shows basic lens data of the zoom lens of Example 2, Table 6 shows data about specifications of the zoom lens, Table 7 shows data about distances between the surfaces to be moved of the zoom lens, Table 8 shows data about aspheric coefficients of the zoom lens, and FIG. 15 shows aberration diagrams of the zoom lens.

TABLE 5

Example 2 - Lens Data (n and ν are with respect to the d-line)

| Surface No. | Radius of Curvature | Surface Distance | n | ν | θg F |
|---|---|---|---|---|---|
| 1 | −243.86065 | 2.400 | 1.80610 | 33.27 | 0.58845 |
| 2 | 177.66564 | 3.792 |  |  |  |
| *3 | 283.34249 | 10.828 | 1.43700 | 95.10 | 0.53364 |
| 4 | −180.25079 | 0.120 |  |  |  |
| 5 | 264.99700 | 7.859 | 1.43387 | 95.18 | 0.53733 |
| 6 | −413.74587 | 10.500 |  |  |  |
| 7 | 206.28622 | 8.013 | 1.43387 | 95.18 | 0.53733 |
| 8 | −460.65008 | 0.120 |  |  |  |
| 9 | 162.60466 | 9.289 | 1.53775 | 74.70 | 0.53936 |
| *10 | −682.27905 | 0.800 |  |  |  |
| 11 | 70.28276 | 5.299 | 1.72916 | 54.68 | 0.54451 |
| 12 | 124.16732 | DD[12] |  |  |  |
| *13 | 109.96365 | 1.060 | 2.00069 | 25.46 | 0.61364 |
| 14 | 19.45589 | 5.070 |  |  |  |
| 15 | −62.72298 | 0.900 | 1.88300 | 40.76 | 0.56679 |
| 16 | 72.98998 | 1.380 |  |  |  |
| 17 | −167.04654 | 5.684 | 1.89286 | 20.36 | 0.63944 |
| 18 | −17.10952 | 0.900 | 1.90043 | 37.37 | 0.57720 |
| 19 | 1176.28395 | DD[19] |  |  |  |
| 20 | 69.45970 | 3.925 | 1.72047 | 34.71 | 0.58350 |
| 21 | −45.32437 | 0.900 | 1.88300 | 40.76 | 0.56679 |
| 22 | −107.28789 | DD[22] |  |  |  |
| 23 | −31.99193 | 0.910 | 1.79952 | 42.22 | 0.56727 |
| 24 | 48.26012 | 3.006 | 1.89286 | 20.36 | 0.63944 |
| 25 | −177.36664 | DD[25] |  |  |  |
| 26 (stop) | ∞ | 2.133 |  |  |  |
| 27 | −305.34285 | 3.373 | 1.90043 | 37.37 | 0.57720 |
| 28 | −50.97470 | 0.120 |  |  |  |
| 29 | 91.18834 | 7.154 | 1.62041 | 60.29 | 0.54266 |
| 30 | −34.82607 | 1.000 | 1.95375 | 32.32 | 0.59015 |
| 31 | −149.36795 | DD[31] |  |  |  |
| 32 | 207.45390 | 4.442 | 1.56384 | 60.67 | 0.54030 |
| 33 | −51.50920 | 2.000 |  |  |  |
| 34 | 46.57739 | 5.774 | 1.48749 | 70.24 | 0.53007 |
| 35 | −68.86356 | 1.000 | 1.95375 | 32.32 | 0.59015 |
| 36 | 55.07947 | 1.585 |  |  |  |
| 37 | 80.97612 | 6.024 | 1.48749 | 70.24 | 0.53007 |
| 38 | −30.37079 | 1.000 | 1.95375 | 32.32 | 0.59015 |
| 39 | −73.71938 | 3.514 |  |  |  |
| 40 | 78.10738 | 3.919 | 1.63980 | 34.47 | 0.59233 |
| 41 | −78.10740 | 0.300 |  |  |  |
| 42 | ∞ | 1.320 | 1.51633 | 64.14 |  |
| 43 | ∞ | 33.000 | 1.60859 | 46.44 |  |
| 44 | ∞ | 13.200 | 1.51633 | 64.14 |  |

TABLE 5-continued

Example 2 - Lens Data (n and ν are with respect to the d-line)

| Surface No. | Radius of Curvature | Surface Distance | n | ν | θg F |
|---|---|---|---|---|---|
| 45 | ∞ | 10.767 | | | |

TABLE 6

Example 2 - Specifications (d-line)

| | Wide-Angle End | Middle | Telephoto End |
|---|---|---|---|
| Zoom Magnification | 1.0 | 5.0 | 21.3 |
| f | 8.284 | 41.420 | 176.448 |
| Bf | 41.159 | 41.159 | 41.159 |
| FNo. | 1.86 | 1.86 | 2.61 |
| 2ω[°] | 73.6 | 15.0 | 3.6 |

TABLE 7

Example 2 - Distances Relating to Zoom

| | Wide-Angle End | Middle | Telephoto End |
|---|---|---|---|
| DD[12] | 1.000 | 46.772 | 62.485 |
| DD[19] | 3.124 | 6.162 | 1.224 |
| DD[22] | 64.408 | 6.048 | 6.396 |
| DD[25] | 9.887 | 14.694 | 1.052 |
| DD[31] | 36.309 | 41.051 | 43.570 |

TABLE 8

Example 2 - Aspheric Coefficients

| | Surface No. | | |
|---|---|---|---|
| | 3 | 10 | 13 |
| KA | 9.8642991E−01 | 1.0000000E+00 | 1.0000000E+00 |
| A4 | −6.9602057E−08 | −8.3669305E−08 | 5.9323703E−07 |
| A6 | 9.7623781E−11 | 8.7093038E−11 | −1.1011450E−08 |
| A8 | −4.7871767E−13 | −4.1732391E−13 | 9.4777920E−11 |
| A10 | 9.4201269E−16 | 8.4940921E−16 | −1.2923764E−12 |
| A12 | −1.0659628E−18 | −1.0191577E−18 | 3.1324061E−14 |
| A14 | 7.3726243E−22 | 7.6831823E−22 | −4.0782384E−16 |
| A16 | −3.0751761E−25 | −3.5951152E−25 | 2.5937402E−18 |
| A18 | 7.1053868E−29 | 9.5904004E−29 | −7.9553394E−21 |
| A20 | −6.9866751E−33 | −1.1185971E−32 | 9.4395980E−24 |

Figure 3:
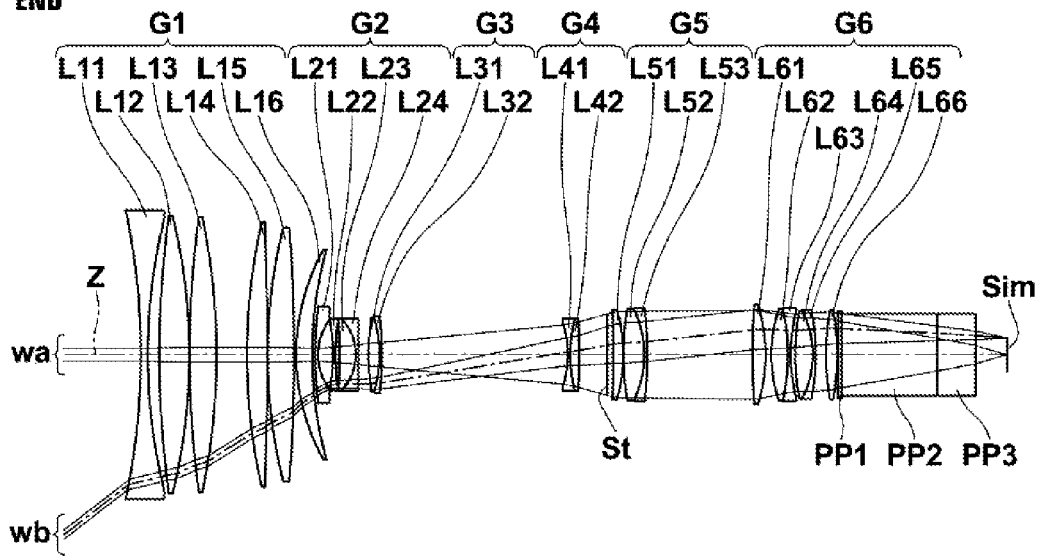
FIG. 3 is a sectional view illustrating the lens configuration of a zoom lens of Example 3 of the disclosure.
Figure 3:
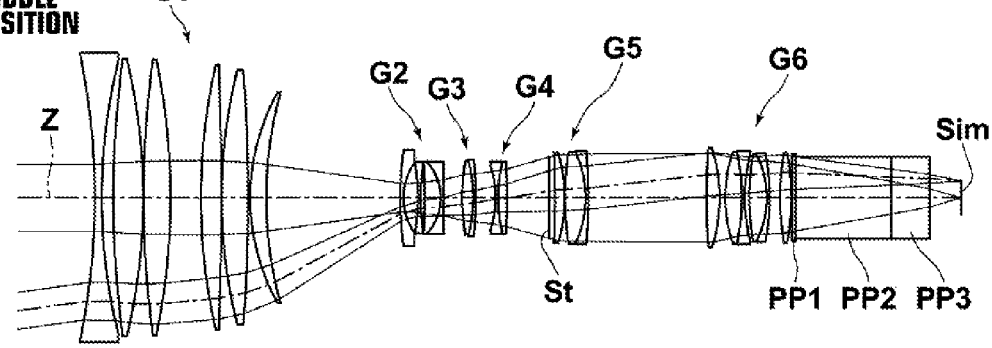
Figure 3:
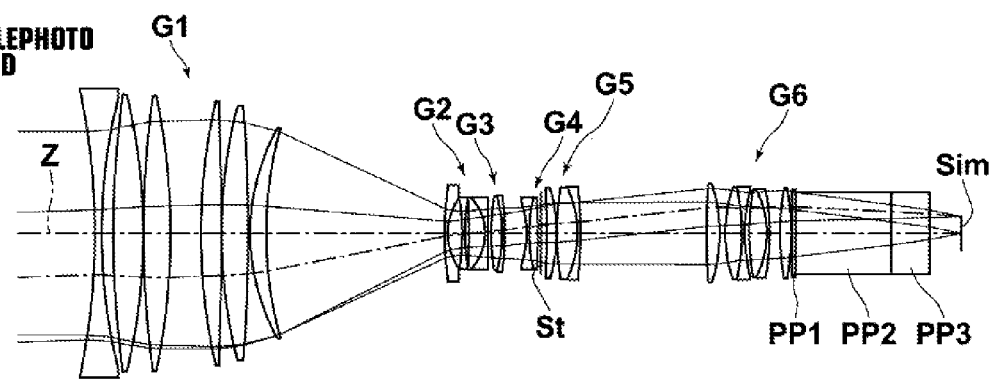
Figure 16:
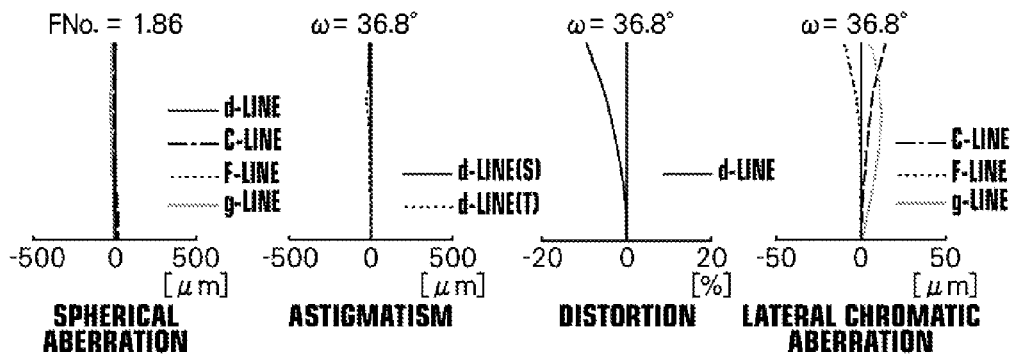
FIG. 16 shows aberration diagrams of the zoom lens of Example 3 of the disclosure.
Figure 16:
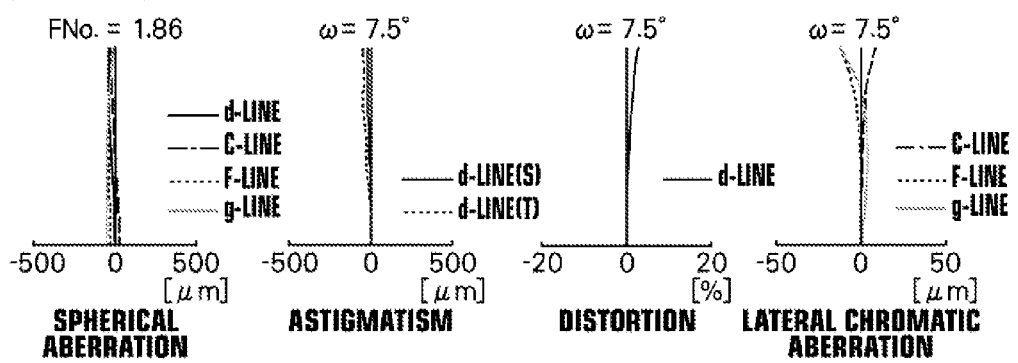
Figure 16:
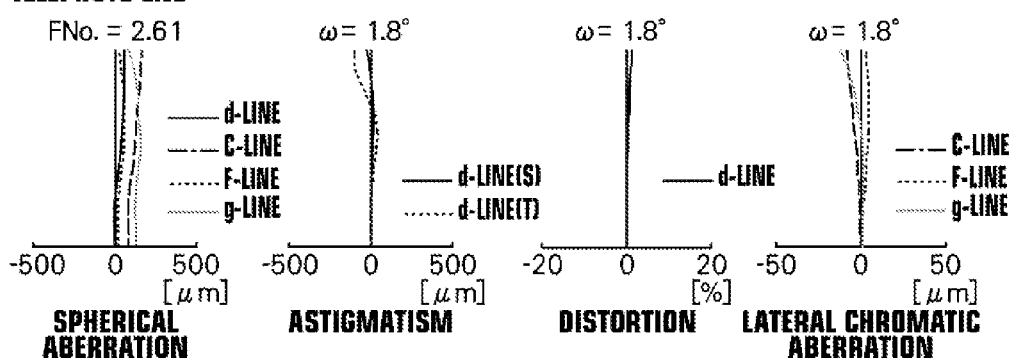

Next, a zoom lens of Example 3 is described. FIG. 3 is a sectional view illustrating the lens configuration of the zoom lens of Example 3. Table 9 shows basic lens data of the zoom lens of Example 3, Table 10 shows data about specifications of the zoom lens, Table 11 shows data about distances between the surfaces to be moved of the zoom lens, Table 12 shows data about aspheric coefficients of the zoom lens, and FIG. 16 shows aberration diagrams of the zoom lens.

TABLE 9

Example 3 - Lens Data (n and ν are with respect to the d-line)

| Surface No. | Radius of Curvature | Surface Distance | n | ν | θg F |
|---|---|---|---|---|---|
| 1 | −223.89709 | 2.400 | 1.80610 | 33.27 | 0.58845 |
| 2 | 181.30328 | 3.947 | | | |
| *3 | 291.37535 | 10.372 | 1.43700 | 95.10 | 0.53364 |
| 4 | −190.48789 | 0.120 | | | |
| 5 | 321.66326 | 9.319 | 1.43387 | 95.18 | 0.53733 |
| 6 | −213.32289 | 10.500 | | | |
| 7 | 190.95974 | 7.001 | 1.43387 | 95.18 | 0.53733 |
| 8 | −1127.21143 | 0.120 | | | |
| 9 | 166.80620 | 9.109 | 1.53775 | 74.70 | 0.53936 |
| *10 | −676.49213 | 0.800 | | | |
| 11 | 69.56648 | 5.510 | 1.72916 | 54.68 | 0.54451 |
| 12 | 126.52654 | DD[12] | | | |
| *13 | 111.06652 | 1.060 | 2.00069 | 25.46 | 0.61364 |
| 14 | 19.42359 | 5.072 | | | |
| 15 | −62.07387 | 0.900 | 1.88300 | 40.76 | 0.56679 |
| 16 | 73.48097 | 1.374 | | | |
| 17 | −165.74131 | 5.604 | 1.89286 | 20.36 | 0.63944 |
| 18 | −16.88700 | 0.900 | 1.90043 | 37.37 | 0.57720 |
| 19 | 1353.92461 | DD[19] | | | |
| 20 | 69.60254 | 3.793 | 1.72047 | 34.71 | 0.58350 |
| 21 | −45.14900 | 0.900 | 1.88300 | 40.76 | 0.56679 |
| 22 | −111.03192 | DD[22] | | | |
| 23 | −32.15578 | 0.910 | 1.79952 | 42.22 | 0.56727 |
| 24 | 48.56600 | 3.016 | 1.89286 | 20.36 | 0.63944 |
| 25 | −173.74811 | DD[25] | | | |
| 26 (stop) | ∞ | 2.022 | | | |
| 27 | −312.83550 | 3.354 | 1.90043 | 37.37 | 0.57720 |
| 28 | −51.28294 | 0.120 | | | |
| 29 | 90.83390 | 7.115 | 1.62041 | 60.29 | 0.54266 |
| 30 | −34.81800 | 1.000 | 1.95375 | 32.32 | 0.59015 |
| 31 | −149.34057 | DD[31] | | | |
| 32 | 204.95892 | 4.490 | 1.56384 | 60.67 | 0.54030 |
| 33 | −51.54583 | 2.000 | | | |
| 34 | 46.62639 | 5.683 | 1.48749 | 70.24 | 0.53007 |
| 35 | −68.64400 | 1.000 | 1.95375 | 32.32 | 0.59015 |
| 36 | 54.64218 | 1.585 | | | |
| 37 | 80.49234 | 6.055 | 1.48749 | 70.24 | 0.53007 |
| 38 | −30.31800 | 1.000 | 1.95375 | 32.32 | 0.59015 |
| 39 | −73.27989 | 3.496 | | | |
| 40 | 78.03169 | 3.923 | 1.63980 | 34.47 | 0.59233 |
| 41 | −78.02873 | 0.300 | | | |
| 42 | ∞ | 1.320 | 1.51633 | 64.14 | |
| 43 | ∞ | 33.000 | 1.60859 | 46.44 | |
| 44 | ∞ | 13.200 | 1.51633 | 64.14 | |
| 45 | ∞ | 10.843 | | | |

TABLE 10

Example 3 - Specifications (d-line)

| | Wide-Angle End | Middle | Telephoto End |
|---|---|---|---|
| Zoom Magnification | 1.0 | 5.0 | 21.3 |
| f | 8.284 | 41.419 | 176.443 |
| Bf | 41.235 | 41.235 | 41.235 |
| FNo. | 1.86 | 1.86 | 2.61 |
| 2ω[°] | 73.6 | 15.0 | 3.6 |

TABLE 11

Example 3 - Distances Relating to Zoom

| | Wide-Angle End | Middle | Telephoto End |
|---|---|---|---|
| DD[12] | 1.000 | 46.303 | 61.612 |
| DD[19] | 3.477 | 6.475 | 1.116 |
| DD[22] | 64.172 | 6.827 | 7.559 |
| DD[25] | 9.844 | 14.570 | 1.057 |
| DD[31] | 36.430 | 40.747 | 43.580 |

TABLE 12

Example 3 - Aspheric Coefficients

| | Surface No. | | |
|---|---|---|---|
| | 3 | 10 | 13 |
| KA | 9.8642991E−01 | 1.0000000E+00 | 1.0000000E+00 |
| A4 | −2.0443737E−07 | −1.9759793E−07 | −4.0111936E−07 |
| A6 | 5.2113987E−10 | 4.2538645E−10 | 4.2284834E−08 |
| A8 | −1.3220805E−12 | −1.0780417E−12 | −1.4832394E−09 |
| A10 | 2.0695939E−15 | 1.6879171E−15 | 2.6890060E−11 |
| A12 | −2.0822425E−18 | −1.7028166E−18 | −2.8226533E−13 |
| A14 | 1.3462273E−21 | 1.1101349E−21 | 1.7626695E−15 |
| A16 | −5.3947012E−25 | −4.5208828E−25 | −6.4576452E−18 |
| A18 | 1.2172155E−28 | 1.0465917E−28 | 1.2803584E−20 |
| A20 | −1.1801314E−32 | −1.0527363E−32 | −1.0616712E−23 |

Figure 4:
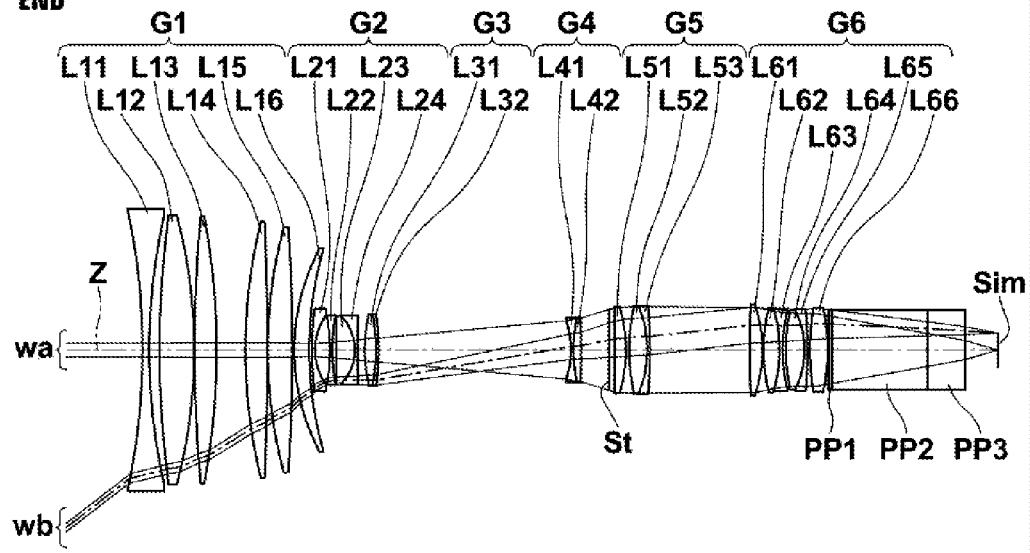
FIG. 4 is a sectional view illustrating the lens configuration of a zoom lens of Example 4 of the disclosure.
Figure 4:
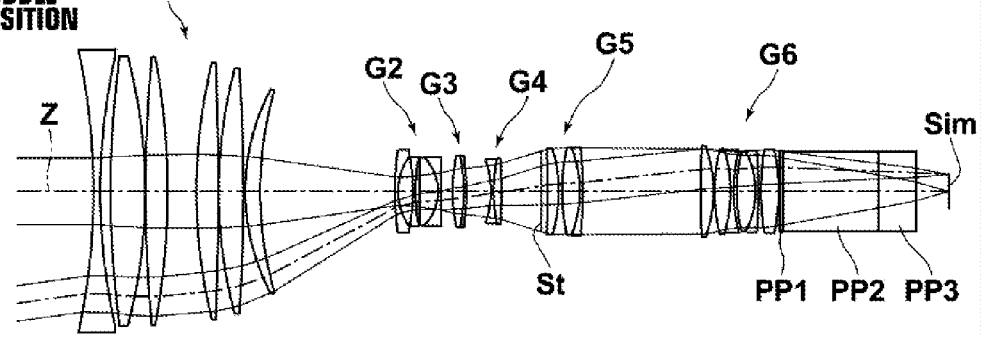
Figure 4:
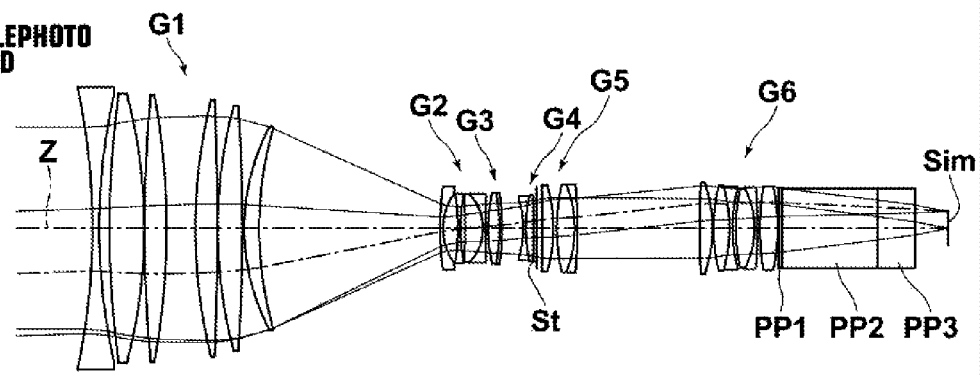
Figure 17:
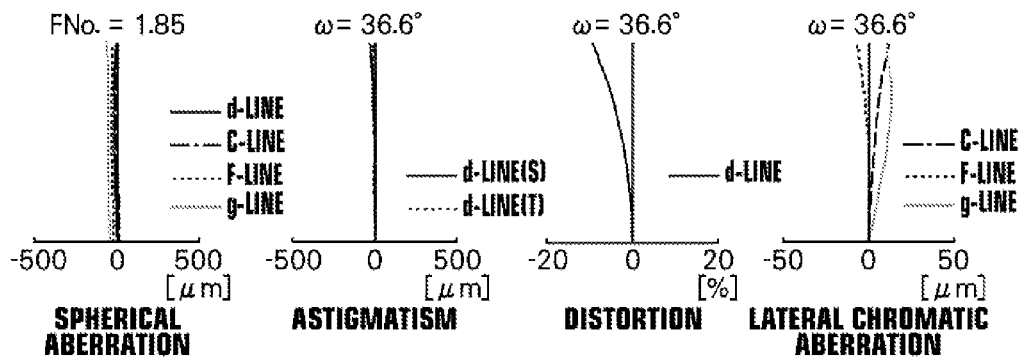
FIG. 17 shows aberration diagrams of the zoom lens of Example 4 of the disclosure.
Figure 17:
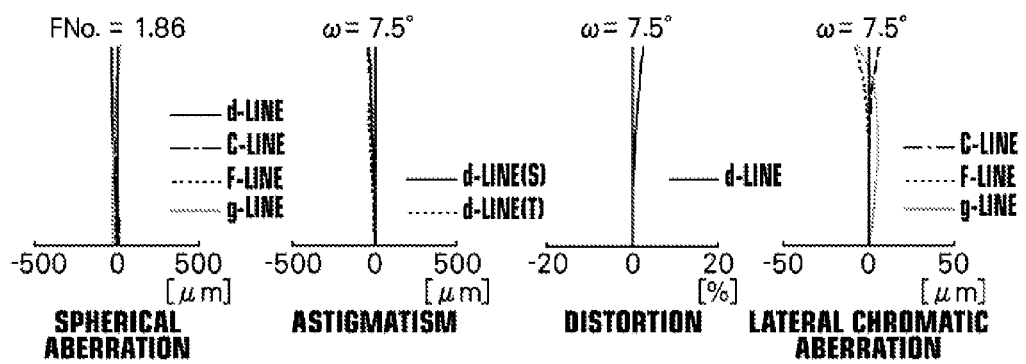
Figure 17:
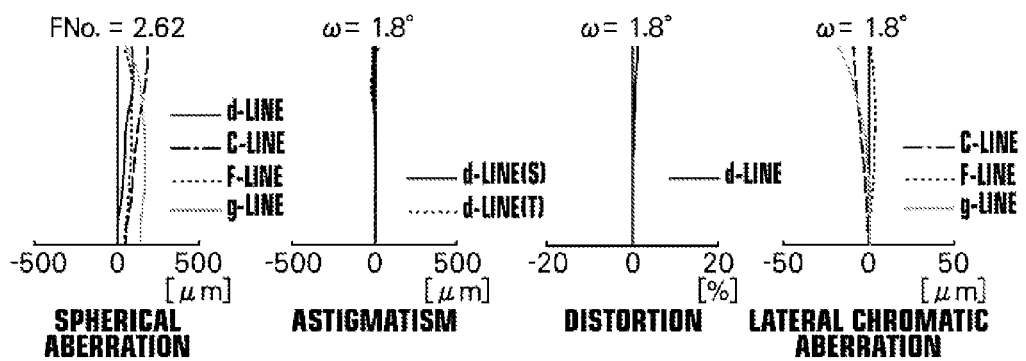

Next, a zoom lens of Example 4 is described. FIG. 4 is a sectional view illustrating the lens configuration of the zoom lens of Example 4. Table 13 shows basic lens data of the zoom lens of Example 4, Table 14 shows data about specifications of the zoom lens, Table 15 shows data about distances between the surfaces to be moved of the zoom lens, Table 16 shows data about aspheric coefficients of the zoom lens, and FIG. 17 shows aberration diagrams of the zoom lens.

TABLE 13

Example 4 - Lens Data (n and ν are with respect to the d-line)

| Surface No. | Radius of Curvature | Surface Distance | n | ν | θg F |
|---|---|---|---|---|---|
| 1 | −215.80213 | 2.400 | 1.80610 | 33.27 | 0.58845 |
| 2 | 197.18326 | 3.536 | | | |
| *3 | 286.13212 | 12.062 | 1.43700 | 95.10 | 0.53364 |
| 4 | −169.87346 | 0.120 | | | |
| 5 | 468.28744 | 7.608 | 1.43387 | 95.18 | 0.53733 |
| 6 | −237.75126 | 10.068 | | | |
| 7 | 173.44060 | 7.603 | 1.43387 | 95.18 | 0.53733 |
| 8 | −933.36907 | 0.120 | | | |
| 9 | 153.84105 | 8.478 | 1.53775 | 74.70 | 0.53936 |
| *10 | −772.13699 | 0.763 | | | |
| 11 | 70.59065 | 5.113 | 1.72916 | 54.68 | 0.54451 |
| 12 | 117.64788 | DD[12] | | | |
| *13 | 96.67033 | 1.060 | 2.00069 | 25.46 | 0.61364 |
| 14 | 19.42359 | 5.137 | | | |
| 15 | −67.14845 | 0.900 | 1.88300 | 40.76 | 0.56679 |
| 16 | 59.16002 | 1.548 | | | |
| 17 | −412.66853 | 6.296 | 1.89286 | 20.36 | 0.63944 |
| 18 | −15.92209 | 0.900 | 1.90043 | 37.37 | 0.57720 |
| 19 | 257.03997 | DD[19] | | | |
| 20 | 53.39111 | 3.882 | 1.59730 | 41.60 | 0.57452 |
| 21 | −58.64128 | 0.900 | 1.88663 | 24.45 | 0.61669 |
| 22 | −82.21521 | DD[22] | | | |
| 23 | −31.03266 | 0.910 | 1.76342 | 47.58 | 0.55678 |
| 24 | 47.13178 | 2.659 | 1.89286 | 20.36 | 0.63944 |
| 25 | −467.71125 | DD[25] | | | |
| 26 (stop) | ∞ | 2.000 | | | |
| 27 | −627.83665 | 3.907 | 1.91082 | 35.25 | 0.58224 |
| 28 | −48.40704 | 1.193 | | | |
| 29 | 65.76256 | 6.218 | 1.52335 | 75.53 | 0.52235 |
| 30 | −37.43405 | 1.000 | 1.95375 | 32.32 | 0.59015 |
| 31 | −150.88652 | DD[31] | | | |
| 32 | 359.69355 | 4.320 | 1.54302 | 51.62 | 0.55747 |
| 33 | −45.25678 | 0.397 | | | |
| 34 | 54.81142 | 5.555 | 1.53775 | 74.70 | 0.53936 |
| 35 | −47.59417 | 1.000 | 1.95375 | 32.32 | 0.59015 |
| 36 | 49.35996 | 1.163 | | | |
| 37 | 56.75001 | 6.492 | 1.59854 | 64.49 | 0.53662 |
| 38 | −28.37608 | 1.000 | 1.91082 | 35.25 | 0.58224 |
| 39 | −157.17605 | 0.911 | | | |
| 40 | 84.46724 | 6.150 | 1.71293 | 29.59 | 0.59942 |
| 41 | −66.65386 | 0.300 | | | |
| 42 | ∞ | 1.320 | 1.51633 | 64.14 | |
| 43 | ∞ | 33.000 | 1.60859 | 46.44 | |
| 44 | ∞ | 13.200 | 1.51633 | 64.14 | |
| 45 | ∞ | 11.308 | | | |

TABLE 14

Example 4 - Specifications (d-line)

| | Wide-Angle End | Middle | Telephoto End |
|---|---|---|---|
| Zoom Magnification | 1.0 | 5.0 | 21.3 |
| f | 8.285 | 41.426 | 176.476 |
| Bf | 41.700 | 41.700 | 41.700 |
| FNo. | 1.85 | 1.86 | 2.62 |
| 2ω[°] | 73.2 | 15.0 | 3.6 |

TABLE 15

Example 4 - Distances Relating to Zoom

| | Wide-Angle End | Middle | Telephoto End |
|---|---|---|---|
| DD[12] | 0.959 | 46.864 | 62.843 |
| DD[19] | 2.572 | 4.118 | 0.944 |
| DD[22] | 66.748 | 8.580 | 7.324 |
| DD[25] | 9.663 | 14.020 | 1.004 |
| DD[31] | 34.652 | 41.012 | 42.479 |

TABLE 16

Example 4 - Aspheric Coefficients

| | Surface No. | | |
|---|---|---|---|
| | 3 | 10 | 13 |
| KA | 1.0000000E+00 | 1.0000000E+00 | 1.0000000E+00 |
| A4 | −1.0465170E−07 | −1.0062442E−07 | −6.4190054E−07 |
| A6 | 5.6987961E−11 | 2.7005383E−11 | 4.7400807E−08 |
| A8 | −2.8898590E−13 | −1.4801685E−13 | −2.0579091E−09 |
| A10 | 5.7325201E−16 | 2.6853378E−16 | 4.4913360E−11 |
| A12 | −6.4439975E−19 | −2.5432327E−19 | −5.6865417E−13 |
| A14 | 4.3925069E−22 | 1.3454316E−22 | 4.3490232E−15 |
| A16 | −1.7896856E−25 | −3.7325840E−26 | −1.9879790E−17 |
| A18 | 3.9890887E−29 | 4.1841771E−30 | 5.0102091E−20 |
| A20 | −3.7177421E−33 | — | −5.3628464E−23 |

Figure 5:
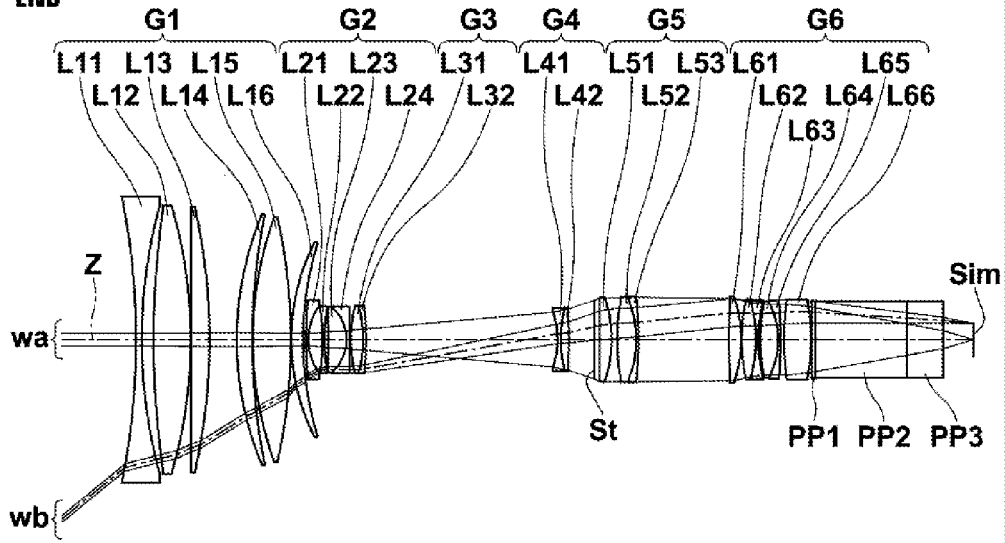
FIG. 5 is a sectional view illustrating the lens configuration of a zoom lens of Example 5 of the disclosure.
Figure 5:
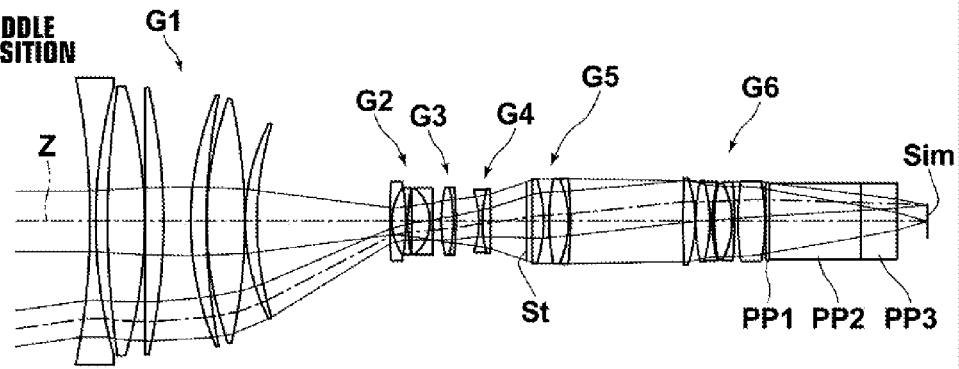
Figure 5:
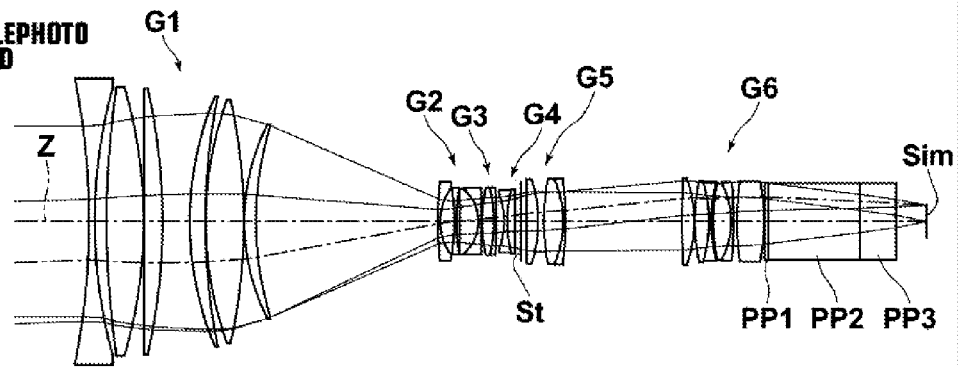
Figure 18:
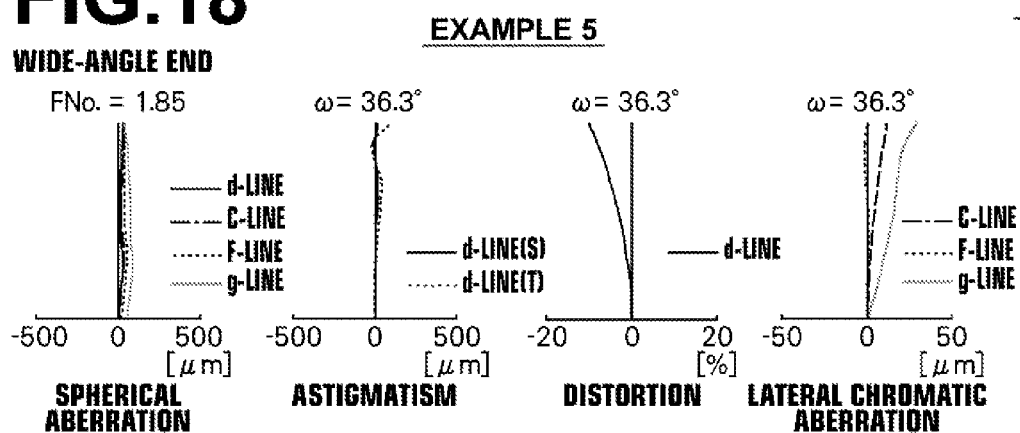
FIG. 18 shows aberration diagrams of the zoom lens of Example 5 of the disclosure.
Figure 18:
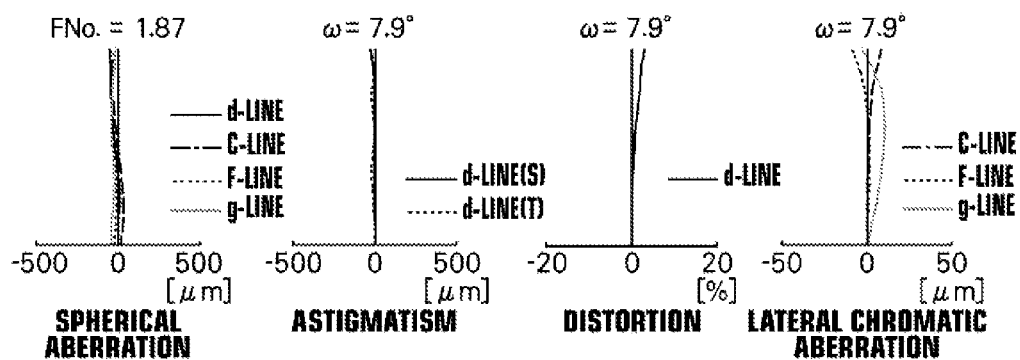
Figure 18:
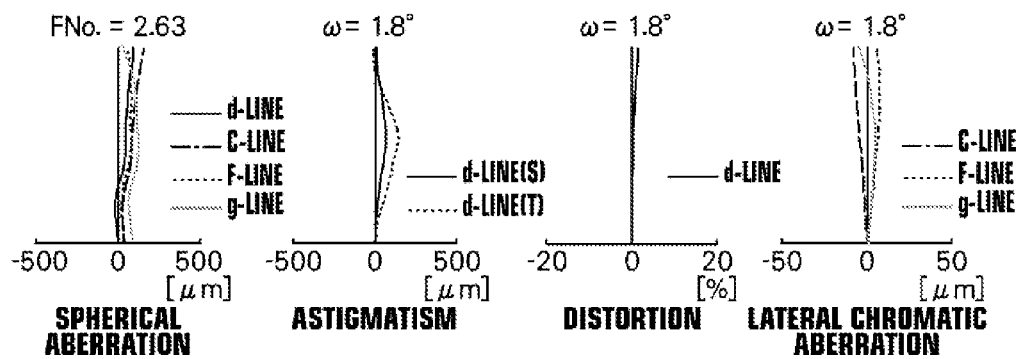

Next, a zoom lens of Example 5 is described. FIG. 5 is a sectional view illustrating the lens configuration of the zoom lens of Example 5. Table 17 shows basic lens data of the zoom lens of Example 5, Table 18 shows data about specifications of the zoom lens, Table 19 shows data about distances between the surfaces to be moved of the zoom lens, Table 20 shows data about aspheric coefficients of the zoom lens, and FIG. 18 shows aberration diagrams of the zoom lens.

TABLE 17

Example 5 - Lens Data (n and ν are with respect to the d-line)

| Surface No. | Radius of Curvature | Surface Distance | n | ν | θg F |
|---|---|---|---|---|---|
| 1 | −240.25167 | 2.000 | 1.80610 | 33.27 | 0.58845 |
| 2 | 169.87028 | 4.254 | | | |

TABLE 17-continued

Example 5 - Lens Data (n and ν are with respect to the d-line)

| Surface No. | Radius of Curvature | Surface Distance | n | ν | θg F |
|---|---|---|---|---|---|
| *3 | 269.30524 | 13.458 | 1.43700 | 95.10 | 0.53364 |
| 4 | −161.30887 | 0.120 | | | |
| 5 | 18447.86359 | 6.699 | 1.43387 | 95.18 | 0.53733 |
| 6 | −204.17917 | 9.919 | | | |
| 7 | 109.59520 | 5.605 | 1.43387 | 95.18 | 0.53733 |
| 8 | 212.78561 | 0.162 | | | |
| 9 | 120.87764 | 13.801 | 1.43387 | 95.18 | 0.53733 |
| 10 | −188.62332 | 0.162 | | | |
| *11 | 72.67343 | 4.233 | 1.80400 | 46.58 | 0.55730 |
| 12 | 109.82011 | DD[12] | | | |
| *13 | 165.65756 | 0.800 | 2.00100 | 29.13 | 0.59952 |
| 14 | 19.42359 | 5.062 | | | |
| 15 | −77.73338 | 0.800 | 1.90043 | 37.37 | 0.57720 |
| 16 | 65.70080 | 1.325 | | | |
| 17 | −305.64252 | 6.630 | 1.89286 | 20.36 | 0.63944 |
| 18 | −14.67054 | 1.000 | 1.90043 | 37.37 | 0.57720 |
| 19 | −3642.75074 | DD[19] | | | |
| 20 | 49.86597 | 4.366 | 1.60250 | 52.58 | 0.55628 |
| 21 | −45.46259 | 1.000 | 1.67101 | 32.80 | 0.59182 |
| 22 | −115.88465 | DD[22] | | | |
| 23 | −28.76871 | 1.173 | 1.78814 | 41.50 | 0.57014 |
| 24 | 40.96821 | 2.906 | 1.89286 | 20.36 | 0.63944 |
| *25 | −620.90513 | DD[25] | | | |
| 26 (stop) | ∞ | 2.074 | | | |
| 27 | 33053.85083 | 4.183 | 1.91082 | 35.25 | 0.58224 |
| 28 | −45.63857 | 2.053 | | | |
| 29 | 73.56575 | 6.964 | 1.53165 | 53.78 | 0.55387 |
| 30 | −35.51276 | 0.800 | 2.00000 | 28.00 | 0.60493 |
| 31 | −119.46400 | DD[31] | | | |
| 32 | 350.84398 | 4.371 | 1.54223 | 70.57 | 0.52944 |
| 33 | −44.80815 | 0.178 | | | |
| 34 | 60.90289 | 5.190 | 1.53337 | 73.90 | 0.52467 |
| 35 | −45.52387 | 0.800 | 1.95375 | 32.32 | 0.59015 |
| 36 | 50.43866 | 0.797 | | | |
| 37 | 64.32820 | 6.404 | 1.62489 | 60.17 | 0.54224 |
| 38 | −28.10641 | 0.905 | 1.91082 | 35.25 | 0.58224 |
| 39 | −145.26797 | 1.239 | | | |
| 40 | 90.28889 | 9.774 | 1.75213 | 27.89 | 0.60421 |
| 41 | −68.30829 | 0.300 | | | |
| 42 | ∞ | 1.320 | 1.51633 | 64.14 | |
| 43 | ∞ | 33.000 | 1.60859 | 46.44 | |
| 44 | ∞ | 13.200 | 1.51633 | 64.14 | |
| 45 | ∞ | 11.017 | | | |

TABLE 18

Example 5 - Specifications (d-line)

| | Wide-Angle End | Middle | Telephoto End |
|---|---|---|---|
| Zoom Magnification | 1.0 | 5.0 | 22.1 |
| f | 7.880 | 39.398 | 174.141 |
| Bf | 41.408 | 41.408 | 41.408 |
| FNo. | 1.85 | 1.87 | 2.63 |
| 2ω[°] | 76.6 | 15.8 | 3.6 |

TABLE 19

Example 5 - Distances Relating to Zoom

| | Wide-Angle End | Middle | Telephoto End |
|---|---|---|---|
| DD[12] | 1.135 | 48.048 | 65.918 |
| DD[19] | 0.657 | 3.054 | 0.286 |
| DD[22] | 69.393 | 8.344 | 2.587 |
| DD[25] | 9.186 | 13.026 | 2.087 |
| DD[31] | 32.780 | 40.679 | 42.272 |

TABLE 20

Example 5 - Aspheric Coefficients

| | Surface No. | | |
|---|---|---|---|
| | 3 | 11 | 13 |
| KA | 1.0000000E+00 | 1.0000000E+00 | 1.0000000E+00 |
| A4 | −2.7088112E−07 | 8.6195898E−08 | 2.4539169E−06 |
| A6 | 8.4081080E−10 | −5.3096656E−10 | −2.7230169E−08 |
| A8 | −2.1558352E−12 | 1.4072359E−12 | 4.7911782E−10 |
| A10 | 3.3033945E−15 | −2.2955408E−15 | −7.9564470E−12 |
| A12 | −3.1994957E−18 | 2.3772788E−18 | 1.0289046E−13 |
| A14 | 1.9687357E−21 | −1.5654736E−21 | −8.8507685E−16 |
| A16 | −7.4522783E−25 | 6.2026508E−25 | 4.6071065E−18 |
| A18 | 1.5802652E−28 | −1.2695111E−28 | −1.3078324E−20 |
| A20 | −1.4348776E−32 | 8.3529995E−33 | 1.5517302E−23 |

| | Surface No. 25 |
|---|---|
| KA | 1.0000000E+00 |
| A4 | 2.0740789E−06 |
| A6 | −1.6500349E−07 |
| A8 | 7.1697692E−09 |
| A10 | −1.8667418E−10 |
| A12 | 3.0344013E−12 |
| A14 | −3.1035910E−14 |
| A16 | 1.9396811E−16 |
| A18 | −6.7635354E−19 |
| A20 | 1.0080293E−21 |

Figure 6:
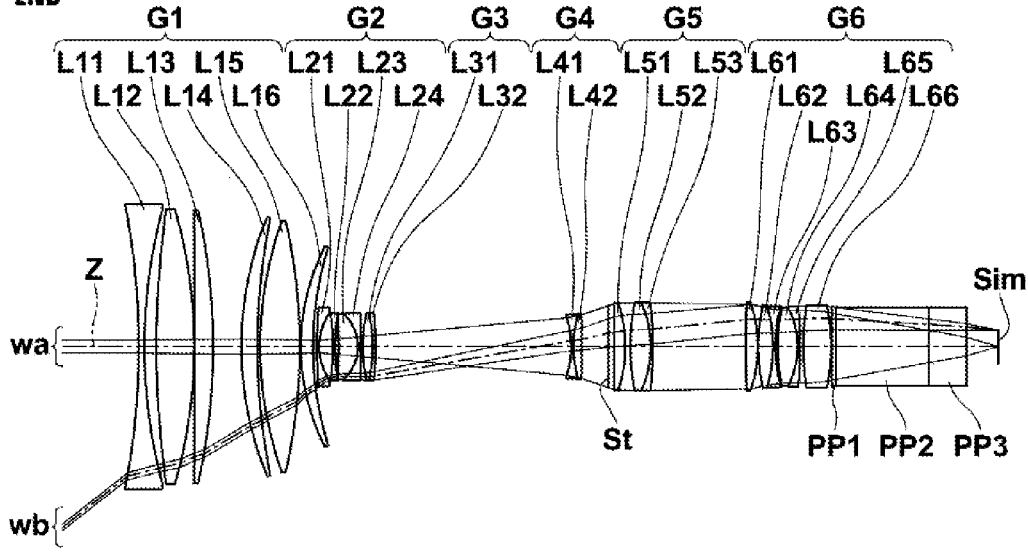
FIG. 6 is a sectional view illustrating the lens configuration of a zoom lens of Example 6 of the disclosure.
Figure 6:
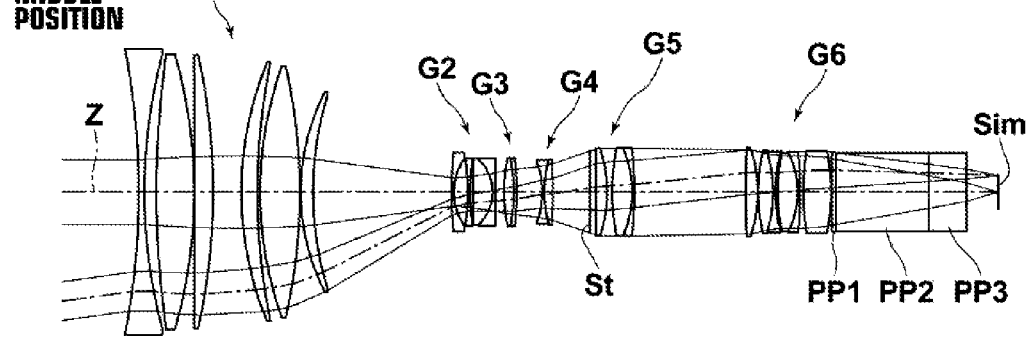
Figure 6:
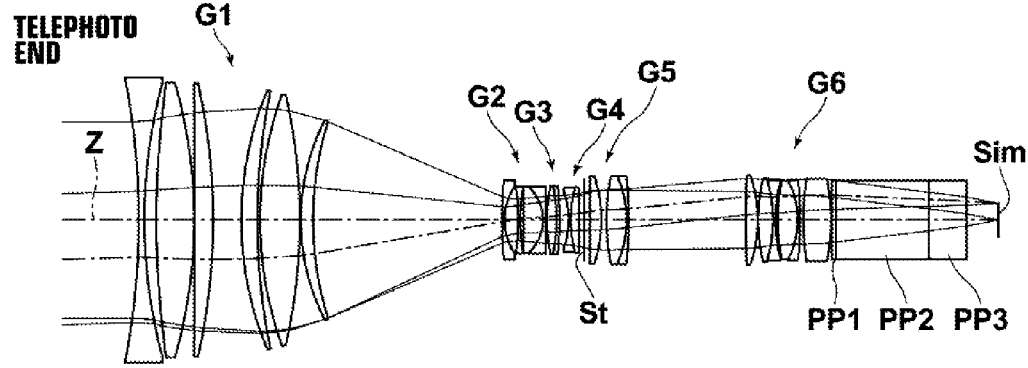
Figure 19:
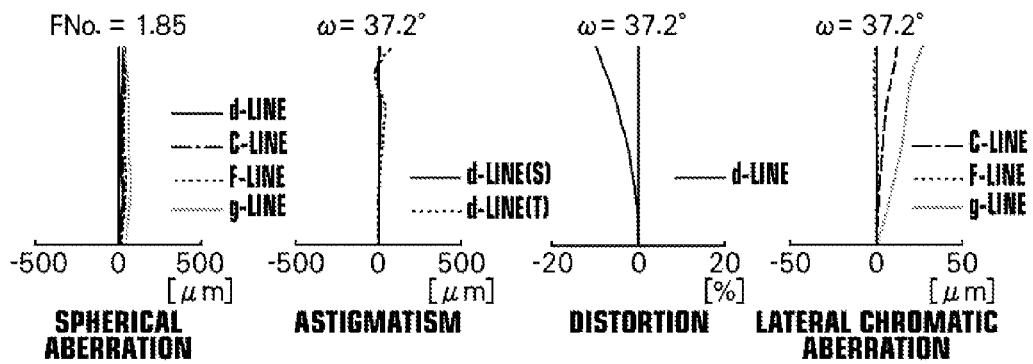
FIG. 19 shows aberration diagrams of the zoom lens of Example 6 of the disclosure.
Figure 19:
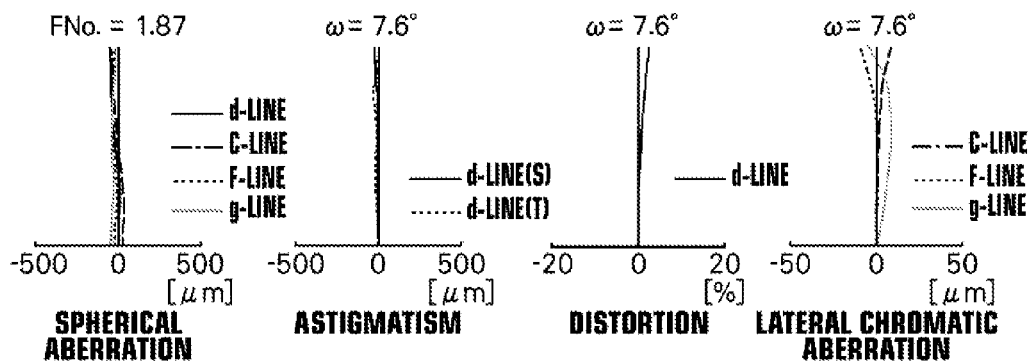
Figure 19:
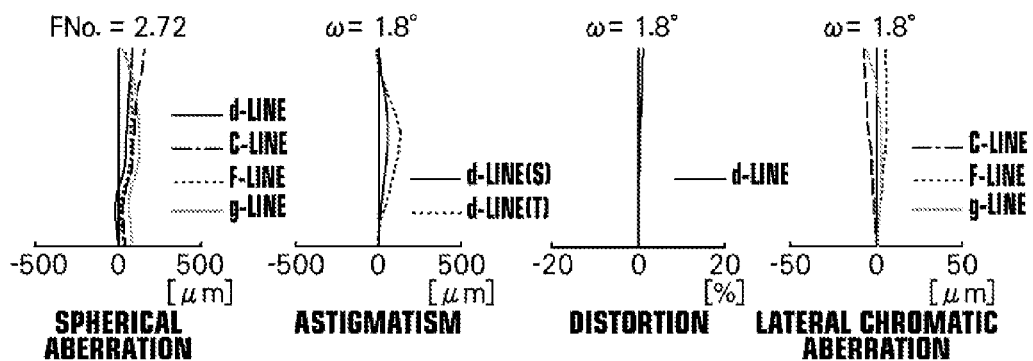

Next, a zoom lens of Example 6 is described. FIG. 6 is a sectional view illustrating the lens configuration of the zoom lens of Example 6. Table 21 shows basic lens data of the zoom lens of Example 6, Table 22 shows data about specifications of the zoom lens, Table 23 shows data about distances between the surfaces to be moved of the zoom lens, Table 24 shows data about aspheric coefficients of the zoom lens, and FIG. 19 shows aberration diagrams of the zoom lens.

TABLE 21

Example 6 - Lens Data (n and ν are with respect to the d-line)

| Surface No. | Radius of Curvature | Surface Distance | n | ν | θg F |
|---|---|---|---|---|---|
| 1 | −242.16434 | 2.000 | 1.80610 | 33.27 | 0.58845 |
| 2 | 173.93400 | 4.173 | | | |
| *3 | 272.29046 | 13.395 | 1.43700 | 95.10 | 0.53364 |
| 4 | −162.21076 | 0.120 | | | |
| 5 | −8742.13697 | 6.525 | 1.43387 | 95.18 | 0.53733 |
| 6 | −207.09108 | 10.052 | | | |
| 7 | 111.38647 | 5.652 | 1.43387 | 95.18 | 0.53733 |
| 8 | 215.11569 | 0.919 | | | |
| 9 | 123.03541 | 14.053 | 1.43387 | 95.18 | 0.53733 |
| 10 | −183.12985 | 0.348 | | | |
| *11 | 72.29848 | 4.311 | 1.80400 | 46.58 | 0.55730 |
| 12 | 107.76577 | DD[12] | | | |
| *13 | 163.71211 | 0.800 | 2.00100 | 29.13 | 0.59952 |
| 14 | 19.42359 | 4.859 | | | |
| 15 | −77.10953 | 0.800 | 1.90043 | 37.37 | 0.57720 |
| 16 | 66.58048 | 1.211 | | | |
| 17 | −297.83021 | 6.804 | 1.89286 | 20.36 | 0.63944 |
| 18 | −14.78641 | 1.000 | 1.90043 | 37.37 | 0.57720 |
| 19 | −3067.67451 | DD[19] | | | |
| 20 | 49.41699 | 3.481 | 1.60189 | 55.31 | 0.55173 |
| 21 | −55.88589 | 1.000 | 1.67898 | 32.30 | 0.59299 |
| 22 | −117.64884 | DD[22] | | | |
| 23 | −29.16163 | 0.810 | 1.78695 | 41.92 | 0.56913 |
| 24 | 41.44742 | 2.843 | 1.89286 | 20.36 | 0.63944 |
| *25 | −652.12092 | DD[25] | | | |
| 26 (stop) | ∞ | 2.000 | | | |
| 27 | 19851.88864 | 4.053 | 1.91082 | 35.25 | 0.58224 |
| 28 | −45.72411 | 1.827 | | | |
| 29 | 73.12128 | 7.093 | 1.53277 | 53.78 | 0.55392 |

TABLE 21-continued

Example 6 - Lens Data (n and ν are with respect to the d-line)

| Surface No. | Radius of Curvature | Surface Distance | n | ν | θg F |
|---|---|---|---|---|---|
| 30 | −35.39990 | 0.800 | 2.00000 | 28.00 | 0.60493 |
| 31 | −120.36912 | DD[31] | | | |
| 32 | 351.81506 | 4.185 | 1.54293 | 68.86 | 0.53196 |
| 33 | −44.74539 | 0.167 | | | |
| 34 | 61.00684 | 5.258 | 1.53388 | 72.31 | 0.52698 |
| 35 | −45.60702 | 0.827 | 1.95375 | 32.32 | 0.59015 |
| 36 | 50.45295 | 0.860 | | | |
| 37 | 64.25792 | 7.023 | 1.62331 | 60.71 | 0.54140 |
| 38 | −28.11406 | 0.810 | 1.91082 | 35.25 | 0.58224 |
| 39 | −147.46395 | 1.218 | | | |
| 40 | 90.44283 | 9.761 | 1.75179 | 28.06 | 0.60381 |
| 41 | −68.35612 | 0.300 | | | |
| 42 | ∞ | 1.320 | 1.51633 | 64.14 | |
| 43 | ∞ | 33.000 | 1.60859 | 46.44 | |
| 44 | ∞ | 13.200 | 1.51633 | 64.14 | |
| 45 | ∞ | 11.194 | | | |

TABLE 22

Example 6 - Specifications (d-line)

| | Wide-Angle End | Middle | Telephoto End |
|---|---|---|---|
| Zoom Magnification | 1.0 | 5.0 | 22.1 |
| f | 8.180 | 40.902 | 180.787 |
| Bf | 41.585 | 41.585 | 41.585 |
| FNo. | 1.85 | 1.87 | 2.72 |
| 2ω[°] | 74.4 | 15.2 | 3.6 |

TABLE 23

Example 6 - Distances Relating to Zoom

| | Wide-Angle End | Middle | Telephoto End |
|---|---|---|---|
| DD[12] | 1.357 | 48.949 | 66.813 |
| DD[19] | 0.688 | 3.001 | 0.208 |
| DD[22] | 69.208 | 9.059 | 3.263 |
| DD[25] | 9.388 | 13.185 | 1.903 |
| DD[31] | 32.854 | 39.301 | 41.308 |

TABLE 24

Example 6 - Aspheric Coefficients

| | Surface No. | | |
|---|---|---|---|
| | 3 | 11 | 13 |
| KA | 1.0000000E+00 | 1.0000000E+00 | 1.0000000E+00 |
| A4 | −2.4107862E−07 | 6.8498898E−08 | 1.7571788E−06 |
| A6 | 6.6204043E−10 | −4.5258348E−10 | −6.4598450E−09 |
| A8 | −1.7130024E−12 | 1.2570427E−12 | −1.5013996E−10 |
| A10 | 2.6402399E−15 | −2.1935914E−15 | 4.2178872E−12 |
| A12 | −2.5718336E−18 | 2.4847262E−18 | −4.4493537E−14 |
| A14 | 1.5907804E−21 | −1.8384395E−21 | 2.0629067E−16 |
| A16 | −6.0511891E−25 | 8.5035347E−25 | −1.1883197E−19 |
| A18 | 1.2894778E−28 | −2.1903144E−28 | −2.2780455E−21 |
| A20 | −1.1769665E−32 | 2.3015675E−32 | 5.7066079E−24 |

| | Surface No. 25 |
|---|---|
| KA | 1.0000000E+00 |
| A4 | 1.7765879E−06 |
| A6 | −1.4254936E−07 |
| A8 | 6.2125206E−09 |
| A10 | −1.6284104E−10 |

TABLE 24-continued

Example 6 - Aspheric Coefficients

| A12 | 2.6654383E−12 |
| A14 | −2.7438886E−14 |
| A16 | 1.7252189E−16 |
| A18 | −6.0507337E−19 |
| A20 | 9.0707385E−22 |

Figure 7:
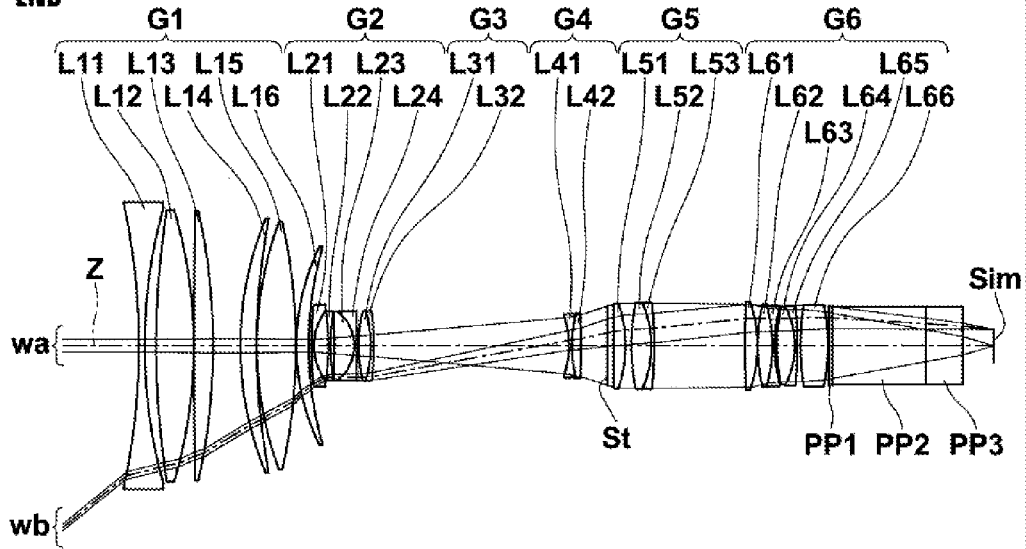
FIG. 7 is a sectional view illustrating the lens configuration of a zoom lens of Example 7 of the disclosure.
Figure 7:
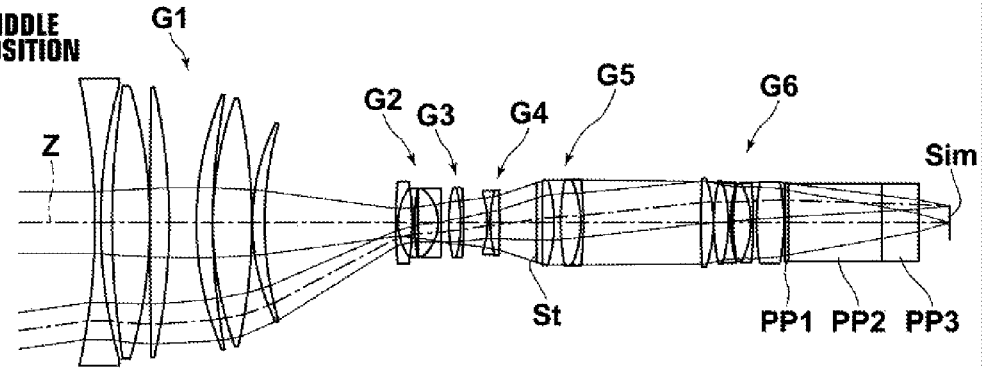
Figure 7:
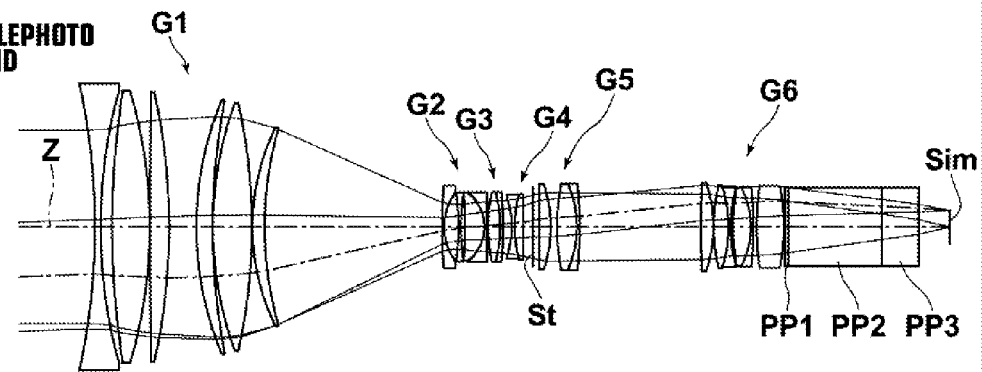
Figure 20:
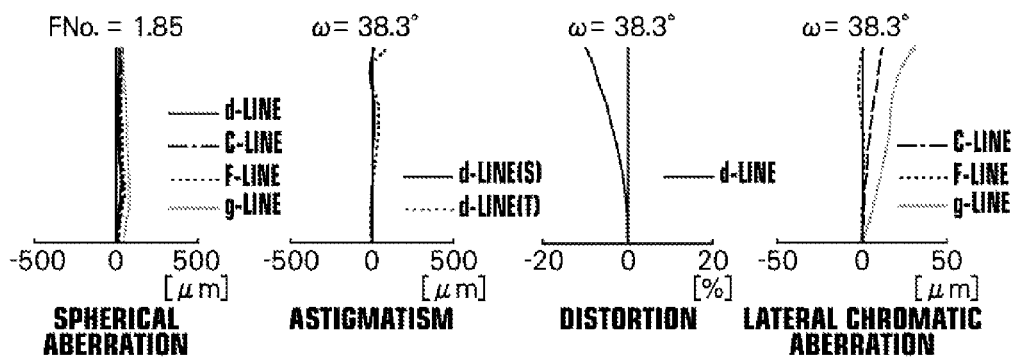
FIG. 20 shows aberration diagrams of the zoom lens of Example 7 of the disclosure.
Figure 20:
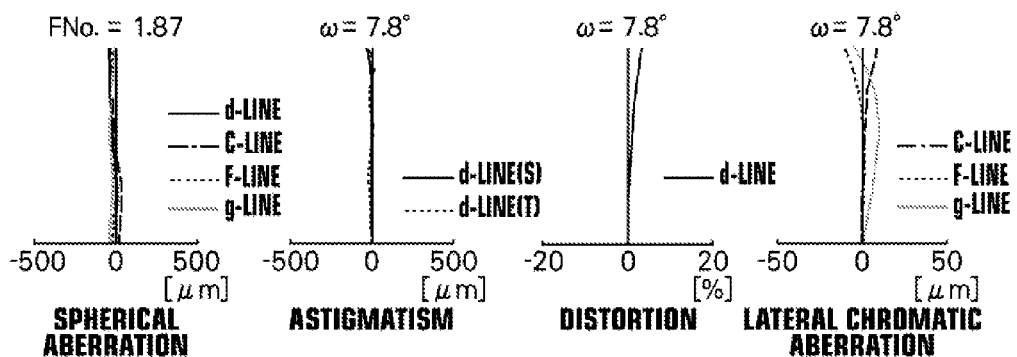
Figure 20:
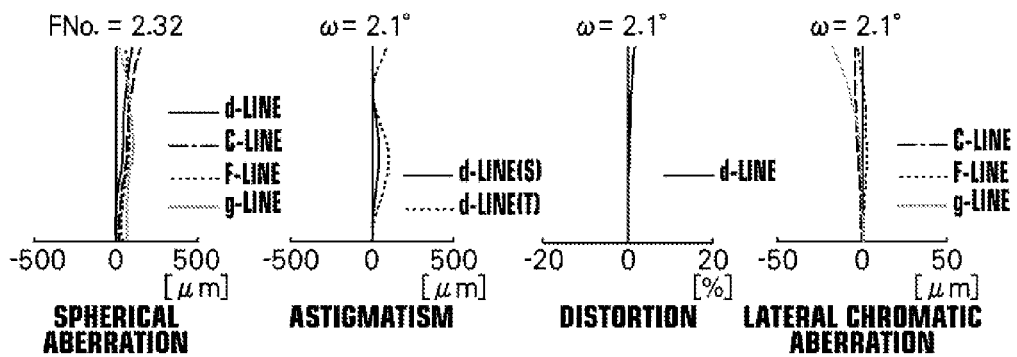

Next, a zoom lens of Example 7 is described. FIG. 7 is a sectional view illustrating the lens configuration of the zoom lens of Example 7. Table 25 shows basic lens data of the zoom lens of Example 7, Table 26 shows data about specifications of the zoom lens, Table 27 shows data about distances between the surfaces to be moved of the zoom lens, Table 28 shows data about aspheric coefficients of the zoom lens, and FIG. 20 shows aberration diagrams of the zoom lens.

TABLE 25

Example 7 - Lens Data (n and ν are with respect to the d-line)

| Surface No. | Radius of Curvature | Surface Distance | n | ν | θg F |
|---|---|---|---|---|---|
| 1 | −221.32714 | 2.000 | 1.80610 | 33.27 | 0.58845 |
| 2 | 167.46923 | 4.112 | | | |
| *3 | 255.65874 | 13.370 | 1.43700 | 95.10 | 0.53364 |
| 4 | −158.00487 | 0.120 | | | |
| 5 | 2982.92764 | 6.764 | 1.43387 | 95.18 | 0.53733 |
| 6 | −204.05083 | 9.657 | | | |
| 7 | 109.06860 | 5.753 | 1.43387 | 95.18 | 0.53733 |
| 8 | 218.65393 | 0.120 | | | |
| 9 | 118.15584 | 13.856 | 1.43387 | 95.18 | 0.53733 |
| 10 | −188.82046 | 0.212 | | | |
| *11 | 74.66825 | 4.295 | 1.80400 | 46.58 | 0.55730 |
| 12 | 118.02937 | DD[12] | | | |
| *13 | 163.20635 | 0.800 | 2.00100 | 29.13 | 0.59952 |
| 14 | 19.42359 | 5.112 | | | |
| 15 | −78.68260 | 0.800 | 1.90043 | 37.37 | 0.57720 |
| 16 | 65.77577 | 1.327 | | | |
| 17 | −330.23329 | 7.040 | 1.89286 | 20.36 | 0.63944 |
| 18 | −14.72362 | 1.000 | 1.90043 | 37.37 | 0.57720 |
| 19 | −2158.87394 | DD[19] | | | |
| 20 | 50.04896 | 4.292 | 1.60342 | 55.12 | 0.55200 |
| 21 | −42.92221 | 1.000 | 1.67044 | 35.93 | 0.58570 |
| 22 | −116.23916 | DD[22] | | | |
| 23 | −28.79905 | 1.033 | 1.78123 | 42.08 | 0.56908 |
| 24 | 41.15892 | 3.131 | 1.89286 | 20.36 | 0.63944 |
| *25 | −623.57369 | DD[25] | | | |
| 26 (stop) | ∞ | 2.140 | | | |
| 27 | 9382.96068 | 4.130 | 1.91082 | 35.25 | 0.58224 |
| 28 | −46.27122 | 2.260 | | | |
| 29 | 74.40125 | 7.068 | 1.53028 | 54.33 | 0.55301 |
| 30 | −35.56938 | 1.009 | 2.00000 | 28.00 | 0.60493 |
| 31 | −123.93052 | DD[31] | | | |
| 32 | 357.10727 | 4.452 | 1.54512 | 63.05 | 0.54056 |
| 33 | −44.82436 | 0.120 | | | |
| 34 | 61.39706 | 5.184 | 1.54161 | 73.60 | 0.52499 |
| 35 | −45.61676 | 0.800 | 1.95375 | 32.32 | 0.59015 |
| 36 | 50.12688 | 0.831 | | | |
| 37 | 64.31314 | 6.279 | 1.62873 | 60.20 | 0.54192 |
| 38 | −28.10177 | 0.838 | 1.91082 | 35.25 | 0.58224 |
| 39 | −148.59148 | 1.235 | | | |
| 40 | 89.78181 | 9.652 | 1.75364 | 28.18 | 0.60357 |
| 41 | −68.31992 | 0.300 | | | |
| 42 | ∞ | 1.320 | 1.51633 | 64.14 | |
| 43 | ∞ | 33.000 | 1.60859 | 46.44 | |
| 44 | ∞ | 13.200 | 1.51633 | 64.14 | |
| 45 | ∞ | 11.020 | | | |

TABLE 26

Example 7 - Specifications (d-line)

|  | Wide-Angle End | Middle | Telephoto End |
|---|---|---|---|
| Zoom Magnification | 1.0 | 5.0 | 19.4 |
| f | 7.880 | 39.399 | 152.867 |
| Bf | 41.410 | 41.410 | 41.410 |
| Fno. | 1.85 | 1.87 | 2.32 |
| 2ω[°] | 76.6 | 15.6 | 4.2 |

TABLE 27

Example 7 - Distances Relating to Zoom

|  | Wide-Angle End | Middle | Telephoto End |
|---|---|---|---|
| DD[12] | 1.092 | 46.528 | 62.913 |
| DD[19] | 0.583 | 2.767 | 0.325 |
| DD[22] | 69.382 | 8.454 | 3.121 |
| DD[25] | 9.493 | 13.248 | 3.351 |
| DD[31] | 32.194 | 41.747 | 43.034 |

TABLE 28

Example 7 - Aspheric Coefficients

|  | Surface No. | | |
|---|---|---|---|
|  | 3 | 11 | 13 |
| KA | 1.0000000E+00 | 1.0000000E+00 | 1.0000000E+00 |
| A4 | −2.5564592E−07 | 6.7326409E−08 | 3.4981553E−06 |
| A6 | 8.7625592E−10 | −5.1505298E−10 | −6.9508793E−08 |
| A8 | −2.4663767E−12 | 1.3427831E−12 | 1.7566819E−09 |
| A10 | 4.0586420E−15 | −1.9062463E−15 | −2.9945070E−11 |
| A12 | −4.1707923E−18 | 1.3262432E−18 | 3.3148926E−13 |
| A14 | 2.7033116E−21 | −1.1180753E−22 | −2.3371986E−15 |
| A16 | −1.0726694E−24 | −4.8024125E−26 | 1.0067924E−17 |
| A18 | 2.3760476E−28 | 3.0871768E−28 | −2.4103735E−20 |
| A20 | −2.2476006E−32 | −6.2373913E−32 | 2.4554358E−23 |

|  | Surface No. 25 |
|---|---|
| KA | 1.0000000E+00 |
| A4 | 2.3082770E−06 |
| A6 | −1.7481760E−07 |
| A8 | 7.3522756E−09 |
| A10 | −1.8542504E−10 |
| A12 | 2.9312755E−12 |
| A14 | −2.9321338E−14 |
| A16 | 1.8038353E−16 |
| A18 | −6.2324869E−19 |
| A20 | 9.2617319E−22 |

TABLE 29

Example 8 - Lens Data (n and ν are with respect to the d-line)

| Surface No. | Radius of Curvature | Surface Distance | n | ν | θg F |
|---|---|---|---|---|---|
| 1 | −224.44217 | 2.000 | 1.80610 | 33.27 | 0.58845 |
| 2 | 184.74111 | 3.478 |  |  |  |
| *3 | 255.95001 | 13.139 | 1.43700 | 95.10 | 0.53364 |
| 4 | −167.70628 | 0.120 |  |  |  |
| 5 | 2176.65264 | 6.339 | 1.43387 | 95.18 | 0.53733 |
| 6 | −207.74351 | 10.221 |  |  |  |
| 7 | 112.19143 | 4.916 | 1.43387 | 95.18 | 0.53733 |
| 8 | 208.88617 | 0.141 |  |  |  |
| 9 | 123.52064 | 12.848 | 1.43387 | 95.18 | 0.53733 |
| 10 | −192.85031 | 0.471 |  |  |  |
| *11 | 75.23698 | 4.080 | 1.80400 | 46.58 | 0.55730 |
| 12 | 117.86517 | DD[12] |  |  |  |
| *13 | 170.91562 | 0.800 | 2.00100 | 29.13 | 0.59952 |
| 14 | 19.42359 | 4.762 |  |  |  |
| 15 | −76.88205 | 0.800 | 1.90043 | 37.37 | 0.57720 |
| 16 | 65.92338 | 1.434 |  |  |  |
| 17 | −326.87336 | 6.797 | 1.89286 | 20.36 | 0.63944 |
| 18 | −14.88527 | 1.000 | 1.90043 | 37.37 | 0.57720 |
| 19 | −1332.59849 | DD[19] |  |  |  |
| 20 | 50.11285 | 4.241 | 1.60514 | 54.19 | 0.55350 |
| 21 | −41.48801 | 1.000 | 1.67051 | 34.21 | 0.58906 |
| 22 | −116.83762 | DD[22] |  |  |  |
| 23 | −29.28056 | 0.997 | 1.78480 | 42.20 | 0.56855 |
| 24 | 40.59795 | 3.083 | 1.89286 | 20.36 | 0.63944 |
| *25 | −880.24260 | DD[25] |  |  |  |
| 26 (stop) | ∞ | 2.099 |  |  |  |
| 27 | 3213.98487 | 3.916 | 1.91082 | 35.25 | 0.58224 |
| 28 | −46.53364 | 1.511 |  |  |  |
| 29 | 73.43708 | 6.903 | 1.53805 | 53.53 | 0.55448 |
| 30 | −35.35261 | 0.800 | 1.99999 | 27.97 | 0.60506 |
| 31 | −122.40701 | DD[31] |  |  |  |
| 32 | 357.23489 | 4.577 | 1.54667 | 63.93 | 0.53925 |
| 33 | −44.79616 | 0.230 |  |  |  |
| 34 | 60.67153 | 5.302 | 1.54193 | 73.33 | 0.52538 |
| 35 | −45.54953 | 0.800 | 1.95375 | 32.32 | 0.59015 |
| 36 | 49.83686 | 0.708 |  |  |  |
| 37 | 65.36944 | 6.231 | 1.62965 | 60.05 | 0.54211 |
| 38 | −28.05082 | 0.800 | 1.91082 | 35.25 | 0.58224 |
| 39 | −146.62404 | 1.510 |  |  |  |
| 40 | 90.27138 | 10.059 | 1.75084 | 28.17 | 0.60353 |
| 41 | −69.16650 | 0.300 |  |  |  |
| 42 | ∞ | 1.320 | 1.51633 | 64.14 |  |
| 43 | ∞ | 33.000 | 1.60859 | 46.44 |  |
| 44 | ∞ | 13.200 | 1.51633 | 64.14 |  |
| 45 | ∞ | 10.831 |  |  |  |

TABLE 30

Example 8 - Specifications (d-line)

|  | Wide-Angle End | Middle | Telephoto End |
|---|---|---|---|
| Zoom Magnification | 1.0 | 5.0 | 19.4 |
| f | 8.185 | 40.923 | 158.782 |
| Bf | 41.221 | 41.221 | 41.221 |
| FNo. | 1.85 | 1.86 | 2.37 |
| 2ω[°] | 74.4 | 15.2 | 4.0 |

TABLE 31

Example 8 - Distances Relating to Zoom

|  | Wide-Angle End | Middle | Telephoto End |
|---|---|---|---|
| DD[12] | 1.336 | 48.663 | 65.527 |
| DD[19] | 1.004 | 2.944 | 0.517 |
| DD[22] | 68.225 | 8.286 | 3.223 |
| DD[25] | 9.160 | 12.934 | 3.335 |
| DD[31] | 32.187 | 39.084 | 39.311 |

Figure 8:
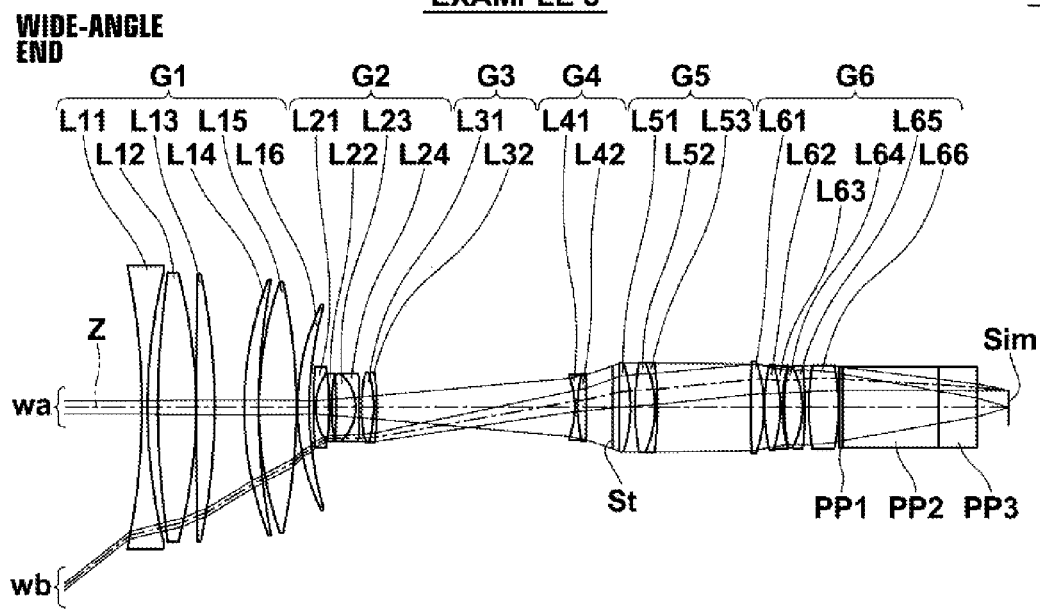
FIG. 8 is a sectional view illustrating the lens configuration of a zoom lens of Example 8 of the disclosure.
Figure 8:
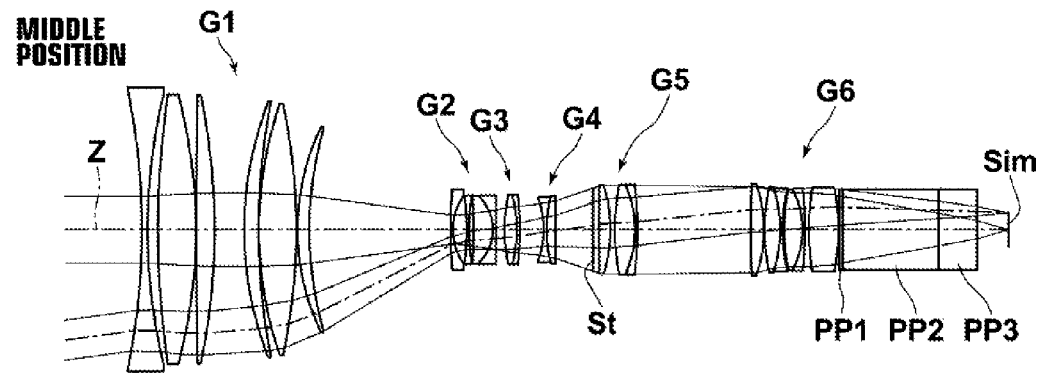
Figure 8:
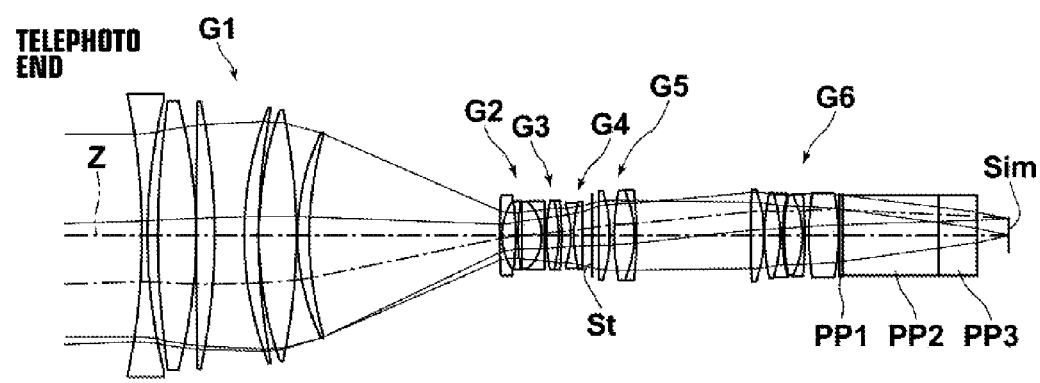
Figure 21:
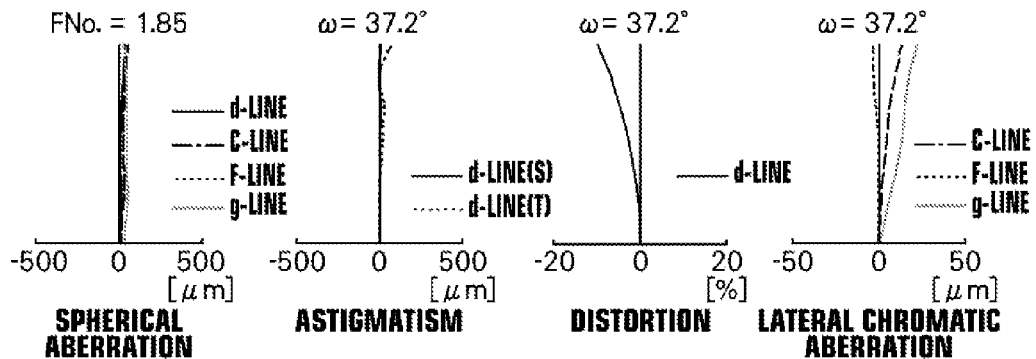
FIG. 21 shows aberration diagrams of the zoom lens of Example 8 of the disclosure.
Figure 21:
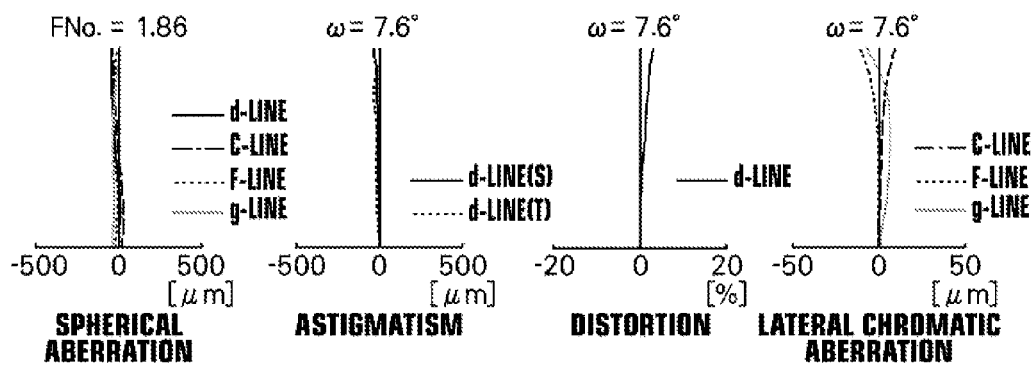
Figure 21:
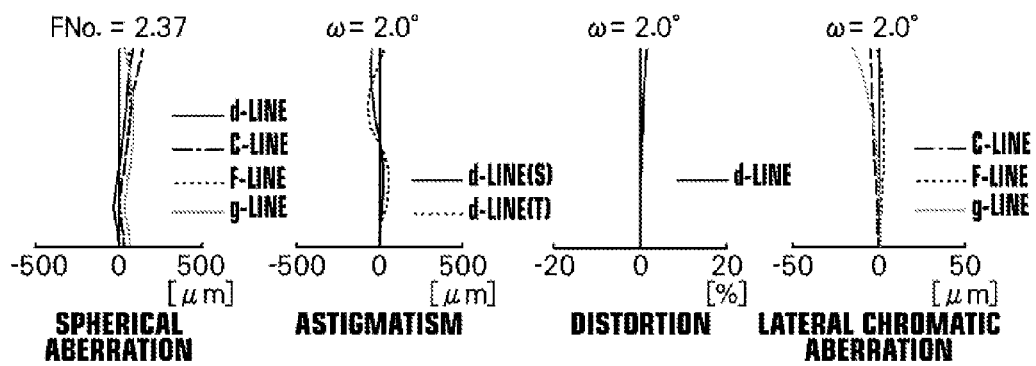

Next, a zoom lens of Example 8 is described. FIG. 8 is a sectional view illustrating the lens configuration of the zoom lens of Example 8. Table 29 shows basic lens data of the zoom lens of Example 8, Table 30 shows data about specifications of the zoom lens, Table 31 shows data about distances between the surfaces to be moved of the zoom lens, Table 32 shows data about aspheric coefficients of the zoom lens, and FIG. 21 shows aberration diagrams of the zoom lens.

TABLE 32

Example 8 - Aspheric Coefficients

| | Surface No. | | |
|---|---|---|---|
| | 3 | 11 | 13 |
| KA | 1.0000000E+00 | 1.0000000E+00 | 1.0000000E+00 |
| A4 | −1.8736383E−07 | 4.6273400E−08 | 1.8081717E−06 |
| A6 | 4.8284192E−10 | −4.3359085E−10 | 4.2864188E−08 |
| A8 | −1.4001153E−12 | 1.3817174E−12 | −2.1922327E−09 |
| A10 | 2.3072947E−15 | −2.7214189E−15 | 4.9805438E−11 |
| A12 | −2.3650345E−18 | 3.5088272E−18 | −6.4524971E−13 |
| A14 | 1.5286517E−21 | −3.0011821E−21 | 5.0437676E−15 |
| A16 | −6.0552669E−25 | 1.6449065E−24 | −2.3605723E−17 |
| A18 | 1.3414675E−28 | −5.2328897E−28 | 6.1002435E−20 |
| A20 | −1.2723040E−32 | 7.3340298E−32 | −6.7003430E−23 |

| | Surface No. 25 |
|---|---|
| KA | 1.0000000E+00 |
| A4 | 1.5397658E−06 |
| A6 | −1.2327698E−07 |
| A8 | 5.3663705E−09 |
| A10 | −1.3788295E−10 |
| A12 | 2.1950591E−12 |
| A14 | −2.1955598E−14 |
| A16 | 1.3446434E−16 |
| A18 | −4.6118086E−19 |
| A20 | 6.7900401E−22 |

Figure 9:
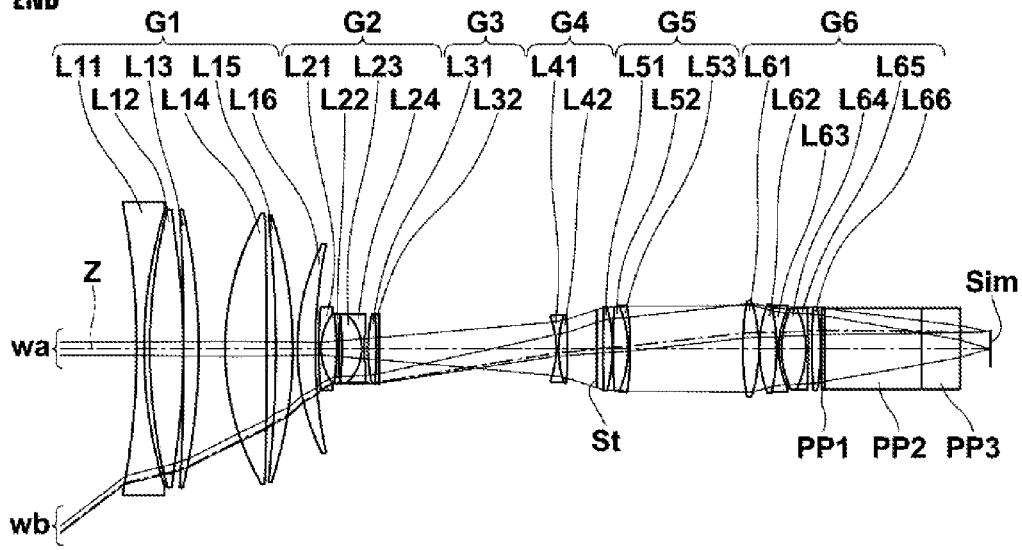
FIG. 9 is a sectional view illustrating the lens configuration of a zoom lens of Example 9 of the disclosure.
Figure 9:
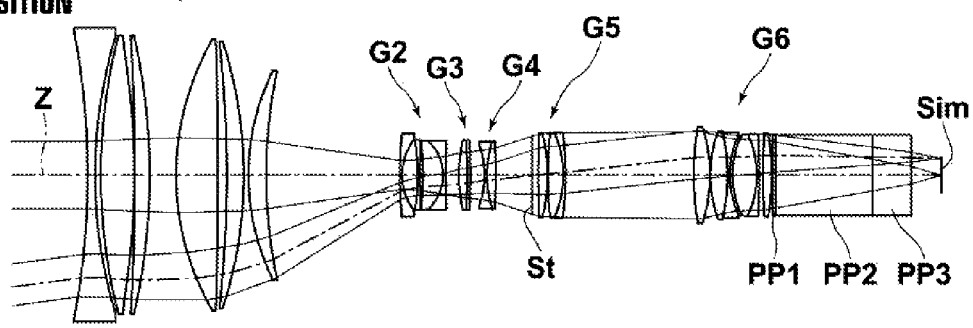
Figure 9:
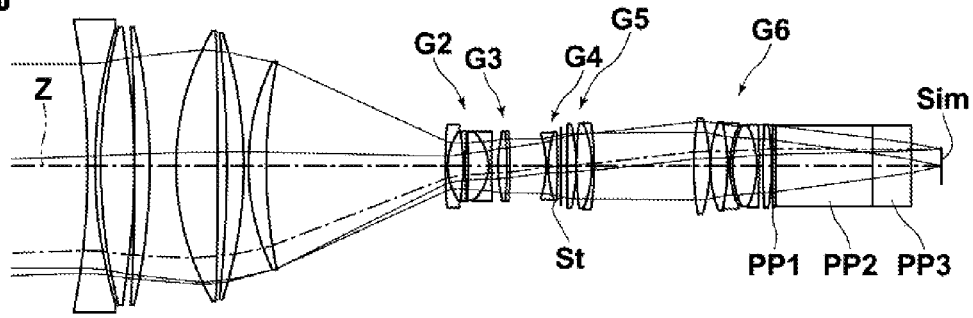
Figure 22:
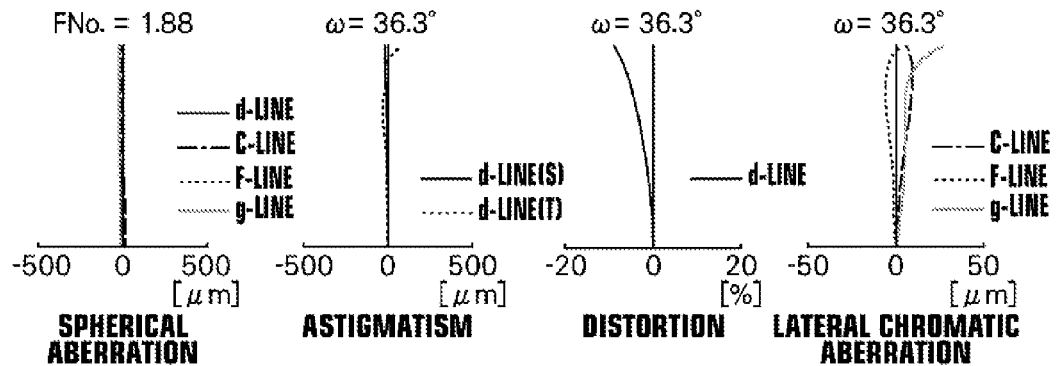
FIG. 22 shows aberration diagrams of the zoom lens of Example 9 of the disclosure.
Figure 22:
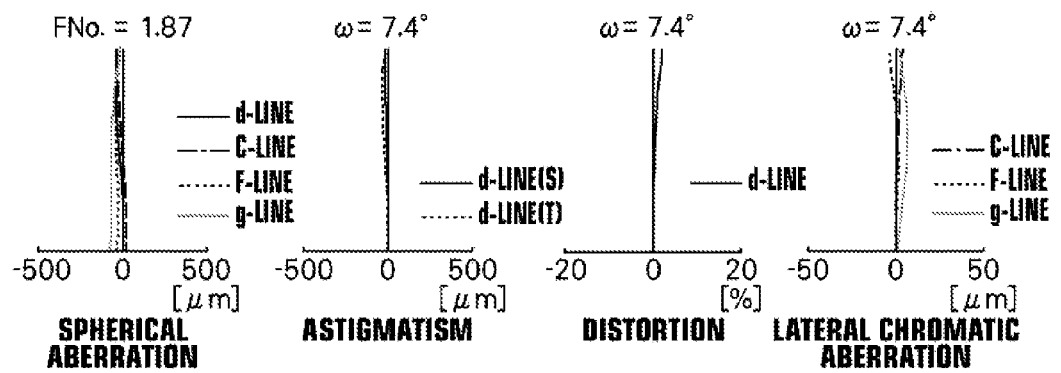
Figure 22:
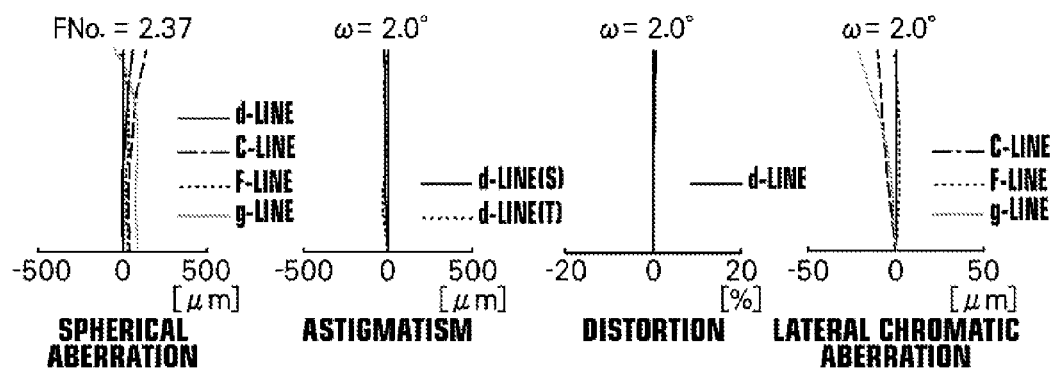

Next, a zoom lens of Example 9 is described. FIG. 9 is a sectional view illustrating the lens configuration of the zoom lens of Example 9. Table 33 shows basic lens data of the zoom lens of Example 9, Table 34 shows data about specifications of the zoom lens, Table 35 shows data about distances between the surfaces to be moved of the zoom lens, Table 36 shows data about aspheric coefficients of the zoom lens, and FIG. 22 shows aberration diagrams of the zoom lens.

TABLE 33

Example 9 - Lens Data (n and ν are with respect to the d-line)

| Surface No. | Radius of Curvature | Surface Distance | n | ν | θg F |
|---|---|---|---|---|---|
| 1 | −242.79686 | 2.500 | 1.80610 | 33.27 | 0.58845 |
| 2 | 149.46893 | 1.960 | | | |
| 3 | 174.47401 | 11.486 | 1.43387 | 95.18 | 0.53733 |
| *4 | −225.79409 | 0.120 | | | |
| 5 | −739.31515 | 5.004 | 1.43387 | 95.18 | 0.53733 |
| 6 | −198.04546 | 9.035 | | | |
| 7 | 85.78600 | 14.183 | 1.43387 | 95.18 | 0.53733 |
| 8 | −1497.21815 | 3.038 | | | |
| 9 | −385.00108 | 5.795 | 1.43387 | 95.18 | 0.53733 |
| 10 | −136.13896 | 1.572 | | | |
| *11 | 72.32852 | 6.119 | 1.78800 | 47.37 | 0.55598 |
| 12 | 162.03560 | DD[12] | | | |
| *13 | 182.10920 | 0.800 | 2.00100 | 29.13 | 0.59952 |
| 14 | 18.87521 | 5.260 | | | |
| 15 | −73.41286 | 0.800 | 1.91082 | 35.25 | 0.58224 |
| 16 | 220.63511 | 0.998 | | | |
| 17 | −113.76569 | 6.812 | 1.89286 | 20.36 | 0.63944 |
| 18 | −14.85434 | 1.000 | 1.90043 | 37.37 | 0.57720 |
| 19 | 364.92076 | DD[19] | | | |
| 20 | 48.03301 | 2.849 | 1.74852 | 50.60 | 0.55091 |
| 21 | −161.70118 | 1.000 | 1.89286 | 20.36 | 0.63944 |
| *22 | −304.40743 | DD[22] | | | |
| *23 | −28.84332 | 0.810 | 1.83899 | 42.63 | 0.56360 |
| 24 | 34.02399 | 3.050 | 1.84661 | 23.88 | 0.62072 |
| 25 | −204.63827 | DD[25] | | | |
| 26 (stop) | ∞ | 2.100 | | | |
| 27 | 320.09289 | 3.162 | 2.00100 | 29.13 | 0.59952 |
| 28 | −55.92957 | 0.120 | | | |
| 29 | 116.58063 | 5.252 | 1.51599 | 64.23 | 0.53826 |

TABLE 33-continued

Example 9 - Lens Data (n and ν are with respect to the d-line)

| Surface No. | Radius of Curvature | Surface Distance | n | ν | θg F |
|---|---|---|---|---|---|
| 30 | −33.79985 | 0.800 | 2.00100 | 29.13 | 0.59952 |
| 31 | −94.54865 | DD[31] | | | |
| 32 | 88.69842 | 5.457 | 1.51633 | 64.14 | 0.53531 |
| 33 | −50.27183 | 0.120 | | | |
| 34 | 39.25787 | 5.849 | 1.48749 | 70.24 | 0.53007 |
| 35 | −61.05603 | 0.800 | 1.95375 | 32.32 | 0.59015 |
| 36 | 29.65362 | 0.997 | | | |
| 37 | 29.70320 | 8.239 | 1.61500 | 62.31 | 0.53921 |
| 38 | −30.24349 | 0.800 | 1.95370 | 24.80 | 0.61674 |
| 39 | −272.66950 | 1.134 | | | |
| 40 | 144.65471 | 3.091 | 1.95303 | 17.79 | 0.64166 |
| 41 | −80.43761 | 0.300 | | | |
| 42 | ∞ | 1.000 | 1.51633 | 64.14 | |
| 43 | ∞ | 33.000 | 1.60859 | 46.44 | |
| 44 | ∞ | 13.200 | 1.51633 | 64.14 | |
| 45 | ∞ | 10.205 | | | |

TABLE 34

Example 9 - Specifications (d-line)

| | Wide-Angle End | Middle | Telephoto End |
|---|---|---|---|
| Zoom Magnification | 1.0 | 5.0 | 19.3 |
| f | 8.196 | 41.228 | 158.191 |
| Bf | 40.385 | 40.385 | 40.385 |
| FNo. | 1.88 | 1.87 | 2.37 |
| 2ω[°] | 72.6 | 14.8 | 4.0 |

TABLE 35

Example 9 - Distances Relating to Zoom

| | Wide-Angle End | Middle | Telephoto End |
|---|---|---|---|
| DD[12] | 1.161 | 45.444 | 60.896 |
| DD[19] | 1.091 | 4.422 | 2.385 |
| DD[22] | 60.186 | 4.838 | 12.401 |
| DD[25] | 9.939 | 12.336 | 1.095 |
| DD[31] | 38.281 | 43.618 | 33.882 |

TABLE 36

Example 9 - Aspheric Coefficients

| | Surface No. | | |
|---|---|---|---|
| | 4 | 11 | 13 |
| KA | 3.9037824E−01 | 1.0000000E+00 | 1.0000000E+00 |
| A4 | 1.5141259E−07 | −6.2338098E−08 | 5.8354262E−06 |
| A6 | −2.9924496E−10 | −2.9270662E−10 | 5.5505835E−08 |
| A8 | 5.8726417E−13 | 5.3394072E−13 | −2.5824538E−09 |
| A10 | −6.5124480E−16 | −7.3671553E−16 | 5.8516843E−11 |
| A12 | 4.7319900E−19 | 6.7924116E−19 | −7.7844069E−13 |
| A14 | −2.2644236E−22 | −4.4858248E−22 | 6.2884312E−15 |
| A16 | 7.0734534E−26 | 2.0759834E−25 | −3.0459599E−17 |
| A18 | −1.3423934E−29 | −6.0993422E−29 | 8.1448306E−20 |
| A20 | 1.1908587E−33 | 8.3507726E−33 | −9.2418228E−23 |

| | Surface No. | |
|---|---|---|
| | 22 | 23 |
| KA | −5.0742153E+02 | 1.0000000E+00 |
| A4 | 1.8183499E−06 | 3.0018396E−07 |
| A6 | −5.6579384E−08 | 6.0029159E−08 |
| A8 | 2.8741852E−09 | −3.3070585E−09 |

TABLE 36-continued

Example 9 - Aspheric Coefficients

| A10 | −7.5311255E−11 | 1.0130968E−10 |
| A12 | 1.1964776E−12 | −1.7821863E−12 |
| A14 | −1.1568254E−14 | 1.8426757E−14 |
| A16 | 6.5269060E−17 | −1.0860614E−16 |
| A18 | −1.9342408E−19 | 3.2823515E−19 |
| A20 | 2.2501369E−22 | −3.7553553E−22 |

Figure 10:
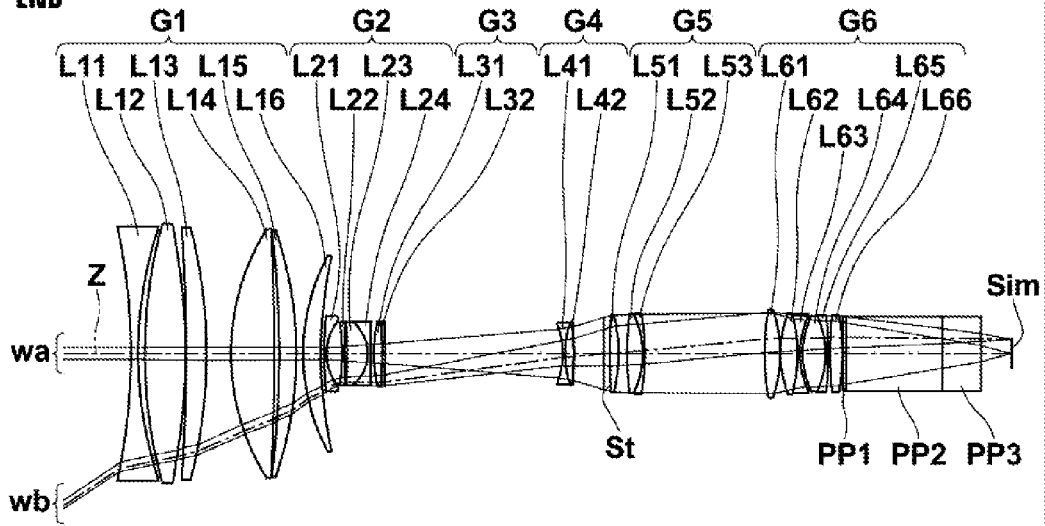
FIG. 10 is a sectional view illustrating the lens configuration of a zoom lens of Example 10 of the disclosure.
Figure 10:
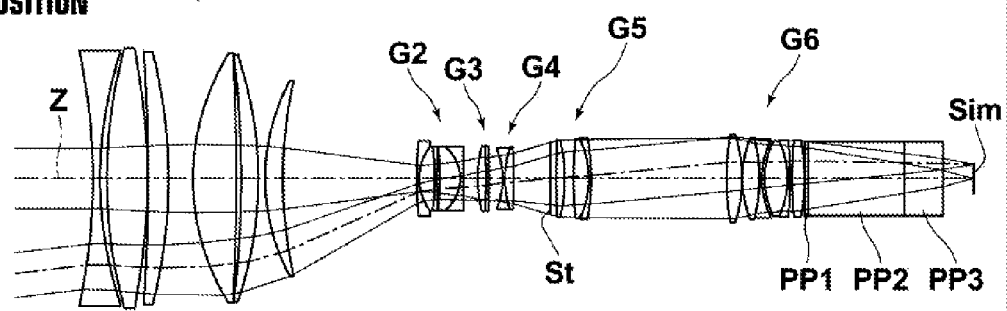
Figure 10:
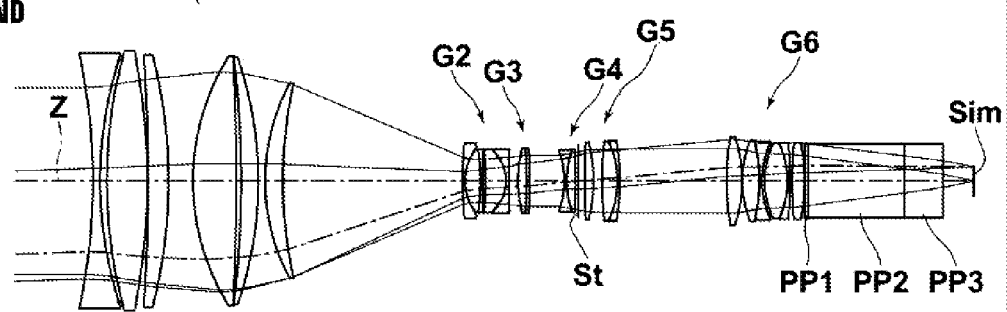
Figure 23:
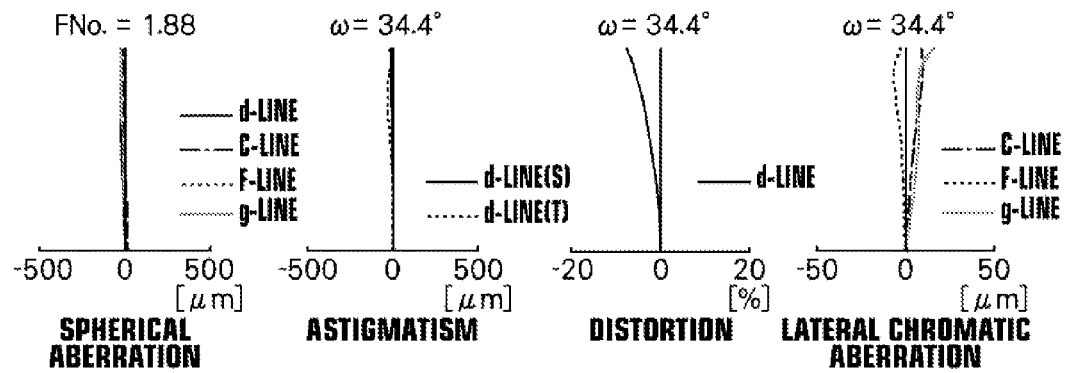
FIG. 23 shows aberration diagrams of the zoom lens of Example 10 of the disclosure.
Figure 23:
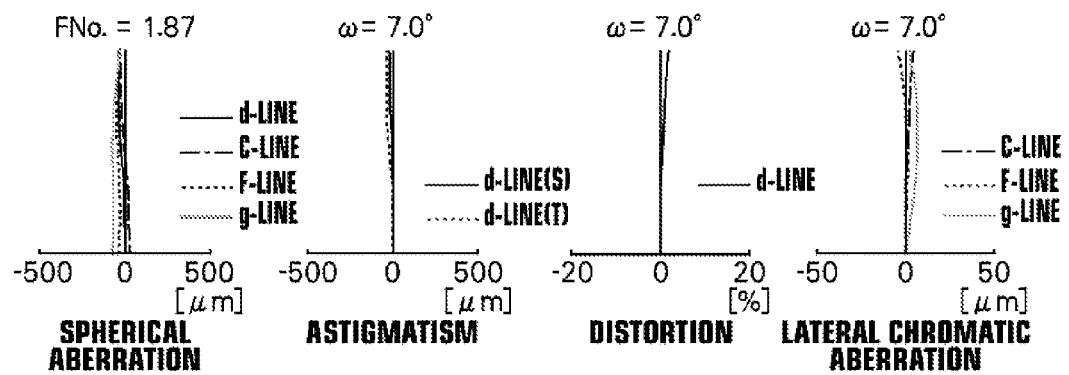
Figure 23:
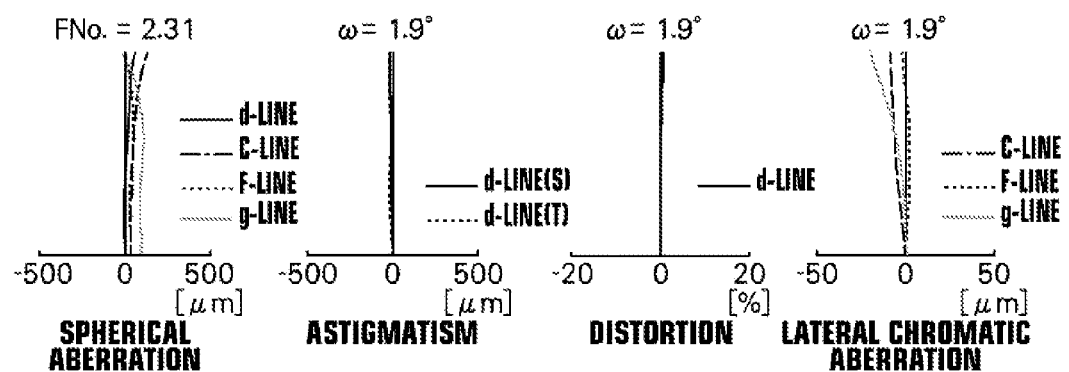

Next, a zoom lens of Example 10 is described. FIG. 10 is a sectional view illustrating the lens configuration of the zoom lens of Example 10. Table 37 shows basic lens data of the zoom lens of Example 10, Table 38 shows data about specifications of the zoom lens, Table 39 shows data about distances between the surfaces to be moved of the zoom lens, Table 40 shows data about aspheric coefficients of the zoom lens, and FIG. 23 shows aberration diagrams of the zoom lens.

TABLE 37

Example 10 - Lens Data (n and ν are with respect to the d-line)

| Surface No. | Radius of Curvature | Surface Distance | n | ν | θg F |
|---|---|---|---|---|---|
| 1 | −222.63126 | 2.500 | 1.80610 | 33.27 | 0.58845 |
| 2 | 145.93420 | 2.278 | | | |
| 3 | 177.12389 | 13.992 | 1.43387 | 95.18 | 0.53733 |
| *4 | −213.90145 | 0.120 | | | |
| 5 | −683.50382 | 7.000 | 1.43387 | 95.18 | 0.53733 |
| 6 | −185.04502 | 8.358 | | | |
| 7 | 85.52950 | 14.807 | 1.43387 | 95.18 | 0.53733 |
| 8 | −1103.67602 | 1.683 | | | |
| 9 | −381.76332 | 5.890 | 1.43387 | 95.18 | 0.53733 |
| 10 | −137.94856 | 2.318 | | | |
| *11 | 73.13339 | 6.111 | 1.78800 | 47.37 | 0.55598 |
| 12 | 162.60559 | DD[12] | | | |
| *13 | 179.22293 | 0.800 | 2.00100 | 29.13 | 0.59952 |
| 14 | 18.97045 | 5.342 | | | |
| 15 | −72.64131 | 0.800 | 1.91082 | 35.25 | 0.58224 |
| 16 | 233.53242 | 0.997 | | | |
| 17 | −113.72219 | 6.935 | 1.89286 | 20.36 | 0.63944 |
| 18 | −14.85434 | 1.000 | 1.90043 | 37.37 | 0.57720 |
| 19 | 368.97277 | DD[19] | | | |
| 20 | 48.04797 | 2.863 | 1.74448 | 51.77 | 0.54857 |
| 21 | −160.25034 | 1.000 | 1.89286 | 20.36 | 0.63944 |
| *22 | −299.89763 | DD[22] | | | |
| *23 | −28.50548 | 0.810 | 1.83880 | 42.65 | 0.56356 |
| 24 | 35.28046 | 2.992 | 1.84661 | 23.88 | 0.62072 |
| 25 | −185.13551 | DD[25] | | | |
| 26 (stop) | ∞ | 2.100 | | | |
| 27 | 436.10852 | 2.931 | 2.00100 | 29.13 | 0.59952 |
| 28 | −59.01731 | 2.945 | | | |
| 29 | 134.52672 | 5.273 | 1.54724 | 63.18 | 0.54037 |
| 30 | −33.05036 | 0.800 | 2.00100 | 29.13 | 0.59952 |
| 31 | −83.53831 | DD[31] | | | |
| 32 | 93.55317 | 5.289 | 1.51633 | 64.14 | 0.53531 |
| 33 | −50.43912 | 0.120 | | | |
| 34 | 40.32268 | 5.827 | 1.48749 | 70.24 | 0.53007 |
| 35 | −57.95691 | 0.800 | 1.95375 | 32.32 | 0.59015 |
| 36 | 31.69357 | 0.961 | | | |
| 37 | 31.38593 | 7.836 | 1.59920 | 64.74 | 0.53617 |
| 38 | −31.81357 | 0.800 | 1.95371 | 30.56 | 0.59624 |
| 39 | −183.92038 | 0.746 | | | |
| 40 | 146.23557 | 4.203 | 1.88225 | 21.44 | 0.62596 |
| 41 | −78.97938 | 0.300 | | | |
| 42 | ∞ | 1.000 | 1.51633 | 64.14 | |
| 43 | ∞ | 33.000 | 1.60859 | 46.44 | |
| 44 | ∞ | 13.200 | 1.51633 | 64.14 | |
| 45 | ∞ | 10.403 | | | |

TABLE 38

Example 10 - Specifications (d-line)

| | Wide-Angle End | Middle | Telephoto End |
|---|---|---|---|
| Zoom Magnification | 1.0 | 5.0 | 19.3 |
| f | 7.886 | 39.667 | 152.200 |
| Bf | 40.582 | 40.582 | 40.582 |
| FNo. | 1.88 | 1.87 | 2.31 |
| 2ω[°] | 68.8 | 14.0 | 3.8 |

TABLE 39

Example 10 - Distances Relating to Zoom

| | Wide-Angle End | Middle | Telephoto End |
|---|---|---|---|
| DD[12] | 1.122 | 45.815 | 61.469 |
| DD[19] | 1.088 | 4.974 | 3.185 |
| DD[22] | 60.799 | 4.675 | 11.979 |
| DD[25] | 10.322 | 12.454 | 1.092 |
| DD[31] | 40.944 | 46.356 | 36.550 |

TABLE 40

Example 10 - Aspheric Coefficients

| | Surface No. | | |
|---|---|---|---|
| | 4 | 11 | 13 |
| KA | 3.9037824E−01 | 1.0000000E+00 | 1.0000000E+00 |
| A4 | 1.5930638E−07 | −5.6035431E−08 | 5.8904011E−06 |
| A6 | −3.9388856E−10 | −3.3537701E−10 | 9.3953194E−08 |
| A8 | 7.3292759E−13 | 5.6173978E−13 | −4.1994284E−09 |
| A10 | −7.9635455E−16 | −6.9622958E−16 | 9.5299584E−11 |
| A12 | 5.8518578E−19 | 5.8785097E−19 | −1.2723867E−12 |
| A14 | −2.9694185E−22 | −3.7351231E−22 | 1.0329258E−14 |
| A16 | 1.0237514E−25 | 1.7505973E−25 | −5.0182447E−17 |
| A18 | −2.1638350E−29 | −5.3442204E−29 | 1.3406091E−19 |
| A20 | 2.0843452E−33 | 7.5983247E−33 | −1.5127209E−22 |

| | Surface No. | |
|---|---|---|
| | 22 | 23 |
| KA | −5.0742153E+02 | 1.0000000E+00 |
| A4 | 1.6897153E−06 | 4.5420100E−07 |
| A6 | −2.6249696E−08 | 4.4568780E−08 |
| A8 | 7.0093711E−10 | −2.3684016E−09 |
| A10 | 5.6435709E−12 | 7.1266084E−11 |
| A12 | −5.3655894E−13 | −1.2325702E−12 |
| A14 | 1.0575808E−14 | 1.2530303E−14 |
| A16 | −1.0094913E−16 | −7.2065993E−17 |
| A18 | 4.8151827E−19 | 2.0779288E−19 |
| A20 | −9.1781023E−22 | −2.1309351E−22 |

Figure 11:
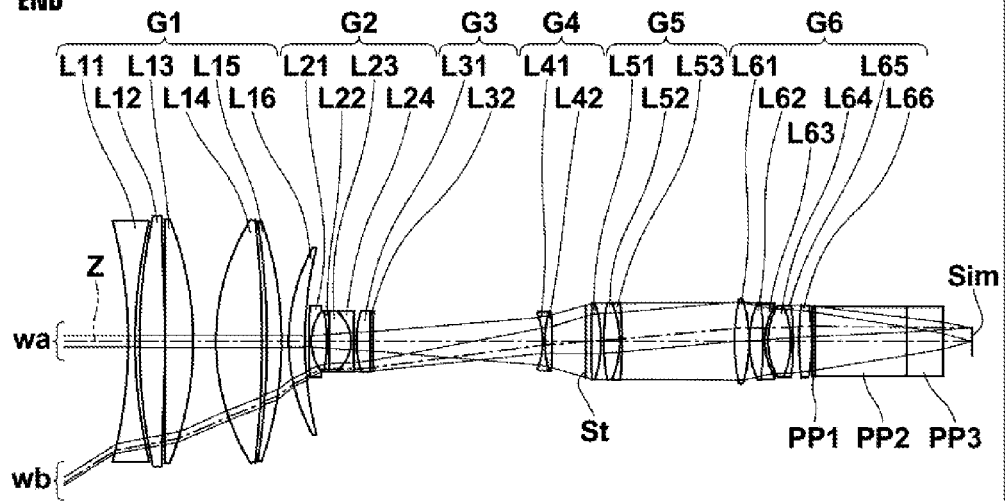
FIG. 11 is a sectional view illustrating the lens configuration of a zoom lens of Example 11 of the disclosure.
Figure 11:
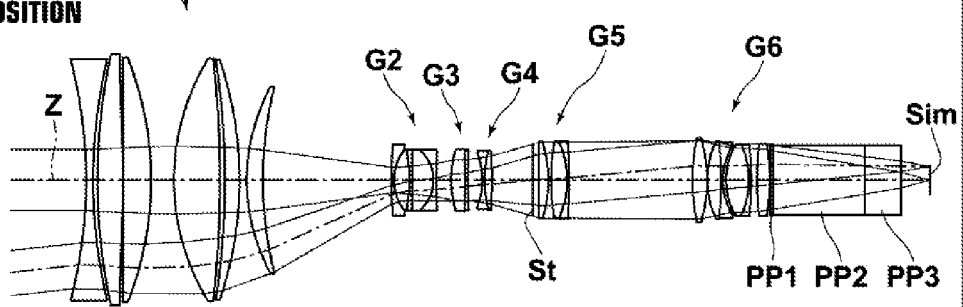
Figure 11:
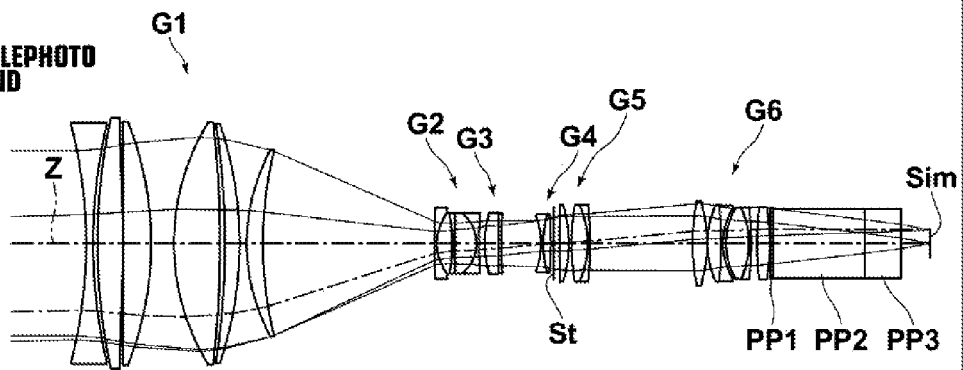
Figure 24:
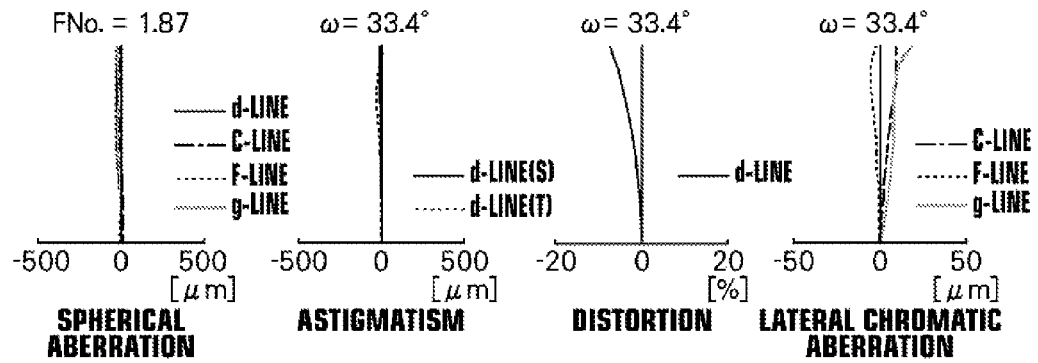
FIG. 24 shows aberration diagrams of the zoom lens of Example 11 of the disclosure.
Figure 24:
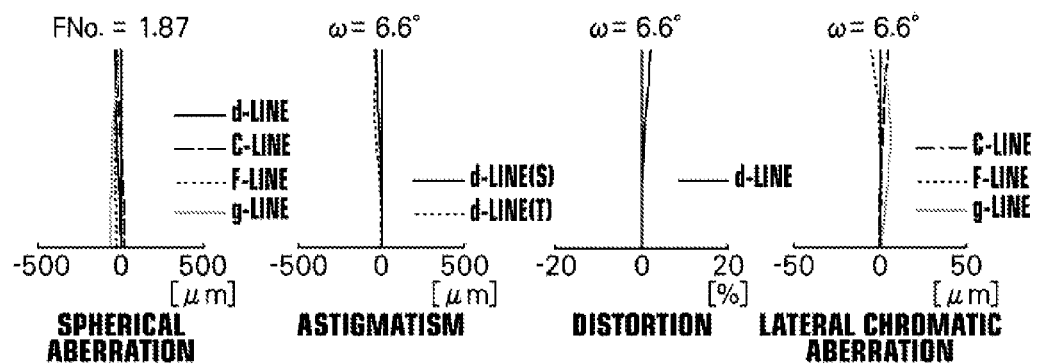
Figure 24:
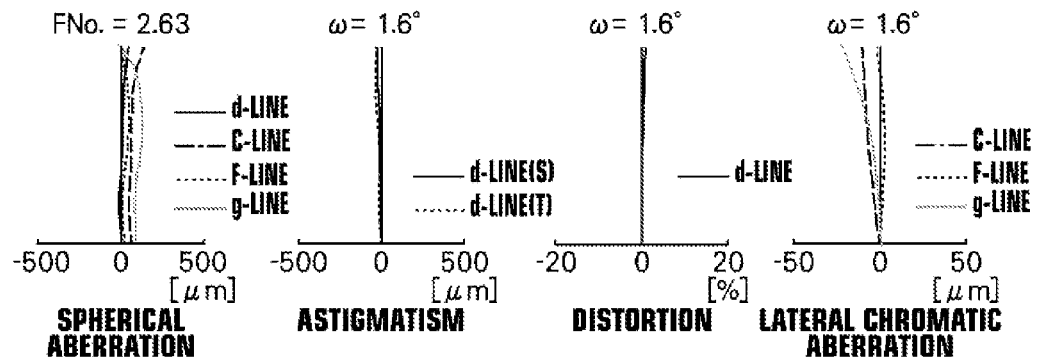

Next, a zoom lens of Example 11 is described. FIG. 11 is a sectional view illustrating the lens configuration of the zoom lens of Example 11. Table 41 shows basic lens data of the zoom lens of Example 11, Table 42 shows data about specifications of the zoom lens, Table 43 shows data about distances between the surfaces to be moved of the zoom lens, Table 44 shows data about aspheric coefficients of the zoom lens, and FIG. 24 shows aberration diagrams of the zoom lens.

TABLE 41

Example 11 - Lens Data (n and ν are with respect to the d-line)

| Surface No. | Radius of Curvature | Surface Distance | n | ν | θg F |
|---|---|---|---|---|---|
| 1 | −181.75186 | 2.500 | 1.80610 | 33.27 | 0.58845 |
| 2 | 199.64760 | 1.579 | | | |
| 3 | 226.50235 | 9.158 | 1.43387 | 95.18 | 0.53733 |
| *4 | −566.82792 | 0.120 | | | |
| 5 | −6421.52351 | 10.133 | 1.43387 | 95.18 | 0.53733 |
| 6 | −127.39359 | 8.265 | | | |
| 7 | 89.06180 | 16.655 | 1.43387 | 95.18 | 0.53733 |
| 8 | −423.24377 | 1.801 | | | |
| 9 | −302.52373 | 5.295 | 1.43387 | 95.18 | 0.53733 |
| 10 | −142.92027 | 2.596 | | | |
| *11 | 73.55268 | 5.841 | 1.78800 | 47.37 | 0.55598 |
| 12 | 149.24825 | DD[12] | | | |
| *13 | 715.23275 | 0.800 | 2.00100 | 29.13 | 0.59952 |
| 14 | 19.27535 | 5.600 | | | |
| 15 | −57.75403 | 0.800 | 1.91082 | 35.25 | 0.58224 |
| 16 | 755.37489 | 0.204 | | | |
| 17 | −2964.48041 | 7.714 | 1.89286 | 20.36 | 0.63944 |
| 18 | −15.08497 | 1.000 | 1.90043 | 37.37 | 0.57720 |
| 19 | 281.29673 | DD[19] | | | |
| 20 | 40.62722 | 5.017 | 1.75714 | 49.82 | 0.55196 |
| 21 | −756.91365 | 1.000 | 1.89286 | 20.36 | 0.63944 |
| *22 | 239.99576 | DD[22] | | | |
| *23 | −28.98640 | 0.810 | 1.83901 | 42.63 | 0.56360 |
| 24 | 43.34709 | 2.679 | 1.84661 | 23.88 | 0.62072 |
| 25 | −137.35859 | DD[25] | | | |
| 26 (stop) | ∞ | 2.100 | | | |
| 27 | 1010.84224 | 3.362 | 2.00100 | 29.13 | 0.59952 |
| 28 | −50.02966 | 1.018 | | | |
| 29 | 83.56656 | 5.828 | 1.51599 | 64.38 | 0.53805 |
| 30 | −36.45831 | 0.800 | 2.00100 | 29.13 | 0.59952 |
| 31 | −169.72957 | DD[31] | | | |
| 32 | 78.49486 | 5.235 | 1.51633 | 64.14 | 0.53531 |
| 33 | −59.19505 | 0.140 | | | |
| 34 | 35.80047 | 4.832 | 1.48749 | 70.24 | 0.53007 |
| 35 | −207.03961 | 0.800 | 1.95375 | 32.32 | 0.59015 |
| 36 | 26.40607 | 1.104 | | | |
| 37 | 27.15449 | 8.288 | 1.51609 | 76.65 | 0.52070 |
| 38 | −33.10806 | 0.800 | 1.93701 | 34.30 | 0.58368 |
| 39 | −130.40893 | 2.257 | | | |
| 40 | 158.96169 | 4.523 | 1.82981 | 23.51 | 0.61780 |
| 41 | −78.91844 | 0.300 | | | |
| 42 | ∞ | 1.000 | 1.51633 | 64.14 | |
| 43 | ∞ | 33.000 | 1.60859 | 46.44 | |
| 44 | ∞ | 13.200 | 1.51633 | 64.14 | |
| 45 | ∞ | 10.424 | | | |

TABLE 42

Example 11 - Specifications (d-line)

| | Wide-Angle End | Middle | Telephoto End |
|---|---|---|---|
| Zoom Magnification | 1.0 | 5.2 | 22.2 |
| f | 8.196 | 42.289 | 181.531 |
| Bf | 40.604 | 40.604 | 40.604 |
| FNo. | 1.87 | 1.87 | 2.63 |
| 2ω[°] | 66.8 | 13.2 | 3.2 |

TABLE 43

Example 11 - Distances Relating to Zoom

| | Wide-Angle End | Middle | Telephoto End |
|---|---|---|---|
| DD[12] | 1.503 | 46.648 | 62.122 |
| DD[19] | 1.079 | 5.358 | 2.051 |
| DD[22] | 61.291 | 5.240 | 14.325 |
| DD[25] | 12.128 | 14.907 | 1.071 |
| DD[31] | 40.700 | 44.547 | 37.132 |

TABLE 44

Example 11 - Aspheric Coefficients

| | Surface No. | | |
|---|---|---|---|
| | 4 | 11 | 13 |
| KA | 3.9037824E−01 | 1.0000000E+00 | 1.0000000E+00 |
| A4 | 1.8955344E−07 | −6.7992348E−08 | 9.8123151E−06 |
| A6 | −2.5979418E−10 | −2.3498651E−10 | 3.4172397E−08 |
| A8 | 5.5741300E−13 | 4.4048679E−13 | −2.1946711E−09 |
| A10 | −7.0429422E−16 | −6.7814207E−16 | 4.9808556E−11 |
| A12 | 6.1849050E−19 | 7.4003938E−19 | −6.4135300E−13 |
| A14 | −3.7324587E−22 | −5.8014804E−22 | 4.9785743E−15 |
| A16 | 1.4647253E−25 | 3.0051516E−25 | −2.3166168E−17 |
| A18 | −3.3208608E−29 | −9.0931637E−29 | 5.9615225E−20 |
| A20 | 3.2643607E−33 | 1.2034512E−32 | −6.5234416E−23 |

| | Surface No. | |
|---|---|---|
| | 22 | 23 |
| KA | −5.0742153E+02 | 1.0000000E+00 |
| A4 | 9.3739214E−06 | 6.6054306E−07 |
| A6 | −3.6906085E−08 | −2.2776331E−09 |
| A8 | 9.2500624E−10 | 5.4565746E−10 |
| A10 | −2.8514633E−11 | −3.0939176E−11 |
| A12 | 5.9183875E−13 | 8.4692884E−13 |
| A14 | −7.3876189E−15 | −1.2588868E−14 |
| A16 | 5.3289109E−17 | 1.0336716E−16 |
| A18 | −2.0447477E−19 | −4.4507341E−19 |
| A20 | 3.2228574E−22 | 7.7379069E−22 |

Figure 12:
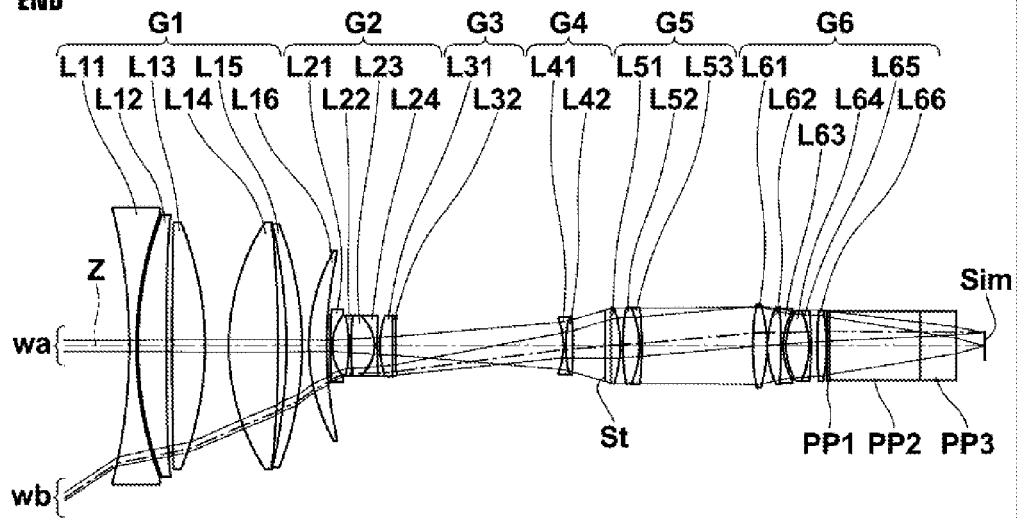
FIG. 12 is a sectional view illustrating the lens configuration of a zoom lens of Example 12 of the disclosure.
Figure 12:
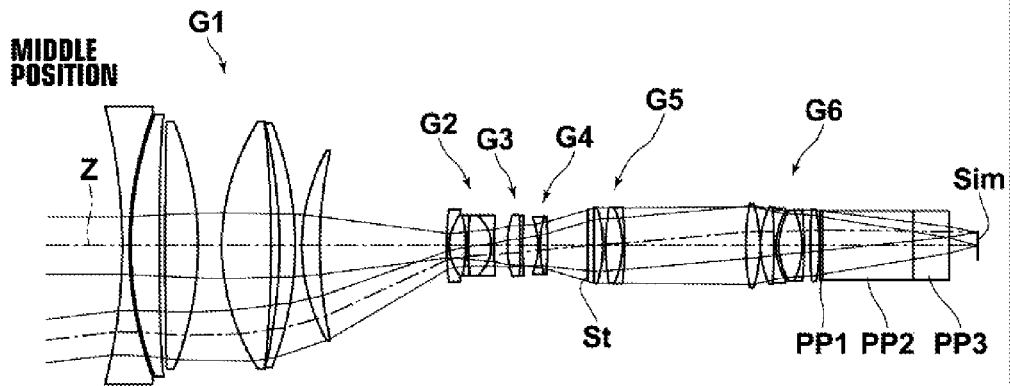
Figure 12:
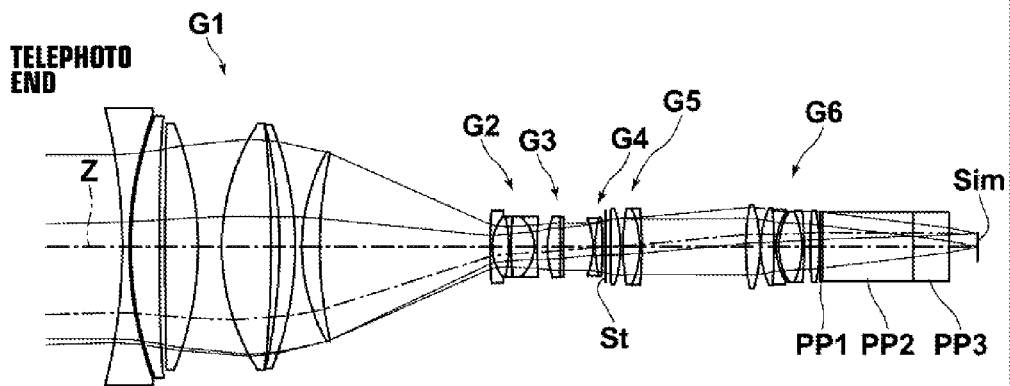
Figure 25:
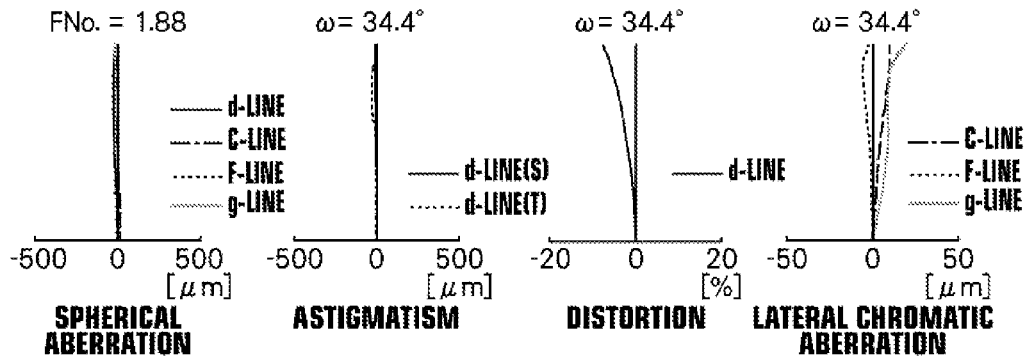
FIG. 25 shows aberration diagrams of the zoom lens of Example 12 of the disclosure.
Figure 25:
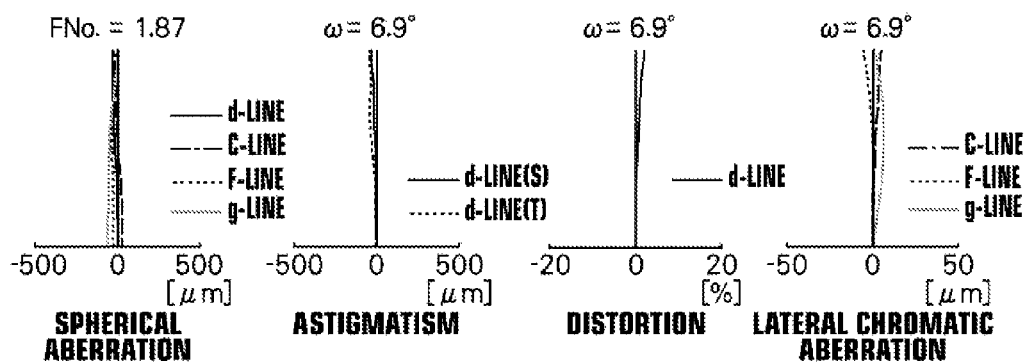
Figure 25:
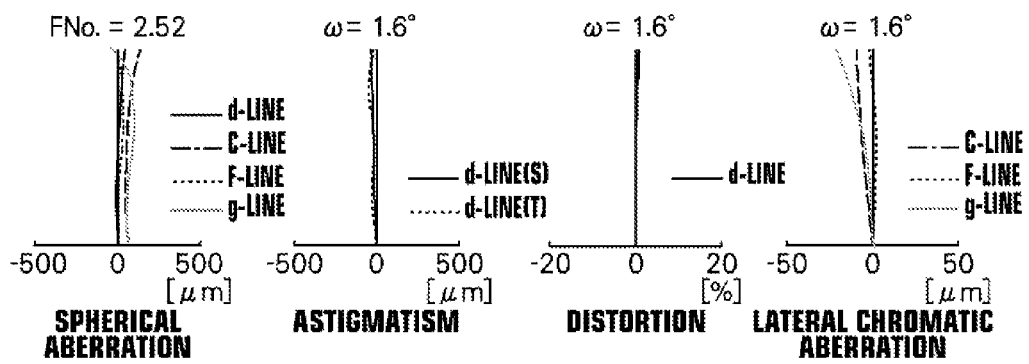

Next, a zoom lens of Example 12 is described. FIG. 12 is a sectional view illustrating the lens configuration of the zoom lens of Example 12. Table 45 shows basic lens data of the zoom lens of Example 12, Table 46 shows data about specifications of the zoom lens, Table 47 shows data about distances between the surfaces to be moved of the zoom lens, Table 48 shows data about aspheric coefficients of the zoom lens, and FIG. 25 shows aberration diagrams of the zoom lens.

TABLE 45

Example 12 - Lens Data (n and ν are with respect to the d-line)

| Surface No. | Radius of Curvature | Surface Distance | n | ν | θg F |
|---|---|---|---|---|---|
| 1 | −220.28834 | 2.500 | 1.80610 | 33.27 | 0.58845 |
| 2 | 148.43551 | 0.643 | | | |
| 3 | 144.50705 | 10.515 | 1.43387 | 95.18 | 0.53733 |
| *4 | 3665.39059 | 2.043 | | | |
| 5 | 2879.98814 | 11.935 | 1.43387 | 95.18 | 0.53733 |
| 6 | −128.40314 | 8.686 | | | |
| 7 | 88.70081 | 18.071 | 1.43387 | 95.18 | 0.53733 |
| 8 | −461.21334 | 3.002 | | | |
| 9 | −208.94887 | 5.750 | 1.43387 | 95.18 | 0.53733 |
| 10 | −129.90866 | 2.479 | | | |
| *11 | 73.86033 | 6.543 | 1.78800 | 47.37 | 0.55598 |
| 12 | 167.02084 | DD[12] | | | |
| *13 | 289.15981 | 0.800 | 2.00100 | 29.13 | 0.59952 |
| 14 | 18.76465 | 6.032 | | | |
| 15 | −51.87727 | 0.800 | 1.91082 | 35.25 | 0.58224 |
| 16 | 123.47024 | 0.120 | | | |
| 17 | 99.95738 | 8.436 | 1.89286 | 20.36 | 0.63944 |
| 18 | −15.43977 | 1.000 | 1.90043 | 37.37 | 0.57720 |
| 19 | 128.94908 | DD[19] | | | |
| 20 | 36.90904 | 4.678 | 1.72582 | 55.16 | 0.54282 |
| 21 | −341.17682 | 1.000 | 1.89286 | 20.36 | 0.63944 |
| *22 | 285.56435 | DD[22] | | | |
| *23 | −27.99616 | 0.810 | 1.83901 | 42.63 | 0.56360 |
| 24 | 44.60833 | 2.682 | 1.84661 | 23.88 | 0.62072 |
| 25 | −128.84922 | DD[25] | | | |
| 26 (stop) | ∞ | 2.100 | | | |
| 27 | 1638.05225 | 3.396 | 2.00100 | 29.13 | 0.59952 |
| 28 | −48.54602 | 0.976 | | | |

TABLE 45-continued

Example 12 - Lens Data (n and ν are with respect to the d-line)

| Surface No. | Radius of Curvature | Surface Distance | n | ν | θg F |
|---|---|---|---|---|---|
| 29 | 85.70766 | 6.107 | 1.51599 | 64.39 | 0.53805 |
| 30 | −35.65632 | 0.800 | 2.00100 | 29.13 | 0.59952 |
| 31 | −153.85119 | DD[31] | | | |
| 32 | 88.20453 | 5.187 | 1.51633 | 64.14 | 0.53531 |
| 33 | −56.43156 | 0.146 | | | |
| 34 | 33.92977 | 4.969 | 1.48749 | 70.24 | 0.53007 |
| 35 | −258.98978 | 0.800 | 1.95375 | 32.32 | 0.59015 |
| 36 | 26.15479 | 1.088 | | | |
| 37 | 26.73511 | 8.368 | 1.51600 | 71.81 | 0.52754 |
| 38 | −32.82290 | 0.800 | 1.95367 | 32.63 | 0.58885 |
| 39 | −143.02370 | 2.267 | | | |
| 40 | 153.17400 | 3.224 | 1.82246 | 23.88 | 0.61652 |
| 41 | −78.84468 | 0.300 | | | |
| 42 | ∞ | 1.000 | 1.51633 | 64.14 | |
| 43 | ∞ | 33.000 | 1.60859 | 46.44 | |
| 44 | ∞ | 13.200 | 1.51633 | 64.14 | |
| 45 | ∞ | 10.418 | | | |

TABLE 46

Example 12 - Specifications (d-line)

| | Wide-Angle End | Middle | Telephoto End |
|---|---|---|---|
| Zoom Magnification | 1.0 | 5.2 | 22.2 |
| f | 7.885 | 40.686 | 174.651 |
| Bf | 40.597 | 40.597 | 40.597 |
| FNo. | 1.88 | 1.87 | 2.52 |
| 2ω[°] | 68.8 | 13.8 | 3.2 |

TABLE 47

Example 12 - Distances Relating to Zoom

| | Wide-Angle End | Middle | Telephoto End |
|---|---|---|---|
| DD[12] | 1.205 | 46.519 | 62.263 |
| DD[19] | 1.081 | 4.831 | 3.810 |
| DD[22] | 61.399 | 5.603 | 10.927 |
| DD[25] | 11.706 | 14.729 | 1.080 |
| DD[31] | 40.610 | 44.319 | 37.921 |

TABLE 48

Example 12 - Aspheric Coefficients

| | Surface No. | | |
|---|---|---|---|
| | 4 | 11 | 13 |
| KA | 3.9037824E−01 | 1.0000000E+00 | 1.0000000E+00 |
| A4 | 1.5866563E−07 | −8.9181060E−08 | 9.9054268E−06 |
| A6 | −8.1363474E−11 | −1.2862393E−10 | 3.8349848E−08 |
| A8 | 5.5955206E−14 | 1.5179790E−13 | −2.3922613E−09 |
| A10 | 1.2432558E−16 | −2.1835099E−16 | 5.4810398E−11 |
| A12 | −2.4241647E−19 | 2.8733824E−19 | −7.0625417E−13 |
| A14 | 1.9209953E−22 | −3.0473094E−22 | 5.4273089E−15 |
| A16 | −8.0565621E−26 | 2.0199727E−25 | −2.4749970E−17 |
| A18 | 1.7565861E−29 | −7.2447428E−29 | 6.1889389E−20 |
| A20 | −1.5711250E−33 | 1.0683067E−32 | −6.5371001E−23 |

| | Surface No. | |
|---|---|---|
| | 22 | 23 |
| KA | −5.0742153E+02 | 1.0000000E+00 |
| A4 | 9.2957188E−06 | 4.5026773E−07 |
| A6 | −7.0473187E−08 | 2.2464195E−08 |
| A8 | 3.1041253E−09 | −7.5483647E−10 |
| A10 | −8.8458746E−11 | 1.0126281E−11 |
| A12 | 1.5514234E−12 | 7.4281351E−14 |
| A14 | −1.6672576E−14 | −3.9125133E−15 |
| A16 | 1.0623582E−16 | 4.7689418E−17 |
| A18 | −3.6663874E−19 | −2.5435869E−19 |
| A20 | 5.2559006E−22 | 5.0687574E−22 |

Table 49 shows values corresponding to the condition expressions (1) to (4) of the zoom lenses of Examples 1 to 12. In all the examples, the d-line is used as a reference wavelength, and the values shown in Table 49 below are with respect to the reference wavelength.

TABLE 49

| No. | Condition Expression | Example 1 | Example 2 | Example 3 | Example 4 | Example 5 | Example 6 |
|---|---|---|---|---|---|---|---|
| (1) | d2T/d2W | 0.426 | 0.392 | 0.321 | 0.367 | 0.436 | 0.303 |
| (2) | f2/f3 | −0.205 | −0.179 | −0.175 | −0.199 | −0.200 | −0.204 |
| (3) | νL | 36.26 | 34.47 | 34.47 | 29.59 | 27.89 | 28.06 |
| (4) | θgFL | 0.58800 | 0.59233 | 0.59233 | 0.59942 | 0.60421 | 0.60381 |

| No. | Condition Expression | Example 7 | Example 8 | Example 9 | Example 10 | Example 11 | Example 12 |
|---|---|---|---|---|---|---|---|
| (1) | d2T/d2W | 0.558 | 0.515 | 2.186 | 2.928 | 1.901 | 3.525 |
| (2) | f2/f3 | −0.200 | −0.201 | −0.210 | −0.210 | −0.190 | −0.196 |
| (3) | νL | 28.18 | 28.17 | 17.79 | 21.44 | 23.51 | 23.88 |
| (4) | θgFL | 0.60357 | 0.60353 | 0.64166 | 0.62596 | 0.61780 | 0.61652 |

As can be seen from the above-described data, each of the zoom lenses of Example 1 to 12 satisfies the condition expressions (1) to (4), and thus is a high magnification and compact zoom lens with successfully corrected aberrations.

Figure 26:
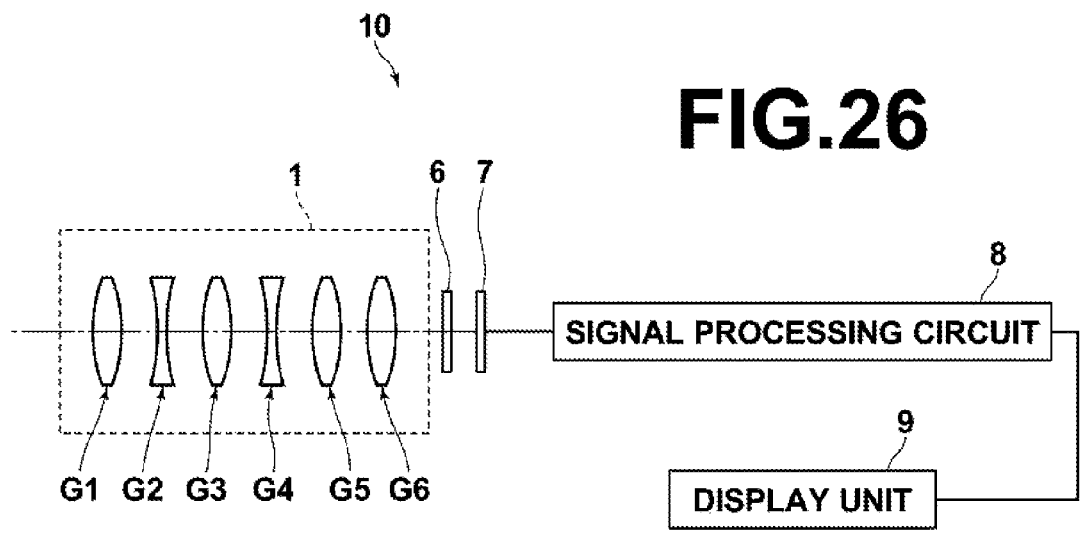
FIG. 26 is a diagram illustrating the schematic configuration of an imaging apparatus according to an embodiment of the disclosure.

Next, an imaging apparatus according to an embodiment of the disclosure is described. FIG. 26 is a diagram illustrating the schematic configuration of an imaging apparatus employing the zoom lens of any of the embodiments of the disclosure, which is one example of the imaging apparatus of the embodiment of the disclosure. It should be noted that the lens groups are schematically shown in FIG. 26. Examples of the imaging apparatus may include a video camera and an electronic still camera which include a solid-state image sensor, such as a CCD (Charge Coupled Device) or CMOS (Complementary Metal Oxide Semiconductor), as a recording medium.

The imaging apparatus 10 shown in FIG. 26 includes a zoom lens 1; a filter 6 having a function of a low-pass filter, etc., disposed on the image side of the zoom lens 1; an image sensor 7 disposed on the image side of the filter 6; and a signal processing circuit 8. The image sensor 7 converts an optical image formed by the zoom lens 1 into an electric signal. As the image sensor 7, a CCD or a CMOS, for example, may be used. The image sensor 7 is disposed such that the imaging surface thereof is positioned in the same position as the image plane of the zoom lens 1.

An image taken through the zoom lens 1 is formed on the imaging surface of the image sensor 7. Then, a signal about the image outputted from the image sensor 7 is processed by the signal processing circuit 8, and the image is displayed on a display unit 9.

The imaging apparatus 10, which is provided with the zoom lens 1 of the embodiments of the disclosure, can be formed as a compact imaging apparatus, and allows obtaining high magnification and high image quality images.

The disclosure has been described with reference to the embodiments and the examples. However, the present disclosure is not limited to the above-described embodiments and examples, and various modifications may be made to the embodiments and examples. For example, the values of the radius of curvature, the surface distance, the refractive index, the Abbe number, etc., of each lens element are not limited to the values shown in the above-described numerical examples and may take different values.

What is claimed is:

1. A zoom lens consisting of, in order from an object side, a first lens group having a positive refractive power, a second lens group having a negative refractive power, a third lens group having a positive refractive power, a fourth lens group having a negative refractive power, a fifth lens group having a positive refractive power, and a sixth lens group having a positive refractive power,
    wherein magnification change is effected by changing all distances between adjacent lens groups,
    the second lens group is moved from the object side toward an image side during magnification change from a wide-angle end to a telephoto end, and
    the position of the third lens group at the telephoto end is nearer to the image side than the position of the third lens group at the wide-angle end.

2. The zoom lens as claimed in claim 1, wherein the condition expression (1) below is satisfied:

$$0.2<d2T/d2W<5 \quad (1),$$

where d2T is an axial air space between the second lens group and the third lens group at the telephoto end, and d2W is an axial air space between the second lens group and the third lens group at the wide-angle end.

3. The zoom lens as claimed in claim 1, wherein a distance between the second lens group and the third lens group during magnification change from the wide-angle end to the telephoto end is once increased and then is decreased.

4. The zoom lens as claimed in claim 1, wherein the condition expression (2) below is satisfied:

$$-0.3<f2/f3<-0.1 \quad (2),$$

where f2 is a focal length of the second lens group, and f3 is a focal length of the third lens group.

5. The zoom lens as claimed in claim 1, wherein a stop is disposed between the fourth lens group and the fifth lens group.

6. The zoom lens as claimed in claim 1, wherein an axial air space between the fourth lens group and the fifth lens group at the telephoto end is smaller than an axial air space between the fourth lens group and the fifth lens group at the wide-angle end.

7. The zoom lens as claimed in claim 1, wherein the sixth lens group is fixed relative to an image plane during magnification change.

8. The zoom lens as claimed in claim 1, wherein the condition expression (3) below is satisfied:

$$15<vL<45 \quad (3),$$

where vL is an Abbe number with respect to the d-line of the most image-side lens of the sixth lens group.

9. The zoom lens as claimed in claim 1, wherein the condition expression (4) below is satisfied:

$$0.57<\theta gFL<0.7 \quad (4),$$

where $\theta gFL$ is a partial dispersion ratio of the most image-side lens of the sixth lens group.

10. The zoom lens as claimed in claim 1, wherein focusing from infinity to a closer object is effected by moving only the entire first lens group or only a part of lenses forming the first lens group along the optical axis.

11. The zoom lens as claimed in claim 1, wherein the first lens group consists of, in order from the object side, a first lens-group front group, a first lens-group middle group having a positive refractive power, and a first lens group rear group having a positive refractive power,
    the first lens-group front group is fixed relative to the image plane during focusing,
    the first lens-group middle group is moved from the image side toward the object side during focusing from infinity to a closer object, and
    the first lens-group rear group is moved from the image side toward the object side during focusing from infinity to a closer object along a locus of movement that is different from a locus of movement of the first lens-group middle group.

12. The zoom lens as claimed in claim 11, wherein the first lens-group front group consists of, in order from the object side, a negative lens, a positive lens, and a positive lens.

13. The zoom lens as claimed in claim 11, wherein a mean refractive index with respect to the d-line of the positive lens forming the first lens-group rear group is higher than a mean refractive index with respect to the d-line of the positive lens forming the first lens-group middle group.

14. The zoom lens as claimed in claim 1, wherein the sixth lens group comprises at least two positive lenses.

15. The zoom lens as claimed in claim 1, wherein the sixth lens group consists of, in order from the object side, a positive single lens, a cemented lens formed by two lenses cemented together wherein one of the two lenses is a positive lens and the other of the two lenses is a negative lens, a cemented lens formed by two lenses cemented together wherein one of the two lenses is a positive lens and the other of the two lenses is a negative lens, and a positive single lens.

16. The zoom lens as claimed in claim 1, wherein the condition expression (1-1) below is satisfied:

$$0.25<d2T/d2W<4 \quad (1-1),$$

where d2T is an axial air space between the second lens group and the third lens group at the telephoto end, and d2W is an axial air space between the second lens group and the third lens group at the wide-angle end.

17. The zoom lens as claimed in claim 1, wherein the condition expression (2-1) below is satisfied:

$$-0.25 < f2/f3 < -0.15 \qquad (2\text{-}1),$$

where f2 is a focal length of the second lens group, and f3 is a focal length of the third lens group.

18. The zoom lens as claimed in claim 1, wherein the condition expression (3-1) below is satisfied:

$$17 < vL < 40 \qquad (3\text{-}1),$$

where vL is an Abbe number with respect to the d-line of the most image-side lens of the sixth lens group.

19. The zoom lens as claimed in claim 1, wherein the condition expression (4-1) below is satisfied:

$$0.58 < \theta gFL < 0.66 \qquad (4\text{-}1),$$

where θgFL is a partial dispersion ratio of the most image-side lens of the sixth lens group.

20. An imaging apparatus comprising the zoom lens as claimed in claim 1.

* * * * *